United States Patent
Fujimoto et al.

(10) Patent No.: US 9,910,559 B2
(45) Date of Patent: Mar. 6, 2018

(54) MENU SCREEN DISPLAY CONTROL METHOD AND DISPLAY CONTROL DEVICE FOR EXCHANGING ICONS OF A MENU BASED ON USER INSTRUCTION

(71) Applicant: SHARP KABUSHIKI KAISHA, Osaka-shi, Osaka (JP)

(72) Inventors: Kinya Fujimoto, Osaka (JP); Takashi Unobe, Osaka (JP); Atsushi Ogawa, Osaka (JP); Hiroyuki Naganuma, Osaka (JP); Masayuki Hiyoshi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 421 days.

(21) Appl. No.: 14/627,978

(22) Filed: Feb. 20, 2015

(65) Prior Publication Data

US 2015/0160804 A1    Jun. 11, 2015
US 2017/0192622 A9    Jul. 6, 2017

Related U.S. Application Data

(62) Division of application No. 14/111,481, filed as application No. PCT/JP2012/059019 on Apr. 2, 2012, now abandoned.

(30) Foreign Application Priority Data

Apr. 15, 2011  (JP) ................................. 2011-091540
Dec. 27, 2011  (JP) ................................. 2011-286988

(51) Int. Cl.
G06F 3/00   (2006.01)
G06F 13/00  (2006.01)
(Continued)

(52) U.S. Cl.
CPC ........ *G06F 3/0482* (2013.01); *G06F 3/04817* (2013.01); *H04N 5/4403* (2013.01);
(Continued)

(58) Field of Classification Search
CPC ........... H04N 21/4858; H04N 21/4316; H04N 21/482; H04N 5/4403; H04N 5/44543;
(Continued)

(56) References Cited

U.S. PATENT DOCUMENTS 5,978,591 A   11/1999  Bartholomew et al.
6,211,921 B1   4/2001  Cherian et al.
(Continued)

FOREIGN PATENT DOCUMENTS

JP   9-297532 A     11/1997
JP   2000-149537 A  5/2000
(Continued)

OTHER PUBLICATIONS

Advisory Action dated Jan. 29, 2015 for U.S. Appl. No. 14/111,481.
(Continued)

*Primary Examiner* — Nasser M Goodarzi
*Assistant Examiner* — Patrick A Ryan
(74) *Attorney, Agent, or Firm* — Birch, Stewart, Kolasch & Birch, LLP

(57) ABSTRACT

According to a method of the present invention for controlling display of a menu screen, content is displayed in a content display region located in a central part of a display screen in a size smaller than the display screen, and a plurality of icons are displayed in a circle around the content display region so that the plurality of icons sequentially move to a specific position in accordance with a user's selecting operation while moving around the content display region without overlapping the content display region.

5 Claims, 76 Drawing Sheets

(51) Int. Cl.
- *H04N 5/445* (2011.01)
- *G06F 3/0482* (2013.01)
- *G06F 3/0481* (2013.01)
- *H04N 21/482* (2011.01)
- *H04N 21/431* (2011.01)
- *H04N 5/44* (2011.01)
- *H04N 21/485* (2011.01)

(52) U.S. Cl.
CPC ..... *H04N 5/44543* (2013.01); *H04N 5/44582* (2013.01); *H04N 5/44591* (2013.01); *H04N 21/4316* (2013.01); *H04N 21/482* (2013.01); *H04N 21/4858* (2013.01)

(58) Field of Classification Search
CPC ............ H04N 5/44582; H04N 5/44591; G06F 3/0482; G06F 9/4443
See application file for complete search history.

(56) References Cited

U.S. PATENT DOCUMENTS

| | | | |
|---|---|---|---|
| 6,593,941 | B1 | 7/2003 | Sameshima |
| 6,678,891 | B1 | 1/2004 | Wilcox et al. |
| 7,747,961 | B2 | 6/2010 | Watanabe et al. |
| 7,793,232 | B2 | 9/2010 | Chaudhri et al. |
| 7,987,491 | B2 | 7/2011 | Reisman |
| 8,479,107 | B2 | 7/2013 | Vainio et al. |
| 8,601,394 | B2 | 12/2013 | Sheehan et al. |
| 2003/0169286 | A1 | 9/2003 | Misawa |
| 2005/0086611 | A1 | 4/2005 | Takabe et al. |
| 2006/0212829 | A1 | 9/2006 | Yahiro et al. |
| 2007/0238340 | A1 | 10/2007 | Ohira et al. |
| 2008/0120661 | A1 | 5/2008 | Ludvig et al. |
| 2010/0177218 | A1 | 7/2010 | Ohuchi |
| 2010/0267449 | A1 | 10/2010 | Gagner et al. |
| 2011/0252446 | A1 | 10/2011 | Jeong et al. |
| 2012/0144424 | A1 | 6/2012 | Ganesan et al. |

FOREIGN PATENT DOCUMENTS

| | | |
|---|---|---|
| JP | 2000-506714 A | 5/2000 |
| JP | 2000-197158 A | 7/2000 |
| JP | 2000-283782 A | 10/2000 |
| JP | 2001-215943 A | 8/2001 |
| JP | 2002-196867 A | 7/2002 |
| JP | 2003-506787 A | 2/2003 |
| JP | 2003-263148 A | 9/2003 |
| JP | 2004-86508 A | 3/2004 |
| JP | 2004-192079 A | 7/2004 |
| JP | 2004-213451 A | 7/2004 |
| JP | 2004-326189 A | 11/2004 |
| JP | 2005-94595 A | 4/2005 |
| JP | 2006-217342 A | 8/2006 |
| JP | 2006-260267 A | 9/2006 |
| JP | 2007-122136 A | 5/2007 |
| JP | 2007-281258 A | 10/2007 |
| JP | 2007-334559 A | 12/2007 |
| JP | 2008-203847 A | 9/2008 |
| JP | 2008-305274 A | 12/2008 |
| JP | 2010-165149 A | 7/2010 |

OTHER PUBLICATIONS

Japanese Office Action issued in Patent Application No. 2011-289655 dated Jan. 29, 2013.
Office Action dated Aug. 27, 2014 for U.S. Appl. No. 14/111,481.
Office Action dated Nov. 21, 2014 for U.S. Appl. No. 14/111,481.
Web User Guide for Video Camera GZ-MS237, Victor Company of Japan, Limited, 2010, pp. 1-40, <http://manual3.jvckenwood.com/manuals/wse/download.php?filename=/manuals/3730CTxtcaoibs/LYTU.

FIG. 6

Icons selectable on main screen of My Circle (initial state at shipment)

| Icons | Explanation | Icons | Explanation |
|---|---|---|---|
| Watch TV | Selected to watch TV | Home network | Selected to watch image or photo / listen to music on home network |
| Watch recorded program | Selected to play program recorded in USB-HDD | Calendar/Clock | Selected to display calendar and clock |
| Watch HDMI device | Selected to watch image in devices, such as recorder and PC, connected to HDMI input terminal of display section | Favorite Web1 YouTube | Favorite page on Internet can be registered. "YouTube" is registered in initial state at shipment. |
| USB application | Selected to watch photos / listen to music in USB memory | AQUOS.jp | Selected to display Internet page "AQUOS.jp" |

Icons selectable on sub screen

- Pressing green button of remote control on main screen displays sub screen
- Favorite services on Internet (already registered) are displayed in initial state at shipment

Favorite Web2
Yahoo! JAPAN

Favorite Web3
acTVila

Favorite Web4
T's TV RENTAL VIDEO

Favorite Web5
HIKARI TV

Favorite Web6
TSUTAYA TV

Favorite Web7
CATALOG DEPARTMENT, PARALY

Favorite Web8
Shufoo (shufoo)

Favorite Web9
my Picturetown on TV

FIG. 7

List of icons for guide display

| Guide display | Explanation |
|---|---|
| My Circle | • Display/hide My Circle |
| Program guide | • Display program guide |
| Channel selection CH ∧∨ | • Select channel (forward / reverse) |
| Sound volume VOL +/− | • Change sound volume (+ / −) |
| Return ↩ | • Return to previous screen<br>• Do same operation as return button of remote control |
| Select △▽◁▷ | • Select up, down, left or right<br>• Do same operation as cursor buttons (up, down, left, and right) of remote control |
| Select △▽ | • Select up or down<br>• Do same operation as cursor buttons (up and down) of remote control<br>• Select music file (previous/next) |
| Select ◁▷ | • Select left or right<br>• Do same operation as cursor buttons (left and right) of remote control<br>Select (return / forward) photo to be displayed by USB application or on home network |
| Enter ○ | • Make determination<br>• Do same operation as enter button of remote control |

| Guide display | Explanation |
|---|---|
| Switch broadcasting | • Switch to terrestrial digital / BS digital / CS digital |
| Reproduce ▶ | • Reproduce moving image or music |
| Pause ▋▋ | • Pause reproduction |
| Stop ■ | • Stop reproduction |
| Cue ◀◀ | • Cue start of moving image |
| Main | • Display main screen of My Circle |
| Sub | • Display sub screen of My Circle |
| Exchange of icons | • Exchange icons on My Circle |
| Select | • Select icon on My Circle (counterclockwise / clockwise) |
| Guide display | • Display guide of calendar / clock (how to operate calendar / clock) |
| No guide display | • Delete guide of calendar / clock |
| Layout | • Display screen for changing layout of calendar / clock / photo function |

FIG. 9
Start display of My Circle
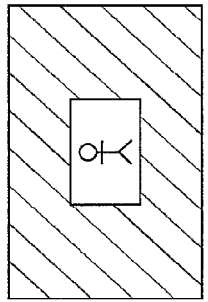
Draw background
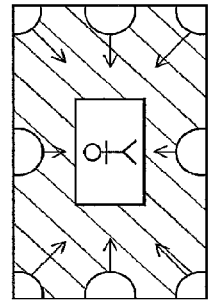
Icons move towards center from periphery of screen
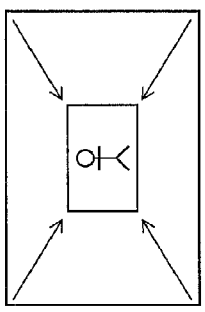
Display video in reduced size at center
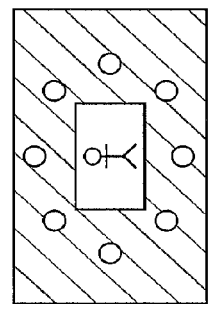
Completion of display of My Circle
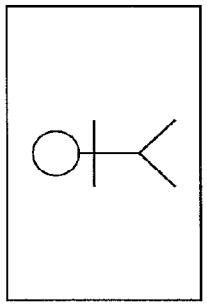
My Circle button FIG. 20
My Circle Red : Menu display ③Recommended Web registration
| Order | Screen | Operation | Content |
|---|---|---|---|
| ① | 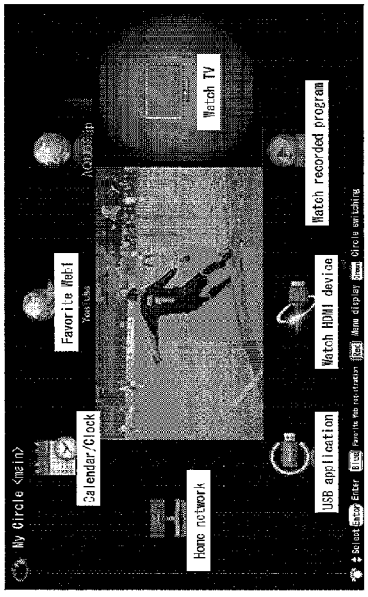 | 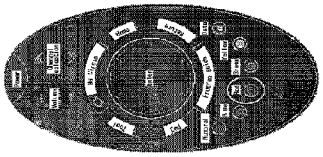 | Press "My Circle" key of remote control to display screen showing circular list<br>Press red key of the remote control to display menu |
| ② | 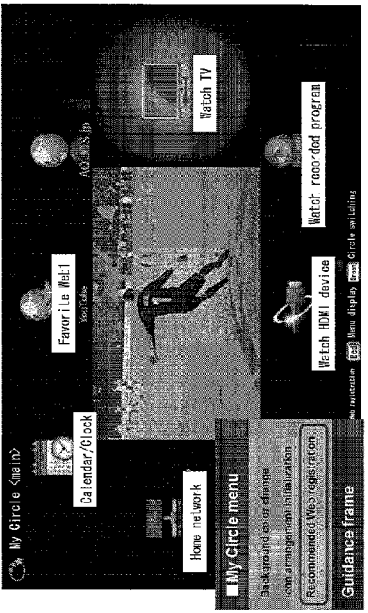 | 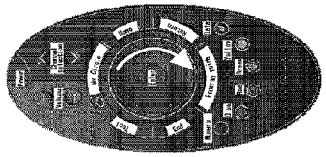 | Select and determine "Recommended Web registration" from menu |

FIG. 21

My Circle Red : Menu display ③Recommended Web registration

| Order | Screen | Operation | Content |
|---|---|---|---|
| ③ | 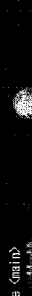 |  | Select and determine Favorite Web to be overwritten from list (cursor moves in zigzag in response to rotation of jog in Recommended Web registration mode) |
| ④ | 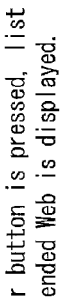 | 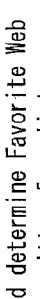 | When enter button is pressed, list of Recommended Web is displayed. URL of Recommended Web is obtained from content menu (however, URL of YouTube only is obtained from initial value of set)<br><br>Select web which user wants to register |

FIG. 22

Favorite Web registration  blue: Favorite Web registration

| Order | Screen | Operation | Content |
|---|---|---|---|
| ⑤ | | | Confirm title.<br>Ten characters corresponding to the number of characters in My Circle are displayed.<br><br>For changing title, "Change title" is selected. |
| ⑥ | | | When user starts editing title, keyboard software is activated to allow user to enter characters.<br><br>Background does not necessarily show titles and icons |

FIG. 23

Favorite Web registration blue: Favorite Web registration

| Order | Screen | Operation | Content |
|---|---|---|---|
| ⑦ | | | After entering characters, registration key is pressed to complete registration. |
| ⑧ | | | Completion screen pops up. |

Background does not necessarily show titles and icons

FIG. 24
My Circle Red : Menu display ③Recommended Web registration
| Order | Screen | Operation | Content |
|---|---|---|---|
| ⑨ | 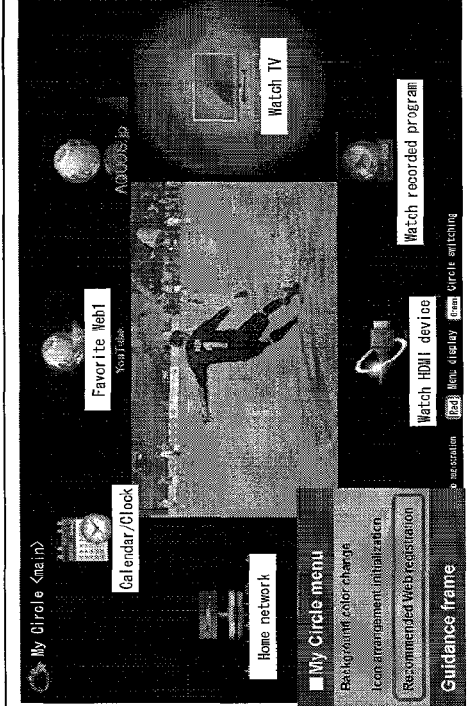 | 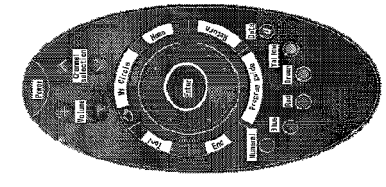 | Press completion button to return to original screen (state where menu is displayed) |

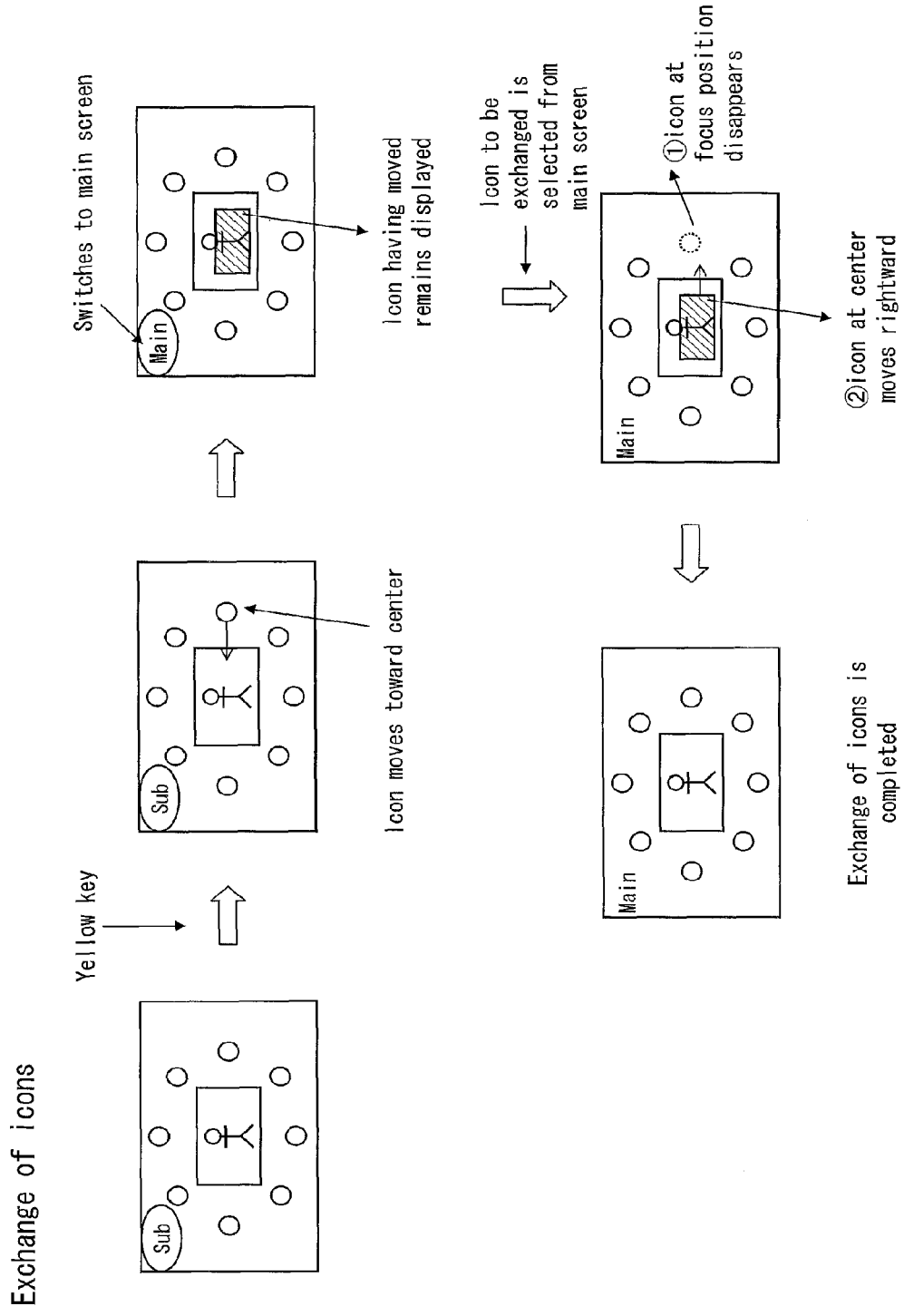
FIG. 25 Exchange of icons

FIG. 26

My Circle Exchange of icons (yellow key of remote control)

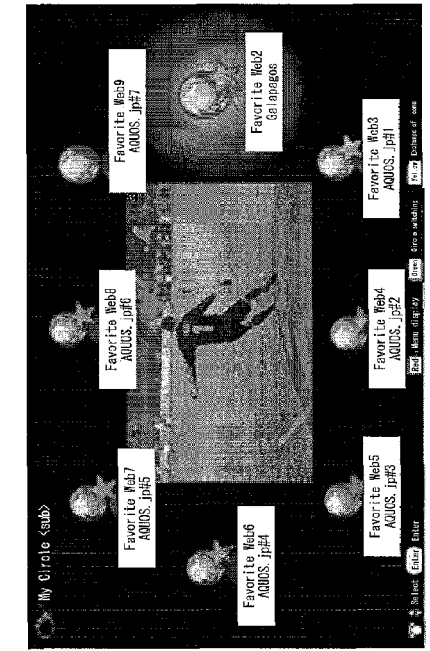

<Exchange of icons>
While My Circle (sub) screen is displayed, exchange of icons is started by one of operations below
• Yellow key of remote control
• Touch key "exchange of icons"

<My Circle main screen (initial state at shipment)>
• Watch TV
• Watch recorded program
• Watch HDMI device
• USB application
• Home network
• Calendar/clock
• Favorite Web 1 YouTube
• AQUOS.jp All icons are exchangeable <My Circle sub screen (initial state at shipment)>
☐ Favorite Web 2 AQUOS.jp#1 Yahoo! JAPAN
☐ Favorite Web 3 AQUOS.jp#2 acTVila
☐ Favorite Web 4 AQUOS.jp#3 T's TV rental video
☐ Favorite Web 5 AQUOS.jp#4 HIKARI TV
☐ Favorite Web 6 AQUOS.jp#5 TSUTAYA TV
☐ Favorite Web 7 AQUOS.jp#6 catalog department paraly
☐ Favorite Web 8 AQUOS.jp#7 Shufoo!
☐ Favorite Web 9 AQUOS.jp#8 my Picturetown on TV

FIG. 27

My Circle Yellow key: how to exchange icons (remote control version)

| Order | Screen | Operation | Content |
|---|---|---|---|
| ① |  |  | Press "My Circle" key of remote control to display screen showing circular list.<br>Press green key of remote control to switch My Circle from ⟨main⟩ to ⟨sub⟩. |
| ② |  |  | Rotate jog dial to select icon which user wants to move to ⟨main⟩. |

Rotating jog dial clockwise rotates icons clockwise

FIG. 28
My Circle Yellow key: how to exchange icons (remote control version)
| Order | Screen | Operation | Content |
|---|---|---|---|
| ③ | 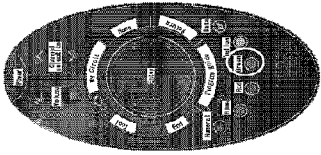 | 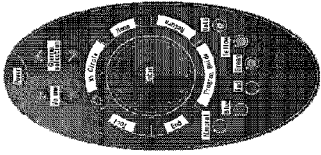 | When icon which user wants to move to ⟨main⟩ is focused, press yellow key "exchange of icons" of remote control. |
| ④ | 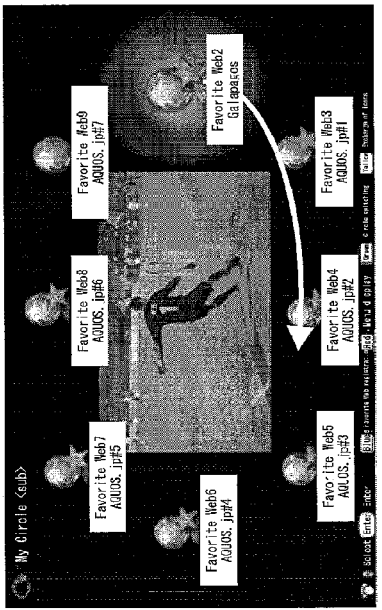 | 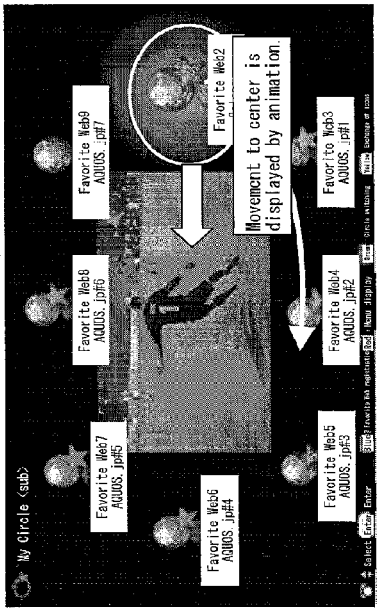 | Icon which user wants to move to ⟨main⟩ moves to center of screen. The movement is displayed by animation. |

FIG. 29

My Circle Yellow key: how to exchange icons (remote control version)

| Order | Screen | Operation | Content |
|---|---|---|---|
| ⑤ | 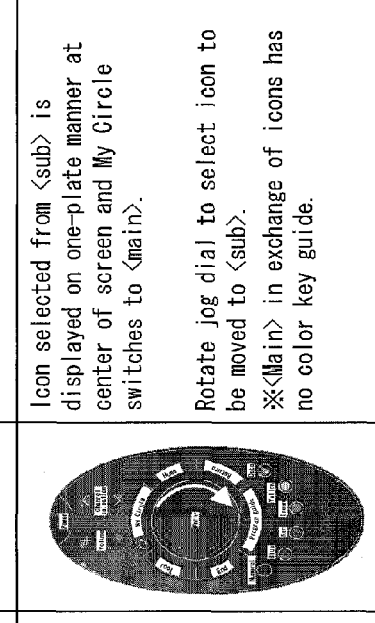 | 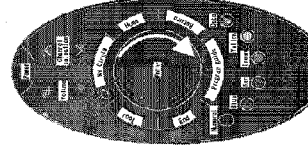 | Icon selected from ⟨sub⟩ is displayed on one-plate manner at center of screen and My Circle switches to ⟨main⟩.<br><br>Rotate jog dial to select icon to be moved to ⟨sub⟩.<br>※⟨Main⟩ in exchange of icons has no color key guide. |
| ⑥ | 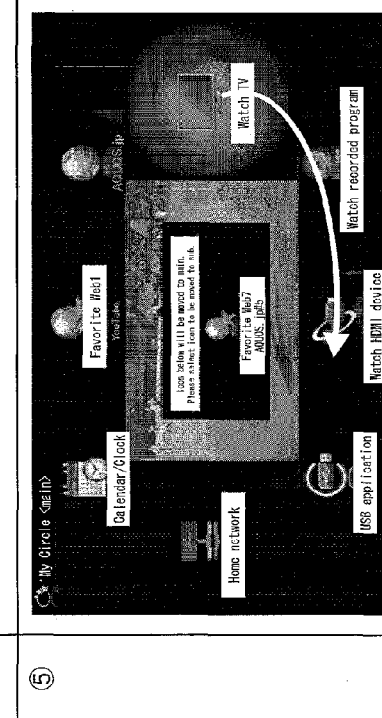 | 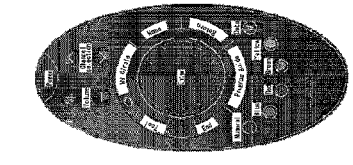 | When icon to be moved to ⟨sub⟩ is focused, press enter button.<br><br>Icon at center of screen moves rightward and overlaps icon to be moved to ⟨sub⟩. This movement is displayed by animation. |

FIG. 30

My Circle Yellow key: how to exchange icons (remote control version)

| Order | Screen | Operation | Content |
|---|---|---|---|
| ⑦ | | | Exchange of icons is completed. ⟨Main⟩ is displayed.<br><br>Key guidance is restored via remote control. |

FIG. 31

My Circle Case where icon cannot be selected

Some icons switch screens and some icons do not according to whether television is connected with LAN, memory or other device.
Icons function basically the same as conventional AQUOS.

<Icons which switch screens when not connected with cable etc.>
- Watch TV → Switches to TV screen
- Watch HDMI device 1 → Switches to screen for HDMI device
- Favorite Webs 1-9 → NetFront starts up
- AQUOS.jp → NetFront starts up <Icons which display caution without switching screens when not connected with cable etc.>
- Watch recorded program
- USB application         ]— Display caution that screens are not switchable
- Home network

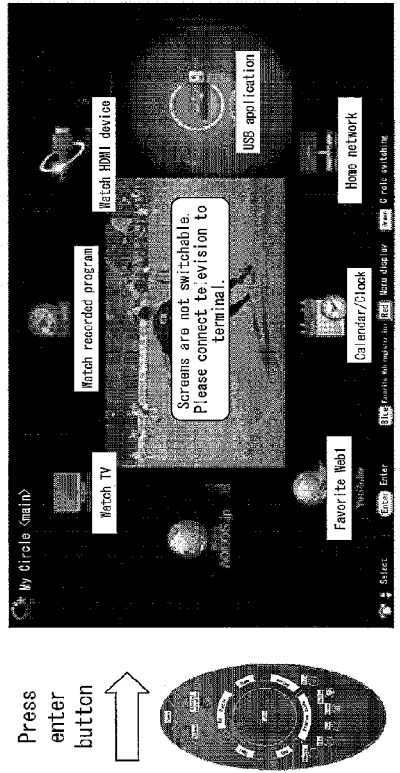

Display caution when icon is focused

Press enter button

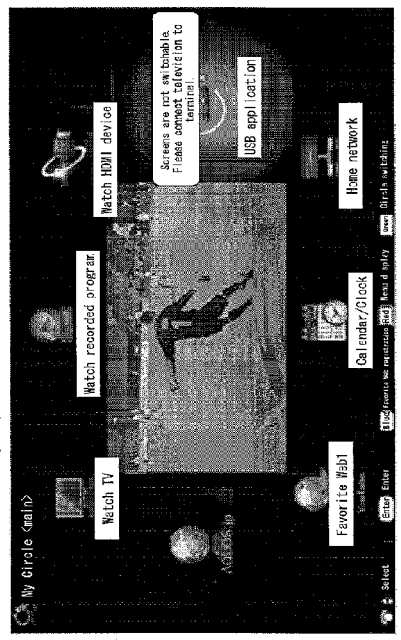

Display caution at center when enter button is pressed

FIG. 36

Favorite Web registration blue: Favorite Web registration

- User can register website by starting from "My Circle" and pressing "blue key of remote control" while NetFront is activated.

| Order | Screen | Operation | Content |
|---|---|---|---|
| ① | | | Internet webpage is displayed through home or My Circle. (left drawing shows AQUOS.jp)<br><br>Website which user wants to register is displayed by using search etc. (cook pad in the example) |
| ② | Top page of recipe site | | When website which user wants to register is displayed, press My Circle key of remote control |

FIG. 37

Favorite Web registration blue: Favorite Web registration

| Order | Screen | Operation | Content |
|---|---|---|---|
| ③ |  | | View My Circle via NetFront and press blue key corresponding to "Favorite Web registration" in guidance. |
| ④ |  | | Registration list is displayed at center of screen. Select where website is to be registered from list.<br><br>(Registration list can overlap icons. Size of registration list is determined focusing on viewability.) |

FIG. 38

Favorite Web registration blue: Favorite Web registration

| Order | Screen | Operation | Content |
|---|---|---|---|
| ⑤ | | | Confirm title.<br>Ten characters corresponding to the number of characters in My Circle are displayed. (<title></title> in HTML is extracted)<br><br>For changing title, "Change title" is selected. |
| ⑥ | | | When user starts editing title, keyboard software is activated to allow user to enter characters.<br><br>Background does not necessarily show titles and icons |

FIG. 44
Calendar/clock layout (selection of background color)
<Selection of background color>
One of three colors, black, white, and pink, can be selected as background color for each of five layouts above
(the three colors are in accordance with cabinet color of main body)
white
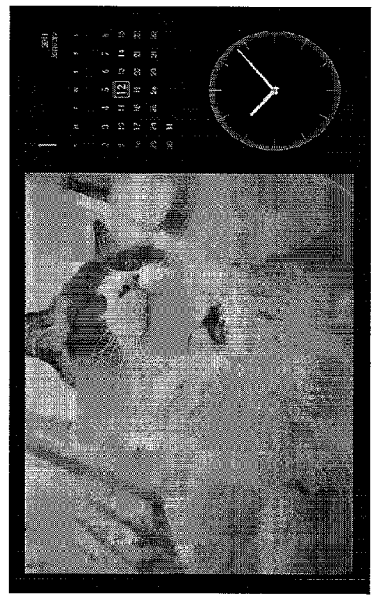
Black
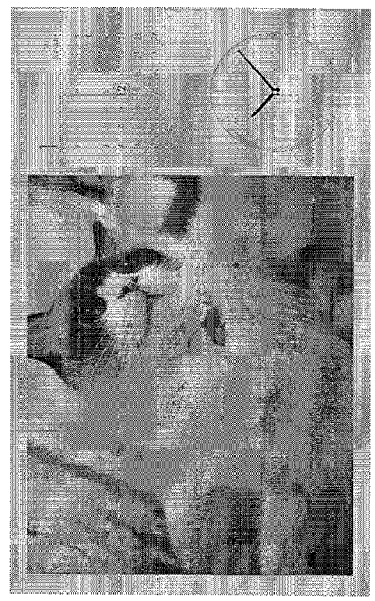
pink

FIG. 49

Functions of touch keys and guide displays (1)

Assignment of functions to keys and guide displays are as follows.

| Set conditions | ① | ② | ③ | ④ | ⑤ | ⑥ | ⑦ |
|---|---|---|---|---|---|---|---|
| | · While watching TV<br>· IPTV (full screen) | · While using the Internet (excluding while reproducing Internet moving image)<br>· While selecting content recorded in USB-HDD<br>· Calendar/clock layout changing screen<br>· (see conditions in lower table in Fig. 50)<br>· IPTV (portal)<br>· IPTV/VOD (with BML)<br>· IPTV/VOD (BML only) | · While displaying channel program | · While reproducing content recorded in USB-HDD<br>· While reproducing Internet moving image<br>· (see conditions in lower table in Fig. 50)<br>· IPTV/VOD (full screen) | · My Circle <main> | · My Circle <sub> | · My Circle Exchange of icons |

| Assignment of functions to keys and guide displays | | | | | | | |
|---|---|---|---|---|---|---|---|
| | My Circle | My Circle | Change broadcasting | My Circle | My Circle | My Circle | My Circle |
| | Channel program | | | Reproduction ↔ Pause | Sub | Main | (N/A) |
| | Channel selection | Selection | Selection | Stop<br>Cue | (N/A) | Exchange of icons | (N/A) |
| | Volume | | | Volume | Selection | Selection | Selection |
| | | Enter | Enter | | Enter | Enter | Enter |
| | Return | Return | Return | Return | Return | Return | Return |

| | |
|---|---|
| My Circle | Display/clear My Circle screen |
| Change broadcasting | Switch among terrestrial broadcasting/BS/110° CS on program guide |
| Selection (of My Circle) | Select My Circle |
| Main/sub | Change circle display |
| Exchange of icons | Switch services on My Circle |
| Layout | Change layout and color of calendar/clock |
| Display guide/no guide | Turn on/off guide display at lower side of calendar/clock |

※ Functions of other keys are equal to those of existing UI, such as remote control keys.

※ In ④, "pause" is displayed while reproducing moving image and "reproduction" is displayed while pausing.

※ Whether "reproduction ↔ pause", "stop", and "skip" in ④ are displayed or not is determined according to specification of VOD operation panel.

FIG. 50

Assignment of functions and guide displays (2)

| | ⑧ | ⑨ | ⑩ | ⑪ | ⑫ |
|---|---|---|---|---|---|
| Set conditions | ·(see conditions in lower table) | ·(see conditions in lower table) | ·Calendar/clock top screen | ·Remote control number switching screen | ·Condition not included in ①-⑪ |
| Assignment of functions to keys and guide displays | My Circle — My Circle | My Circle — My Circle | My Circle — My Circle | My Circle — My Circle | My Circle — My Circle |
| | Forward — △ | Selection — △ | (N/A) — △ | (N/A) — △ | (N/A) — △ |
| | Next — ▽ | — ▽ | Change layout — ▽ | Selection — ▽ | (N/A) — ▽ |
| | (N/A) — ▲ | Reproduction — ▲ | Display guide ↔ no guide — ▲ | (N/A) — ▲ | (N/A) — ▲ |
| | Volume — Vol +/− | Volume — Vol +/− | (N/A) — Vol +/− | Enter — ○ | (N/A) — ○ |
| | Return — ↩ | Return — ↩ | Return — ↩ | Return — ↩ | Return — ↩ |

※Items in ⑫ are displayed under conditions below
· Layer other than top layer of channel program
· Screen other than top screen and layout changing screen of calendar/clock

| | USB | | DLNA | |
|---|---|---|---|---|
| | ·While selecting photograph/music | ② | ·While selecting photograph/moving image/music<br>·While selecting server | ② |
| Photograph | ·While selecting folder | ② | ·While selecting folder | ② |
| | ·While selecting file | ② | ·While selecting file | ② |
| | ·While reproducing photograph | ⑧ | ·While reproducing photograph | ⑧ |
| Music | ·While selecting folder | ② | ·While selecting folder | ② |
| | ·While selecting file | ② | ·While selecting file | ② |
| | | | ·Music reproduction screen | ⑨ |
| Moving image | | | ·While selecting folder | ② |
| | | | ·While selecting file | ② |
| | | | ·While reproducing moving image | ④ |

FIG. 54

How to switch remote control numbers

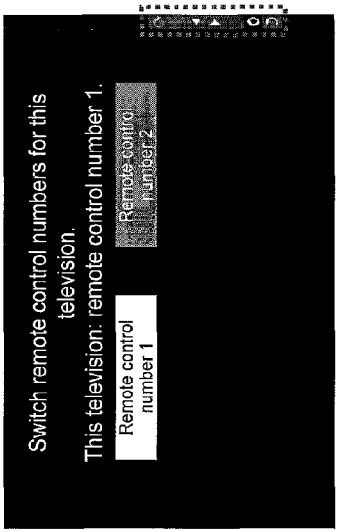

Since jog remote control has no hardware switch, remote control operation is sometimes not accepted. In such case, operation on main body is made.
<How to switch remote control numbers> (screen image is shown at right side)
① Press key at lowest position for 5 seconds while guide OSD for touch keys is not displayed.
② OSD for switching remote control numbers is displayed. User selects 1 or 2.

※ If no operation is made for 10 seconds, the screen returns to former one.

FIG. 55

Numeric panel  How to input

Background
Due to elimination of numeric keys from remote control, user is unable to enter numeral via remote control in situations which require numeric keys (such as data broadcasting and the Internet) other than channel selecting operations. This necessitates means for avoiding such a case.

Details
"Numeral" button is added to remote control, and screen is prepared which allows user to enter 12 numerals with use of jog, cursor keys, and enter key when pressing "Numeral" button. Operation of determining numeric key is equivalent to pushing numeric button.

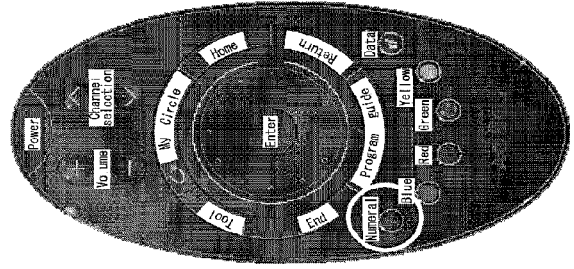

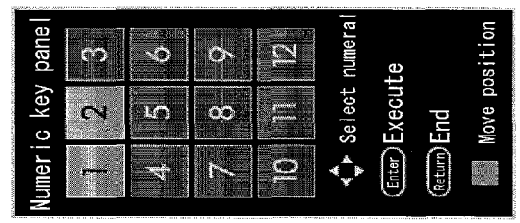

FIG. 57

1. Display position of numeric panel in case where user switches mode to numeric input mode Display position When numeric input button is pressed, numeric panel is initially displayed at lower right of screen.
When red key (under consideration) is pressed, position on screen is toggle-changed.
 Lower right of screen→press red key→lower left of screen→press red key→lower right of screen

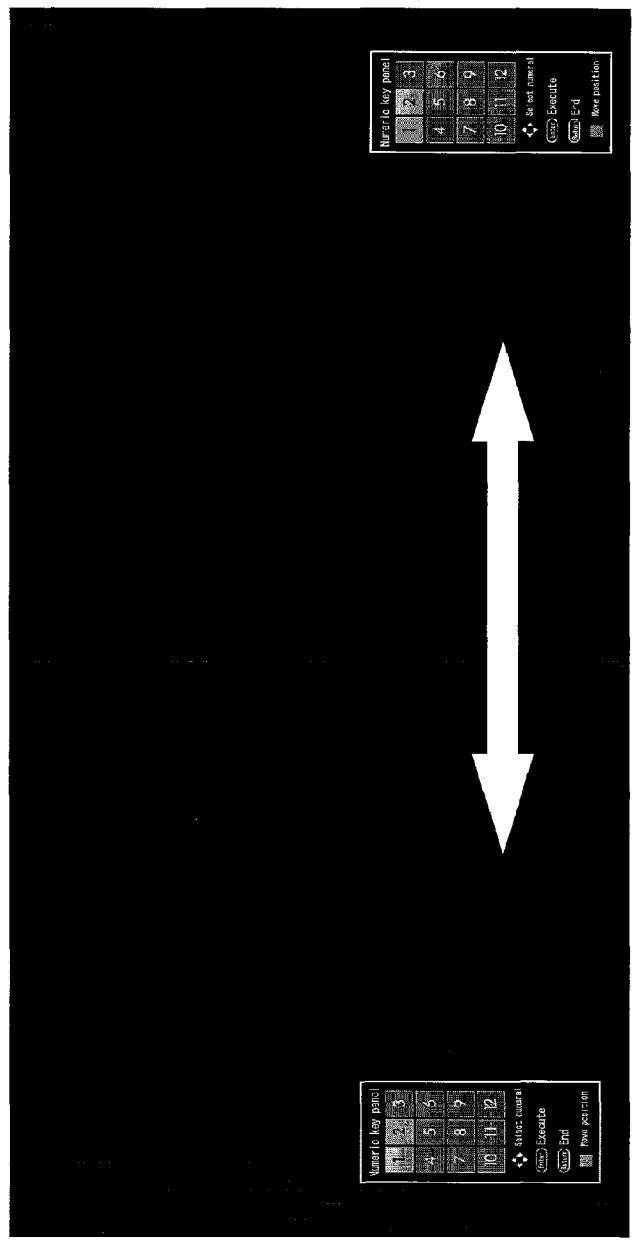

MENU SCREEN DISPLAY CONTROL METHOD AND DISPLAY CONTROL DEVICE FOR EXCHANGING ICONS OF A MENU BASED ON USER INSTRUCTION

CROSS REFERENCE

This application is a Continuation of co-pending application Ser. No. 14/111,481, filed on Oct. 11, 2013, which was filed as PCT International Application No. PCT/JP2012/059019 on Apr. 2, 2012, which also claims benefit to Japanese Patent Application No. 2011-091540 filed Apr. 15, 2011 and Japanese Patent Application No. 2011-286988 filed Dec. 27, 2011, all of which are hereby expressly incorporated by reference into the present application.

TECHNICAL FIELD

The present invention relates to a method for controlling display of a menu screen, by which method a display mode of a plurality of icons is controlled in a display device. The present invention further relates to a display control device.

BACKGROUND ART

In recent years, a television has been becoming high-functional, so that the television has an increased number of input source types, external connection terminals, and user operation menus. This requires a user to select a plurality of menu items so as to cause the television to display, on its television screen, content which the user desires to watch.

Not only a high-functional television set merely receives a broadcast wave and then displays an image, but also the high-functional television set has been used more and more as a display monitor of a moving image or a still image provided by a device on a home network or internet content. Since a user operation has been accordingly becoming complicated as described above, a user interface which is simple and less stressful is demanded.

The following Patent Literature 1 discloses an image display device capable of displaying a menu screen without interrupting an image displayed on a screen.

More specifically, as illustrated in FIG. 64, the image display device is configured such that an image to be displayed on a screen 100 of a display section is compressed and then displayed in a substantially central part of the display section as a small-sized screen 101, in a case where a menu button of a remote control transmitter is pressed. In a periphery of the small-sized screen 101, a menu screen 300 which is made up of a plurality of menu items a to h is displayed so as to surround the small-sized screen 101. One of the plurality of menu items a to h is displayed together with a cursor 400. The image display device stores an operation frequency of each of the plurality of menu items a to h. In accordance with the operation frequency of each of the plurality of menu items a to h, the plurality of menu items a to h on the menu screen 300 are rearranged.

Note that, in a case where a user presses a "NO" button of the remote control transmitter, the plurality of menu items a to h of the menu screen 300 are sequentially moved in a clockwise direction or a counterclockwise direction so that a desired one of the plurality of menu items a to h is moved to a position at which the cursor 400 is displayed.

Further, the following Patent Literature 2 discloses a display method and a display device each of which realizes, in an electronic apparatus which displays a menu screen, a display mode which allows a hierarchical structure and the like of the menu screen to be easily understood from a display.

More specifically, as illustrated in FIG. 65, in a case where an input state of the electronic apparatus is displayed by the menu screen, a ring 200 is displayed on a screen and a plurality of icons 201 to 205 are displayed at predetermined intervals on the ring 200. In a case where an operation of selecting an item on the menu screen is carried out, each of the plurality of icons 201 to 205 displayed on the ring 200 is rotated on the ring 200 while an order of arrangement of the plurality of icons 201 to 205 is being maintained. In a case where an operation of confirming the selected item on the menu screen is carried out, an input operation related to an icon displayed at a specific position on the ring 200 can be performed.

Note that, in this example, a ring 210 which indicates that there is a menu in a lower layer is provided with respect to the icon 201 indicated as "specific function", and the ring 210 is displayed around the icon 201 in a smaller diameter.

Furthermore, as illustrated in FIG. 66, the following Patent Literature 3 discloses a car navigation system including (i) menu item display means for displaying a plurality of menu items while arranging the plurality of menu items circularly on a display screen and (ii) menu item rotating means for rotating each of the plurality of menu items arranged in a circle clockwise or counterclockwise in response to a command supplied from an input unit. The menu item display means displays a menu item arranged at a specific position on the display screen as a selected item.

Moreover, the following Patent Literature 4 discloses an audio/video control system in which a plurality of devices are connected to a controller and an operation of each of the plurality of devices is controlled in response to a user's instruction given to the controller. On a touch panel display screen of the audio/image control system, a top screen is displayed upon activation of power. On the top screen, a plurality of content selecting buttons are displayed. Button names of these content selecting buttons are changeable with other button names that are not displayed on the top screen.

When replacing button names, the top screen is exchanged to a content-disposed screen. The content-disposed screen has (i) a TOP-selected-content display region in which names of a plurality of content selecting buttons which should be displayed on the top screen are displayed and (ii) a spare-content display region in which names of a plurality of spare-content selecting buttons which are prepared in advance in addition to the plurality of content selecting buttons are displayed.

CITATION LIST

Patent Literature 1

Japanese Patent Application Publication, Tokukai, No. 2001-215943 A (Publication Date: Aug. 10, 2001)

Patent Literature 2

Japanese Patent Application Publication, Tokukai, No. 2004-326189 A (Publication Date: Nov. 18, 2004)

Patent Literature 3

Japanese Patent Application Publication, Tokukai, No. 2000-283782 A (Publication Date: Oct. 13, 2000)

Patent Literature 4

Japanese Patent Application Publication, Tokukai, No. 2000-197158 A (Publication Date: Jul. 14, 2000)

Patent Literature 5

Japanese Patent Application Publication, Tokukai, No. 2006-217342 A (Publication Date: Aug. 17, 2006)

Technical Problem

However, according to the arrangements disclosed in Patent Literatures 1 through 3, no attention is paid to a problem that occurs in a case where content is displayed within a circular ring (circular orbit), on which menu items or icons are arranged, on a menu screen allowing a user to select a desired item.

For example, the menu screen is displayed in a case where a user who is watching TV wants to switch the content to another one. In this case, it is preferable to use a user interface which allows the user to select another content while continuously viewing a television program, as in Patent Literature 1.

However, Patent Literatures 2 and 3 neither disclose nor suggest that content is displayed simultaneously with the ring of icons.

Meanwhile, Patent Literature 1 discloses that (i) menu items are displayed as a frame of rectangles along four sides of a display screen and (ii) a television image is displayed in a reduced size inside the frame. However, since the menu items are disposed along the four sides of the display screen with no space therebetween, there is a problem that layout flexibility is extremely low.

In a case where the plurality of icons are disposed in a circle around a rectangular display region, layout restriction becomes strict from the perspective of spaces between icons and symmetry of the icons. Further, for example, the display shape of the menu item b shown in FIG. 64 is changed from a horizontally long shape to a vertically long shape as a result of change in position from (B) of FIG. 64 to (C) of FIG. 64. Accordingly, there is another problem that displayed as the menu items are texts at best which are not likely to be subject to an influence of a change in shape.

It is therefore difficult to display the icons arranged in a circle in Patent Literature 2 on the menu display screen of Patent Literature 1. It is still more difficult to display icons arranged in a circle so that they do not overlap a television image displayed in a reduced size. Further, each icon is generally accompanied with a text string which is indicative of a type etc. of the icon and which is made up of large characters for visibility for a user. It is therefore impossible to arrive, from the disclosures of Patent Literatures 1 through 3, at the idea of displaying icons in a circle which occupy large display spaces and which have various design shapes so that the icons circle around an image of content displayed in a region surrounded by the icons while not overlapping the image of the content.

According to the audio/video control system of Patent Literature 4, the top screen and the content-disposed screen are utterly different from each other in layout of buttons. Since there is no relevance in layout between the top screen and the content-disposed screen, a user is forced to search the content-disposed screen for a content selecting button, on the top screen, whose name is to be changed. Further, on the content-disposed screen, a large number of buttons are displayed which include (i) a plurality of content selecting buttons to be displayed on the top screen and (ii) a plurality of content selecting buttons to be switched with such content selecting buttons. This makes the screen even more complicated for a user.

The present invention was accomplished in view of the above problems, and an object of the present invention is to provide a technique for displaying a menu screen which allows a user to comfortably select a desired item in a multi-function display device.

Solution to Problem

In order to attain the above object, a method of the present invention for controlling display of a menu screen includes:

(1) the step A1 of displaying, on a content display region located in a central part of a display screen, a moving image or a still image which is content so that the content is displayed in a size smaller than the display screen; and (2) the step A2 of displaying, around the content display region, a plurality of icons in a circle so that the plurality of icons sequentially move to a specific position in accordance with a user's selecting operation while moving around the content display region without overlapping the content display region.

According to the method, an image of content which a user was watching before display of the menu screen is displayed in a reduced size without being hindered by a string of icons which move in a circle. This allows the user to comfortably carry out an icon selecting operation while continuously watching the image of the content.

Note that an icon in the present invention is made up of at least one of a pictorial symbol, a pictogram, a character, a drawing pattern, and a drawing or any combination of these.

In order to attain the above object, a method of the present invention for controlling display of a menu screen includes the steps of:

separately creating (1) first display data for displaying, on a content display region located in a central part of a display screen, a moving image or a still image which is content so that the content is displayed in a size smaller than the display screen, and (2) second display data for displaying, around the content display region, a plurality of icons in a circle so that the plurality of icons sequentially move to a specific position in accordance with a user's selecting operation while moving around the content display region without overlapping the content display region; and (3) displaying the menu screen by superimposing the first display data and the second display data.

According to the method, it is possible to produce an effect of simplifying a display data creation process and reducing a load applied to a CPU by separately creating first display data and second display data, in addition to the above effect of allowing a user to comfortably carry out an icon selecting operation while continuously watching the image of the content.

A display control device of the present invention includes:

(1) a first display processing section which creates first display data for displaying, on a content display region located in a central part of a display screen, a moving image or a still image which is content so that the content is displayed in a size smaller than the display screen;

(2) a second display processing section which creates second display data for displaying, around the content display region, a plurality of icons in a circle so that the plurality of icons sequentially move to a specific position in accordance with a user's selecting operation while moving around the content display region without overlapping the content display region; and (3) a third display processing section for creating display data of a menu screen on basis of the first display data and the second display data.

This also produces the effect described above for the method corresponding to this arrangement.

Advantageous Effects of Embodiment

According to the method and device of the present invention for controlling display of a menu screen, a content display region is provided in a central part of a display screen, and a plurality of icons are displayed in a circle around the content display region so as to sequentially move to a specific position in accordance with a user's selecting operation while moving around the content display region without overlapping the content display region It is therefore possible to produce an effect of allowing a user to comfortably carry out an icon selecting operation while continuously watching an image of content.

BRIEF DESCRIPTION OF DRAWINGS

FIG. 6 is an explanatory view showing icons displayed on a main screen of the My Circle screen and icons that can be selected on a sub screen.

FIG. 7 is an explanatory view showing a list of guide icons displayed on the My Circle screen shown in FIG. 5.

FIG. 9 is an explanatory view showing an example of how the monitor controls display on the My Circle screen.

FIG. 20 is an explanatory view showing a display state of the My Circle screen and a display state of the function menu in a case where Recommended Web registration is carried out on the My Circle screen.

FIG. 21 is an explanatory view for explaining (i) operations of selecting an icon of Favorite Web to be overwritten from a list and determining the icon of Favorite Web and (ii) an operation of displaying the list of the recommended websites in response to the determining operation, in a case where the Recommended Web registration is carried out on the My circle screen.

FIG. 22 is an explanatory view for explaining (i) an operation of displaying a title for confirmation and (ii) an operation of editing the title, at the Recommended Web registration on the My circle screen.

FIG. 23 is an explanatory view for explaining an operation of completing the Recommended Web registration and an operation of displaying a registration completion screen, at the Recommended Web registration on the My circle screen.

FIG. 24 is an explanatory view illustrating a display screen of the function menu displayed in a case where completion is instructed on the registration completion screen shown in FIG. 23.

FIG. 25 is an explanatory view showing a process of an icons exchanging operation on the My Circle screen.

FIG. 26 is an explanatory view showing a state of initial setting of icons displayed on the main screen and the sub screen which serve as the My Circle screen.

FIG. 27 is an explanatory view showing handling of the remote control and a change in a displayed screen of the display in accordance with the handling while the main screen is displayed in the icons exchange operation on the My Circle screen.

FIG. 28 is an explanatory view showing handling of the remote control and a change in a displayed screen of the display in accordance with the handling when determining an icon to be included into the main screen in the icons exchange operation on the My Circle screen.

FIG. 29 is an explanatory view showing handling of the remote control and a change in a displayed screen of the display in accordance with the handling when determining an icon to be excluded from the main screen in the icons exchange operation on the My Circle screen.

FIG. 30 is an explanatory view showing a display state of the display when the icons exchange operation on the My Circle screen is completed.

FIG. 31 is an explanatory view showing a case where an icon cannot be selected on the My Circle screen.

FIG. 36 is an explanatory view showing handling of the remote control for determining a website to be registered and a change of a displayed screen of the display accompanying the handling on the My Circle screen, in a case of registering a website in the Favorite Web.

FIG. 37 is an explanatory view showing an operation of displaying selection items for Favorite Web registration and an operation of displaying a registration list on the My Circle screen, in a case of registering a website in the Favorite Web.

FIG. 38 is an explanatory view showing an operation of displaying a title confirmation screen and an operation of displaying a title editing screen on the My Circle screen, in a case of registering a website in the Favorite Web.

FIG. 44 is an explanatory view showing a display example in a case where a background color of the calendar/clock screen is changed.

FIG. 49 is view showing a list of icons and guides displayed as the frame touch key guide in various scenes.

FIG. 50 is view showing a list of icons and guides displayed as the frame touch key guide in various scenes.

FIG. 54 is an explanatory view for explaining an operation of exchanging a remote control which is being used.

FIG. 55 is an explanatory view showing a display example of a numeric input panel displayed on the display screen and a numeral button provided on the remote control.

FIG. 57 is an explanatory view showing a display example in a case where the numeric input panel is displayed on the display screen.

Figure 1:
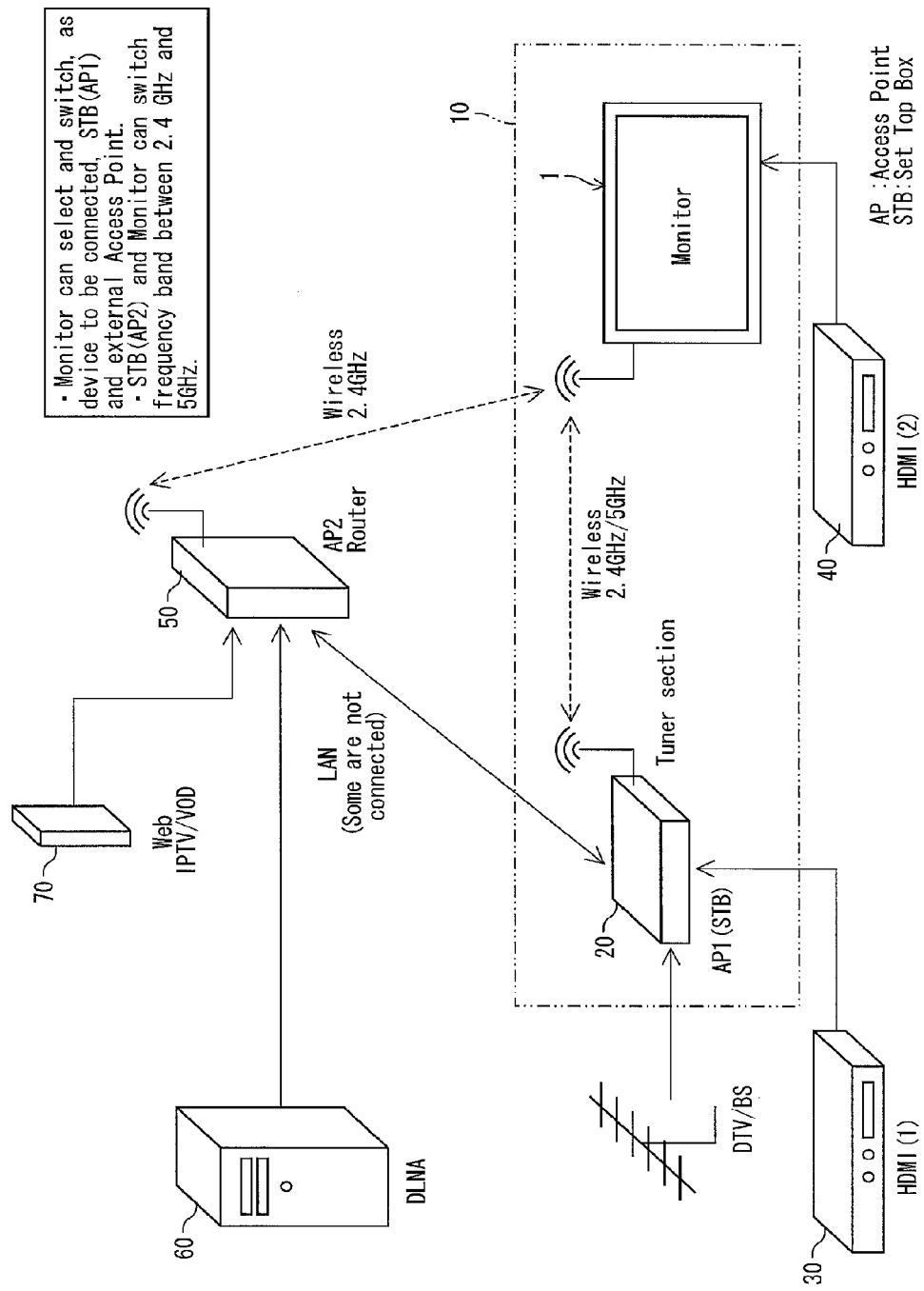
FIG. 1 is a block diagram showing a configuration of a television (television receiving system) of an embodiment of the present invention.

Note that "My Circle", "AQUOS", "Yahoo!", "acTVila", "hikari TV", "TSUTAYA", "Shufoo!", "YouTube", "HDMI", "COOKPAD", and "DLNA" illustrated in the drawings are registered trademarks.

Note that, in the drawings, "My Circle" is an example of a circular menu, "AQUOS.jp" is an example of a portal site, and "Yahoo!JAPAN" is an example of a search site. Further, each of "acTVila", "T's video rental", "hikari TV", and "TUTAYA TV" is an example of VOD (video on demand) service, and "YouTube" is an example of video hosting service. Further, "catalog department, paraly" is an example of an EC (electric commerce) site, "Shufoo!" is an example of an advertisement search site, and each of "ABC cooking" and "COOKPAD" is an example of a cooking recipe site.

Further, "my Picturetown on TV" is an example of image (especially, photo) sharing and storing service.

DESCRIPTION OF EMBODIMENTS

Configuration of Television

The following description will schematically discuss, with reference with FIGS. 1 and 2, a television receiving system 10 of the present embodiment (hereinafter referred to as a "television" for short).

FIG. 1 is a block diagram illustrating a configuration of the television 10. As illustrated in FIG. 1, the television 10 is a system including a monitor 1 and an STB (Set Top Box) 20.

In the STB 20, a tuner which receives terrestrial digital broadcasting and broadcasting satellite is embedded. The STB 20 encrypts, by the DRM (Digital Rights Management) technique, content obtained via the tuner, and then transmits encrypted data thus obtained to the monitor 1. On the other hand, the monitor 1 receives and decrypts the encrypted data from the STB 20. The STB 20 then displays the content thus obtained on a display (a display screen).

The STB 20 and the monitor 1 preferably communicate with each other by wireless (see FIG. 1). This allows an increase in degree of freedom of a place on which the monitor 1 is provided. That is, it is possible to provide the monitor 1 at any place in an area in which the monitor 1 can communicate with the STB 20 by wireless. Examples of a communication standard preferable for such wireless communication between the STB 20 and the monitor 1 include IEEE802.11 series.

Note that each of the STB 20 and the monitor 1 can be connected to an external device. For example, the STB 20 can record content on a recorder 30 connected to the STB 20, or encrypt and transmit, to the monitor 1, content reproduced by the recorder 30. Similarly, the monitor 1 can record content on a recorder 40 connected to the monitor 1, or display content reproduced by the recorder 40 on the display.

Note that examples of a communication standard preferable for wire communication between the STB 20 and the external device (the recorder 30 and the like) and between the monitor 1 and the external device (the recorder 40 and the like) include HDMI (High Definition Multimedia Interface) (registered trademark).

Note that the television 10 can employ a router 50 as illustrated in FIG. 1. The router 50 allows the television 10 to reproduce content obtained from a media server (DLNA (registered trademark) server) 60 connected to a home network or content obtained from a server of various kinds (a web server, an IPTV server, or a VOD server) 70 connected to the Internet. Obtainment of content from such servers can be carried out by the STB 20 via the router, or by the monitor 1 via the router 50.

The STB 20 and router 50 can communicate with each other by wire or wireless. This is because it is supposed that the STB 20 and the router 50 are provided at respective specific places and, therefore, there is no actual harm even in a case where the STB 20 and the router 50 are connected to each other by a LAN cable or the like. On the other hand, the monitor 1 and the router 50 preferably communicate with each other by wireless. This allows an increase in degree of freedom of a place on which the monitor 1 is provided. Examples of a communication standard preferable for such wireless communication between the monitor 1 and the router 50 includes IEEE802.11 series.

Figure 2:
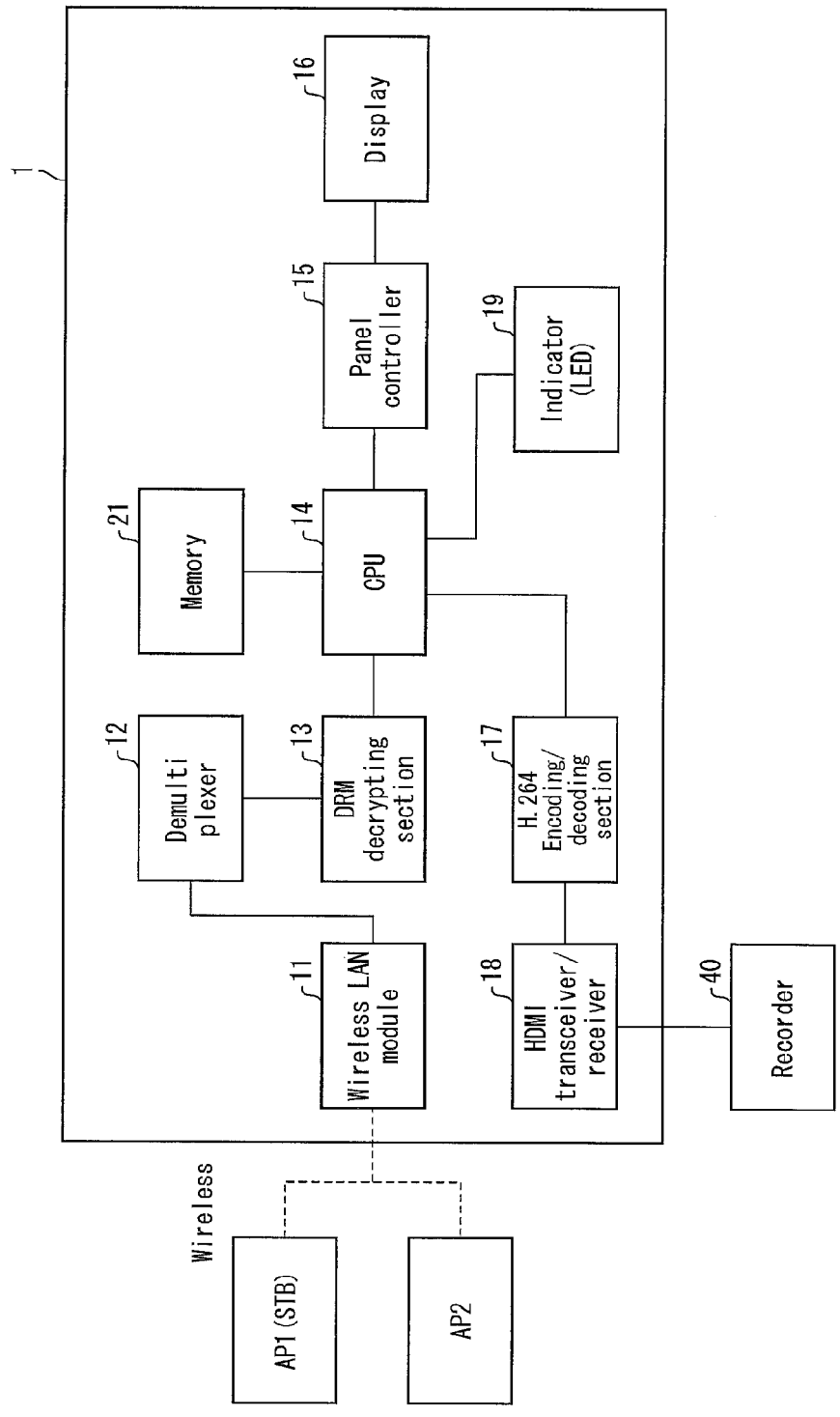
FIG. 2 is a block diagram showing a configuration of a monitor provided in the television of FIG. 1.

FIG. 2 is a block diagram illustrating a configuration of the monitor 1 provided in the television 10. As illustrated in FIG. 2, the monitor 1 includes a wireless LAN module 11, a demultiplexer 12, a DRM decrypting section 13, a CPU 14, a panel controller 15, a display 16, an H.264 encoding/decoding section 17, an HDMI transceiver/receiver 18, and an indicator 19.

The wireless LAN module 11 is a communication interface for wireless communication. The wireless LAN module 11 supplies a received signal to the demultiplexer 12. The demultiplexer 12 separates the encrypted data from the received signal. The encrypted data separated by the demultiplexer 12 is supplied to the DRM decrypting section 13. The DRM decrypting section 13 obtains a video signal by decrypting the encrypted data.

The video signal obtained by the DRM decrypting section 13 is supplied to the CPU 14. The CPU 14 processes video represented by the video signal by superimposing OSD (On-Screen Display) on the video, carrying out image quality correction (such as gamma curve control and contrast control), and the like. The functions of the CPU 14 will be specifically described later. The video signal processed by the CPU 14 is supplied to the panel controller 15. The panel controller 15 drives, for example, a liquid crystal panel which constitutes the display 16 in accordance with the processed video signal.

The CPU 14 also supplies the video signal obtained by the DRM decrypting section 13 to the H.264 encoding/decoding section 17, in a case where content which is being reproduced by the monitor 1 is recorded on the recorder 40. The H.264 encoding/decoding section 17 obtains encoded data by encoding the video signal. The encoded data obtained by the H.264 encoding/decoding section 17 is supplied to the HDMI transceiver/receiver 18. The HDMI transceiver/receiver 18 transmits the encoded data to the recorder 40.

On the other hand, in a case where content which is being reproduced by the recorder 40 is displayed on the monitor 1, the HDMI transceiver/receiver 18 receives the encoded data from the recorder 40. The H.264 encoding/decoding section 17 obtains a video signal by decoding the encoded data. The video signal obtained by the H.264 encoding/decoding section 17 is supplied to the panel controller 15 via the CPU 14. The panel controller 15 drives the liquid crystal panel, which constitutes the display 16, in accordance with the video signal.

(Function of Monitor)

Figure 3:
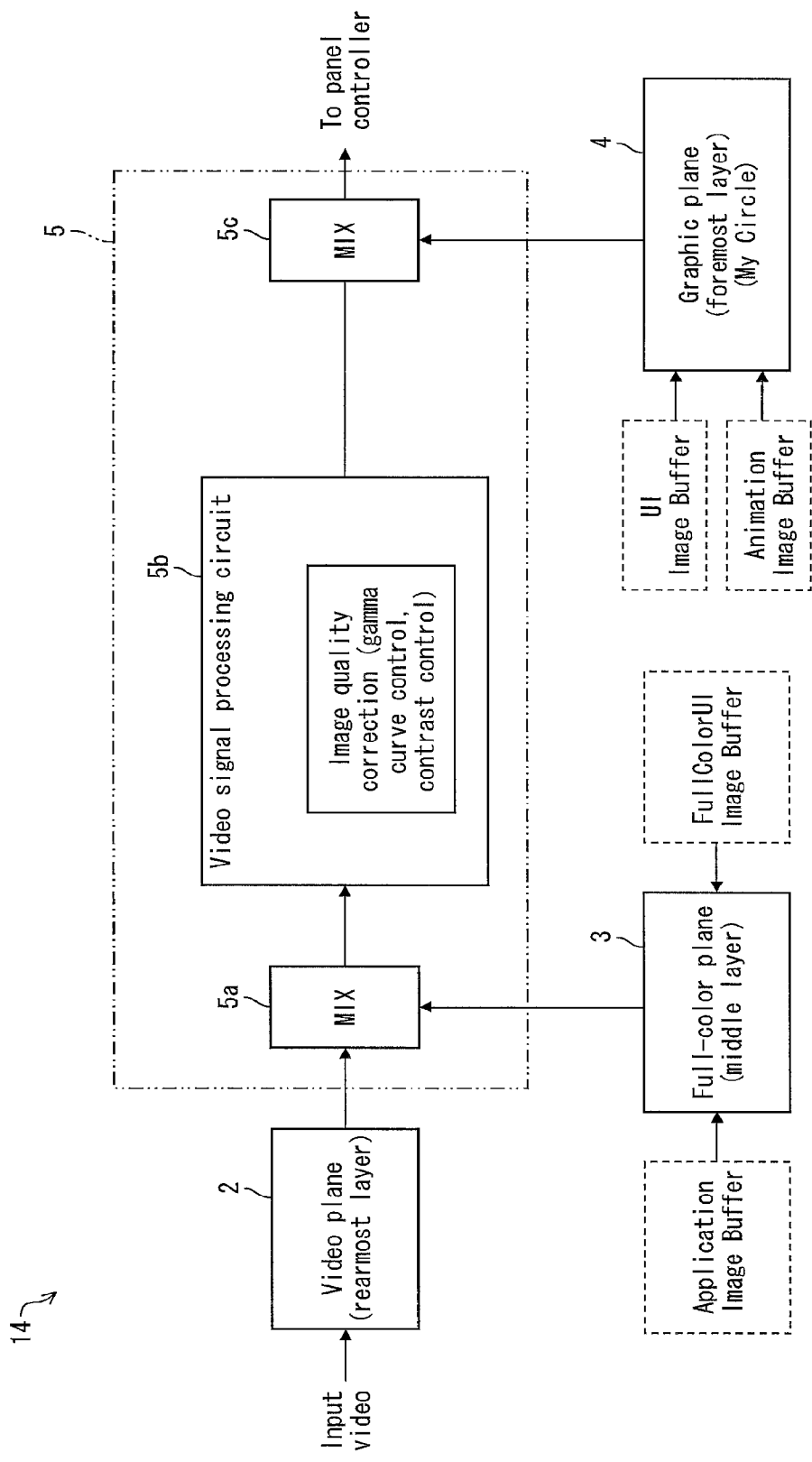
FIG. 3 is a function block diagram showing a function of a CPU provided in the monitor of FIG. 2.
Figure 4:
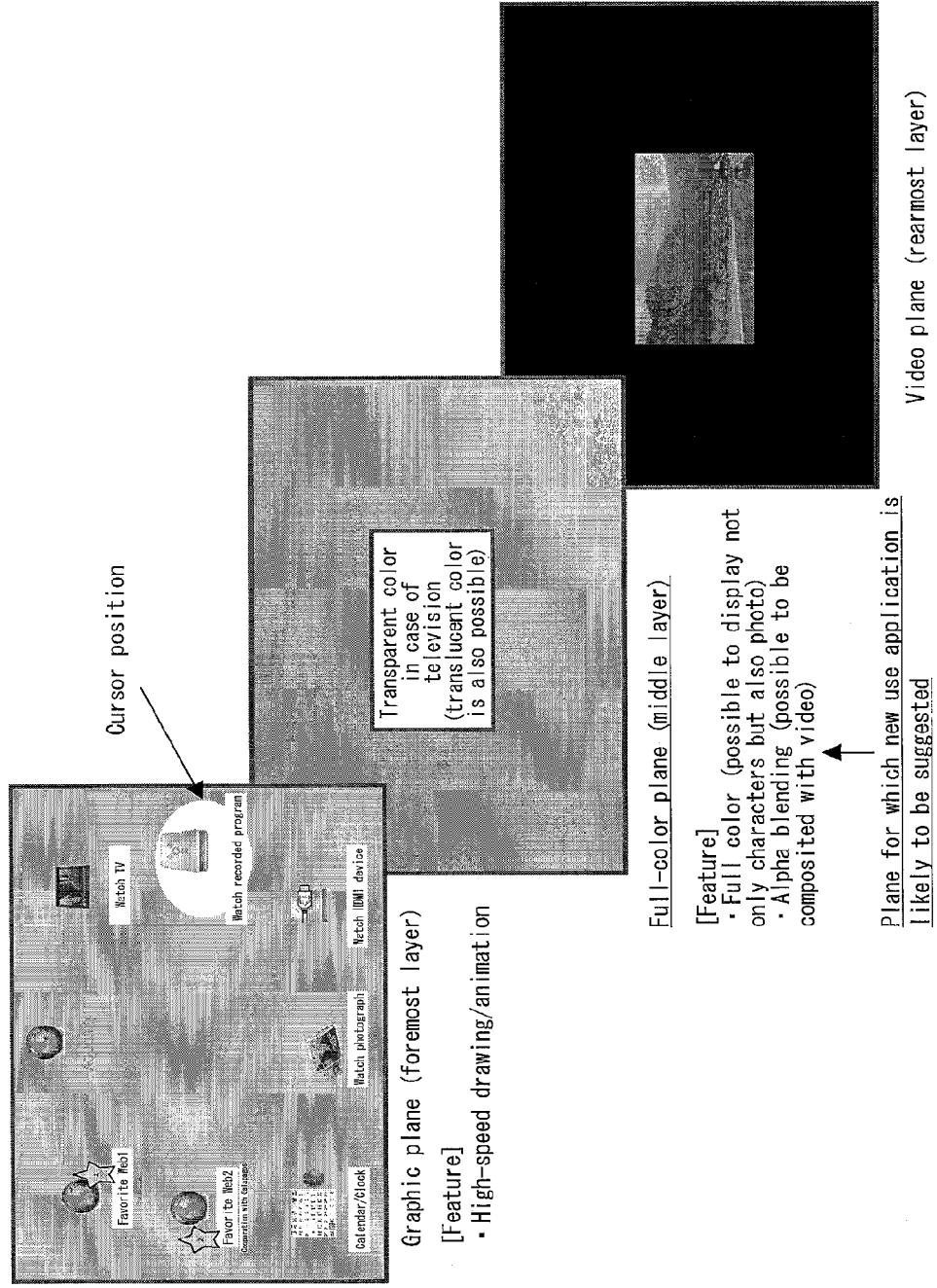
FIG. 4 is a view showing a configuration of a My Circle screen displayed on the monitor.

Next, the following description will discuss, with reference to FIGS. 3 to 4, the functions of the CPU 14 of the monitor 1.

FIG. 3 is a function block diagram illustrating, as a block, each of the functions of the CPU 14 of the monitor 1 (see FIG. 2). FIG. 4 is a view illustrating a My Circle (circular menu) screen (menu screen) created by the CPU 14 of the monitor 1.

As illustrated in FIG. 3, the monitor 1 includes a video plane generating section 2 (first display processing section), a full-color plane generating section 3 (fourth display processing section), a graphic plane generating section 4 (second display processing section), and a display data generating section 5 (third display processing section). The display data generating section 5 includes a first mixer 5a, a video signal processing circuit 5b, and a second mixer 5c. FIG. 3 illustrates buffers (an application image buffer, a full-color UI image buffer, a UI image buffer, and an animation image buffer) together with the blocks corresponding to the respective functions of the CPU 14, in each of which buffers various sets of data referred to by the CPU 14 are stored.

The following description will discuss the functions carried out by the respective sections of the CPU 14 illustrated in FIG. 3 so as to realize display of the My Circle screen illustrated in FIG. 4.

The video plane generating section 2 generates a video plane (first display data) by scaling video (hereinafter referred to as an "input video", and referred to as "content" in claims) supplied from the DRM decrypting section 13 (see FIG. 2)

The video plane is a layer which can be displayed in full color, and includes the input video in a small size in the central part of the video plane (see FIG. 4). The input video on the video place is variable in size.

The full-color plane generating section 3 generates a full-color plane (third display data) with the use of image data (JPEG data and the like) read out from the full-color UI image buffer.

The full-color plane is a layer which can be displayed in full color and which focuses on improving color development rather than high-speed drawing. Therefore, the full-color plane is suitable for displaying a fine and high definition image such as a photo. Further, the central part of the full-color plane is transparent or semi-transparent (see FIG. 4). The image data used to generate the full-color plane and a region of the full-color plane which region is made transparent is variable in size.

Note that a region of the video plane in which region the input video is included (content display region) and the region of the full-color plane, which region is transparent, coincide with each other in a case where theses layers are superimposed.

The display data generating section 5 creates display data of the menu screen by superimposing at least the video plane and a graphic plane (described later). Further, by sandwiching the full-color plane between the video plane and the graphic plane, the display data generating section 5 allows an increase in degree of freedom of customization of the menu screen by a user and also allows the display data of the menu screen which has excellent visual quality to be created. The following description will more specifically discuss the display data generating section 5.

The first mixer 5a superimposes the full-color plane generated by the full-color plane generating section 3 on the video plane generated by the video plane generating section 2. Examples of a method for superimposing the full-color plane on the video plane include alpha blending.

The video signal processing circuit 5b carries out the image quality correction with respect to an output video (video obtained by superimposing the full-color plane on the video plane) from the first mixer 5a. Examples of the image quality correction carried out by the video signal processing circuit 5b include gamma curve control and contrast control.

The graphic plane generating section 4 generates the graphic plane (second display data) with the use of image data read out from the UI image buffer. The graphic plane is a layer in which the number of colors is restricted (for example, the number of colors is restricted to 256) so as to enable high-speed drawing. On the graphic plane, various kinds of objects which constitute a UI (user interface) are arranged.

In a case where the My Circle screen is displayed, a plurality of icons are arranged, on the graphic plane, in a circle around the input video (see FIG. 4). For the My Circle screen, an animation is employed with which the plurality of icons sequentially move to a specific position in accordance with a user's selecting operation with respect to the plurality of icons while circling around the input video without overlapping the input video. Such animation is also realized by the graphic plane generating section 4.

Since the display screen is constituted by a plurality of planes (layers) having respective different features as described above, it is possible to realize a moving image having both smooth movement and an excellent visual quality like a photograph even in a case where a simply configured chip, that is, a chip having a relatively low specification (e.g., integrated circuit) is employed.

The second mixer 5c generates a video signal (the display data of the menu screen) for displaying the My Circle screen, by superimposing the graphic plane generated by the graphic plane generating section 4 on an output video from the video signal processing circuit 5b. The video signal generated by the second mixer 5c is supplied to the panel controller 15 (see FIG. 2).

According to the above configuration, it is possible to generate video having a three-layered structure including the video plane, which is a rearmost layer, the full-color plane, which is a middle layer, and the graphic plane, which is a foremost layer (see FIG. 4). More specifically, it is possible to generate video having a three-layered structure in which (i) an OSD video having a two-layered structure including the graphic plane and the full-color plane is superimposed on (ii) the video plane including the input video. The graphic plane is a plane including the various kinds of objects which constitutes the UI (according to the My Circle screen, the plurality of icons arranged around the input video). The full-color plane is a plane serving as a background of the graphic plane. With this configuration, it is possible to obtain the OSD video including a high-speed animation while keeping a wide variety of color representations.

Note that FIG. 3 illustrates the display data generating section 5 configured such that the video signal processing circuit 5b, provided in a latter stage of the first mixer 5a, carries out the image quality correction with respect to the output video from the first mixer 5a. However, the configuration of the display data generating section 5 is not limited to such. That is, the display data generating section 5 can be configured such that the video signal processing circuit 5b, provided in a latter stage of the video plane generating section 2, carries out the image quality correction with respect to an output video from the video plane generating section 2, or such that the video signal processing circuit 5b, provided in a latter stage of the second mixer 5c, carries out the image quality correction with respect to an output video from the second mixer 5c. Alternatively, the video signal processing circuit 5b can be omitted.

Further, according to the present embodiment, the function of each of the sections is realized by a software configuration by use of the CPU 14. However, the present invention is not limited to such. That is, the function of each of the sections can be realized by a hardware configuration by use of an IC or the like. Note further that, according to the present embodiment, the monitor 1 carries out the function of each of the sections. However, the function of each of the sections can be carried out by the STB 20 (see FIG. 1).

(My Circle Screen)

Figure 5:
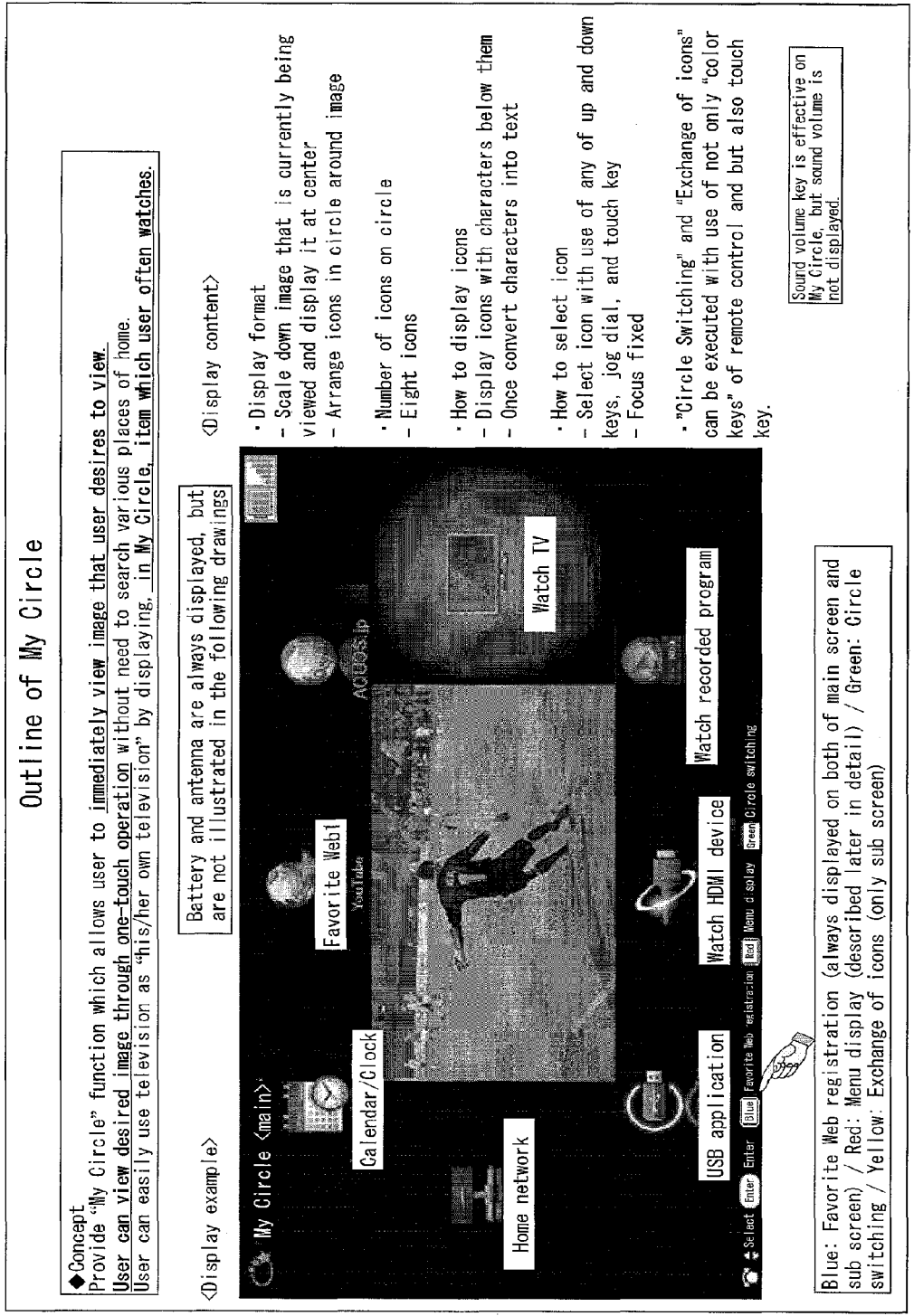
FIG. 5 is an explanatory view showing a display example of the My Circle screen displayed on the monitor.

FIG. 5 is an explanatory view illustrating a display example of the My Circle screen displayed on the monitor 1. The My Circle screen is a menu screen allowing a user to view a type of an operation in a case where the user desires to select the type of the operation which the user cause the television 10 to carry out. The user can retrieve and display the My Circle screen by giving an instruction via a remote control belonging to the television 10 (described later) whenever necessary.

According to the My Circle screen, the full-color plane (middle layer) which displays, for example, a black background image is superimposed on the video plane (rearmost layer) which displays, for example, a video (moving image) of a soccer game as content, and the graphic plane (foremost layer) which displays the plurality of icons to be arranged in a circle around the content display region of the video plane is further superimposed on the full-color plane.

In a case where the My Circle screen is retrieved by the user's instruction, a main screen (first menu screen) is first displayed. The My Circle screen is configured such that the main screen (first menu screen) on which a combination of icons of a first group (specific icons) is displayed as the plurality of icons (for example, eight icons) can be replaced with a sub screen (second menu screen) on which a combination of icons of a second group (specific icons) are displayed as the plurality of icons. Further, such icons can be exchanged with each other between the main screen and the sub screen (described later).

With this configuration, it is possible to display, in a circle, a combination of icons which the user often selects or which the user is recommended to select, in a case where the user gives an instruction to display the My Circle screen. This allows the user to comfortably carry out the operation of selecting a desired item.

The plurality of icons are displayed so that the plurality of icons sequentially move in accordance with the user's selecting operation with respect to the plurality of icons while circling around the content display region without overlapping the content display region. Therefore, the user can continuously view content without being interrupted by the plurality of icons even while selecting a menu item.

According to an example of FIG. 5, a position at a right side of the content display region in the center is a focus position (specific position) at which the user selects a specific icon and determines the selection. An icon moved to the focus position is highlighted. For example, it is possible to highlight the icon by changing luminance or a color of a region around the focus position on the full-color plane which displays the black background image.

According to the main screen illustrated in FIG. 5, an icon indicated by "Watch TV" is highlighted. From the icon indicated by "Watch TV", the following icons are displayed clockwise: an icon indicated by "Watch recorded program"; an icon indicated by "Watch HDMI device"; an icon indicated by "USB Application"; an icon indicted by "Home Network"; an icon indicated by "Calendar/Clock"; an icon indicated by "Favorite Web 1"; and an icon indicated by "AQUOS.jp".

As illustrated in FIG. 5, characters describing a function, a type of content, a display content, and the like assigned to each of the plurality of icons are displayed under the each of the plurality of icons. FIG. 6 illustrates descriptions of the icons displayed on the main screen and descriptions of the icons that can be selected on the sub screen.

According to the descriptions of the icons illustrated in FIG. 6, the icon of "AQUOS.jp", which is one of the icons, allows the television 10 to directly connect to a portal site exclusive for AQUOS (registered trademark) which portal site is provided by Sharp Corporation (a server with which the television 10 can exclusively communicate). Each of icons indicated by "Favorite Web" corresponds to a bookmark of the Internet browser of a personal computer. In a case where one of such icons is selected, the television 10 directly connects to an Internet website of a bookmark set in the selected icon. Note that, in the icons of "Favorite Web", bookmarks which a manufacturer of the television 10 recommends are initially set. However, bookmarks of websites to which the user desires to access on the Internet can be set in the respective icons of "Favorite Web" by a bookmark registration function exclusive to My Circle.

Note that, according to the present embodiment, eight icons are displayed on each of the main screen and the sub screen. However, the number of the plurality of icons can be changed as appropriate in accordance with a size or the like of the monitor 1. Further, icons for guide display as illustrated in FIG. 7 can be prepared as icons that can be selected on the main screen and the sub screen. The icons for the guide display can be configured such that a function indicated by one of the icons for the guide display is carried out by (i) assigning, to the icons for the guide display, part of operation buttons provided on a body of the remote control or operation keys provided on a part of a front surface of the display panel, respectively and (ii) operating a corresponding one of the operation buttons or the operation keys.

Further, a My Circle type is displayed, for example, in an upper left part of the My Circle screen so as to indicate that the current type of the My Circle screen is the main screen or the sub screen.

Further, key (button) guidance is displayed in a lower part of the My Circle screen which key guidance shows the guide display and a content of an instruction assigned to each of input keys (buttons) of the following remote control (see FIG. 5).

Note that the user's instruction to, for example, switch the My Circle screen between the main screen and the sub screen, move icons from/to the main screen to/from the sub screen, return to a home menu screen, and the like can be inputted via each of the remote control and a touch ley (described later).

Further, display of the key guidance or display of a My Circle menu (described later) can be carried out with the use of the full-color plane (middle layer) which displays a background image.

(Example Configuration of Remote Control)

Figure 8:
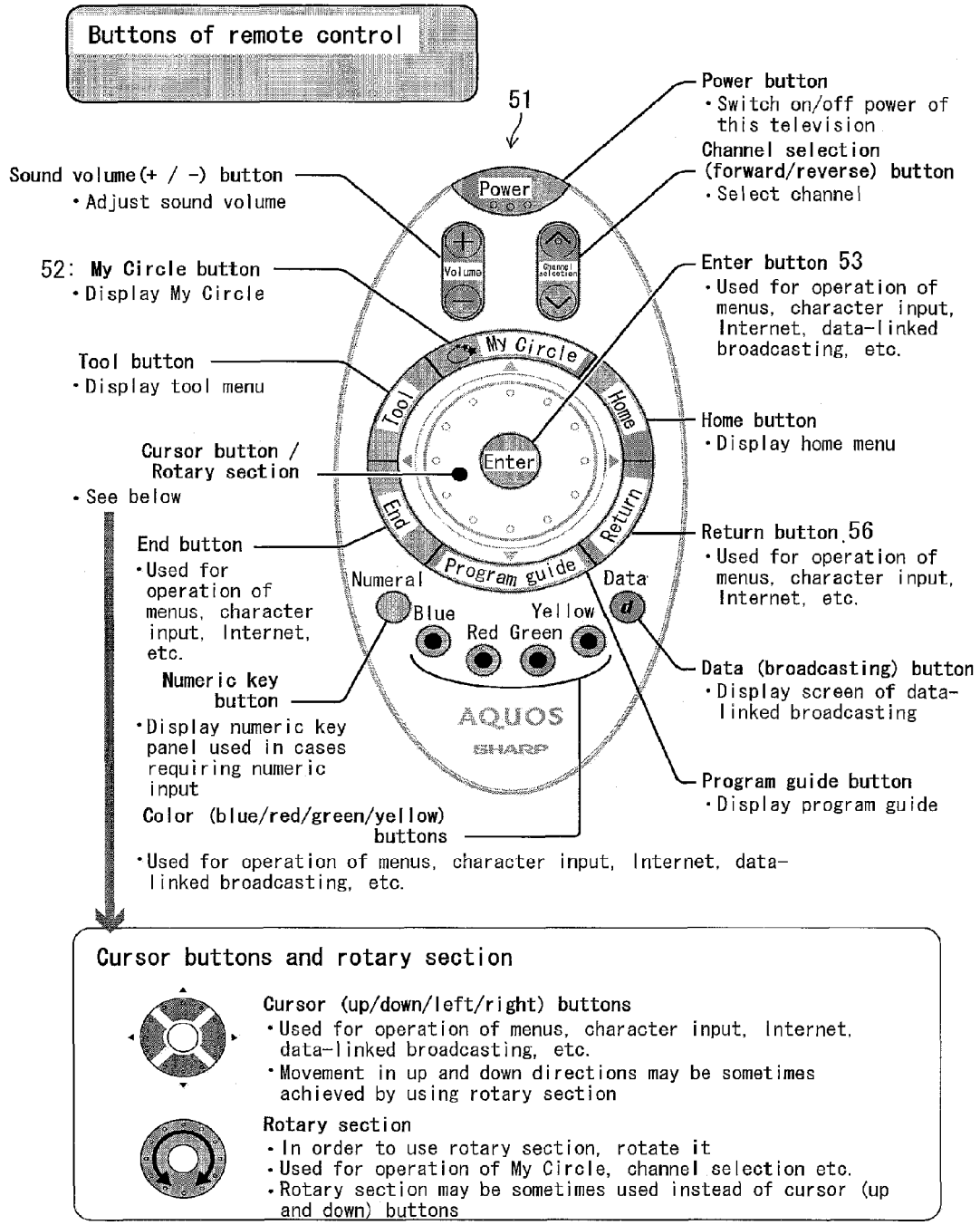
FIG. 8 is an explanatory view showing an example of a remote control used for the monitor shown in FIG. 2.

According to the television 10, the user can give an instruction by carrying out a direct input operation with respect to the monitor 1 via the touch key or by carrying out an input operation via the remote control. FIG. 8 is an explanatory view illustrating an example of a remote control 51 having a various types of input keys (buttons). As illustrated in FIG. 8, the remote control 51 includes a My Circle button 52 which causes the My Circle screen to be displayed, an enter button 53 which causes various operations and the like to be determined, a return button 56, a cursor button which causes a cursor displayed on the display screen of the display 16 to move, a dial (rotary part) which causes the plurality of icons displayed on the My Circle screen to move clockwise or counterclockwise along a rotational orbit.

Note that the circling of the plurality of icons displayed on the My Circle screen can be carried out by use of up and down buttons or right and left buttons serving as the cursor button.

(Example 1 of Display Control of My Circle Screen)

Next, the following description will discuss a method for controlling display of the My Circle screen by the monitor 1. FIG. 9 is an explanatory view illustrating an example of how monitor controls the My Circle screen. FIG. 9 illustrates how the display screen of the display 16 sequentially changes from the first screen to the fifth screen in a process of display of the My Circle screen.

According to the first screen (leftmost screen), the video plane (rearmost layer) which displays, for example, the image of the content (soccer game) illustrated in FIG. 5 is displayed in a full size on the display screen. In this state, a colorless and transparent image is displayed on each of the full-color plane (middle layer) and the graphic plane (foremost layer). In a case where the My Circle button 52 of the remote control 51 is operated, the display screen sequentially changes from the first screen to the fifth screen.

According to the second screen, the video of the content is reduced in size to a size of the substantially central region of the video plane (the content display region). In this case, a successive change in size from a full size to a reduced size can be shown to the user.

According to the third screen, the background image is displayed around the content display region. The background image is displayed on the full-color plane (middle layer). Note that a colorless and transparent image is displayed in the central region of the full-color plane (middle layer) which central region corresponds to the content display region.

According to the fourth screen, the plurality of icons move toward the center of the display screen from a periphery of the display screen. By thus displaying movement of the plurality of icons with an animation by use of the graphic plane (foremost layer), it is possible to provide a novel user interface.

According to the fifth screen, the plurality of icons are displayed in a circle around the content display region, so that the My Circle screen is displayed.

(Example 2 of Display Control of My Circle)

Figure 10:
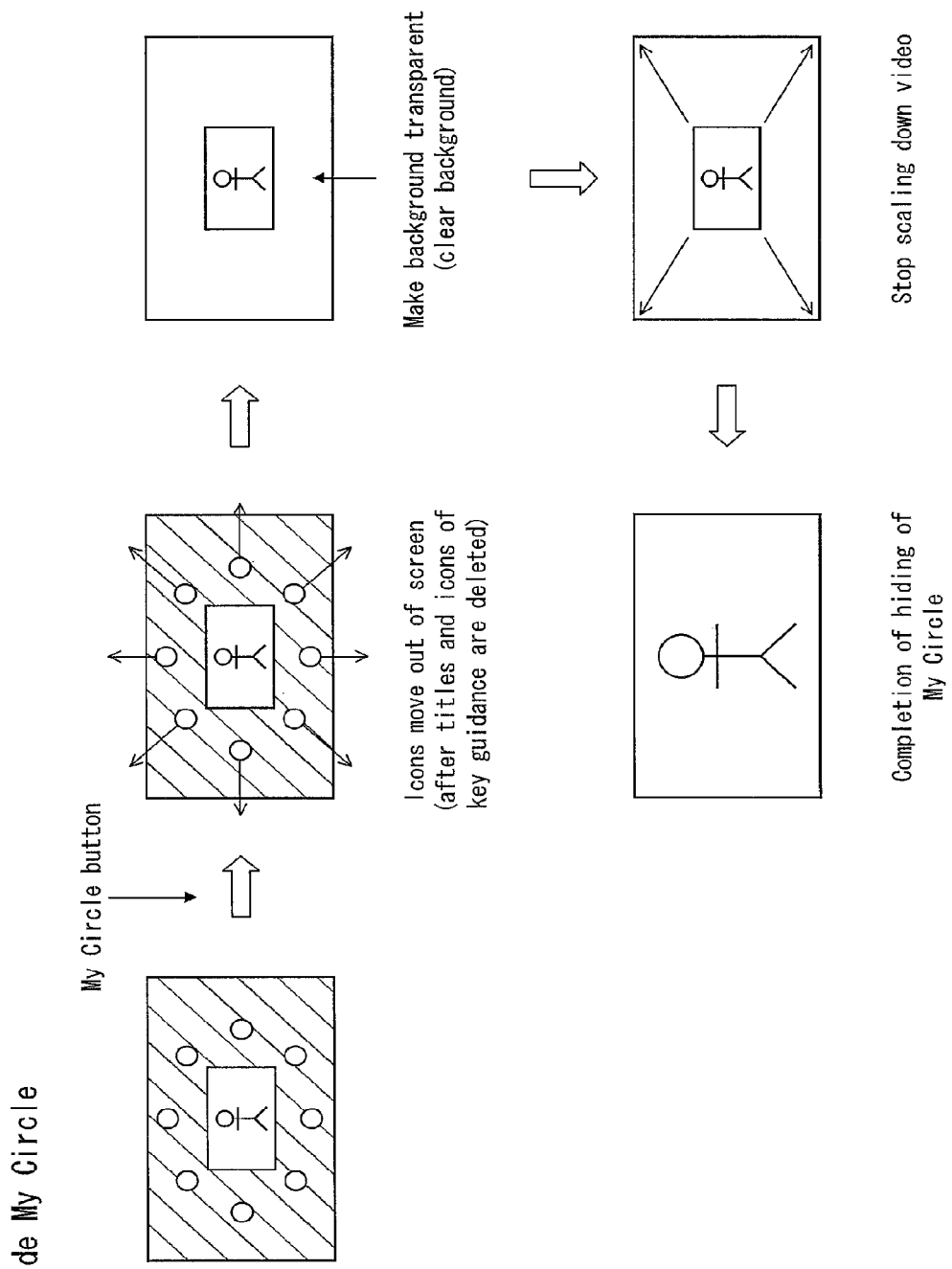
FIG. 10 is an explanatory view showing an example of display control for hiding the My Circle screen.

FIG. 10 is an explanatory view illustrating an example of display control for hiding (deleting) the My Circle screen. FIG. 10 illustrates how the display screen of the display 16 sequentially changes from the first screen to the fifth screen in a process of hiding the My Circle screen.

According to the first screen (leftmost screen), the My Circle screen is displayed. In this state, in a case where any of the My Circle button 52, the return button 56, a home button which causes a home menu to be displayed, and the like of the remote control 51 is operated, the display screen changes from the first screen to the fifth screen. Note that My Circle screen can be controlled in such a manner that the key guidance is displayed in a case where the My Circle button 52 is operated, and then the hiding of the My Circle screen is started in a case where icon deletion is selected in accordance with the key guidance.

Figure 16:
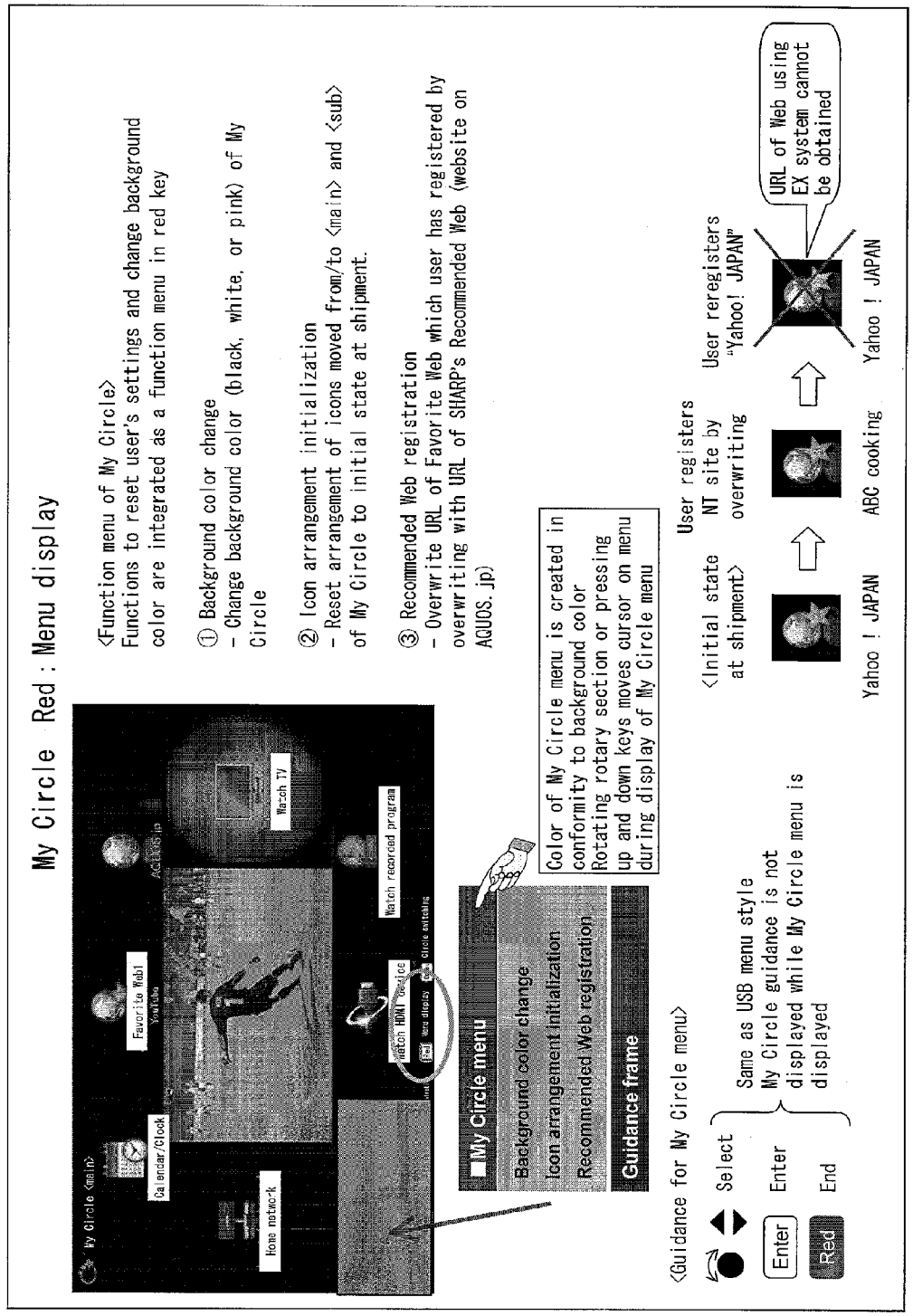
FIG. 16 is an explanatory view showing a display state of a function menu on the My Circle screen shown in FIG. 5.

Further, the My Circle screen can be configured such that, in a case where an instruction to hide the My Circle screen is given, the My Circle menu is displayed as illustrated in FIG. 16. In this case, the hiding of the My Circle screen is started in a case where the user (i) selects, with the use of the cursor button of the remote control 51, an item which is one of items of the My Circle menu and which instructs the hiding of the My Circle screen and then (ii) presses the enter button 53. Note that, in a case where the My Circle menu is displayed, the key guidance is not necessary to be displayed.

According to the second screen, the plurality of icons radially move toward an outside of the display screen from a periphery of the content display region.

According to the third screen, the background image around the content display region becomes transparent after the plurality of icons disappear from the display screen. In this case, the graphic plane (foremost layer) which displayed the plurality of icons is also transparent.

According to the fourth screen, the image of the content which is displayed in a reduced size is enlarged to a size of the entire display screen. Also in this case, a successive change in size from a reduced size to a full size can be shown to the user.

According to the fifth screen, only the image of the content is displayed in a full size, so that the hiding of the My Circle screen is completed.

(Switching of My Circle Screen)

Figure 11:
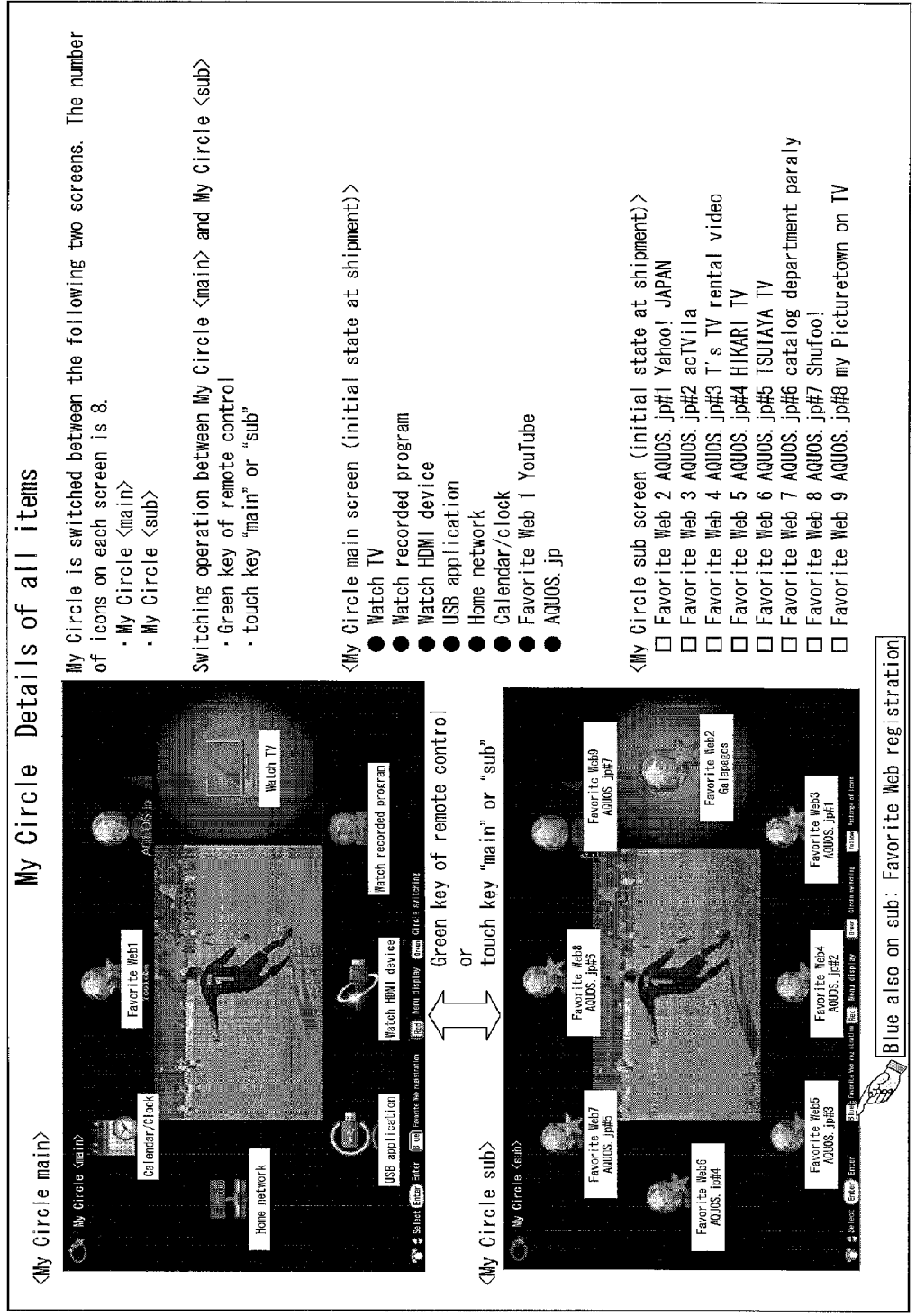
FIG. 11 is an explanatory view showing display examples of the main screen and the sub screen.

The monitor 1 is configured such that the My Circle screen can be switched between the main screen and the sub screen. FIG. 11 is an explanatory view illustrating display examples of the main screen and the sub screen. Switching between the main screen and the sub screen is carried out by operating, for example, a green key of the remote control 51 or "Main" or "Sub" of the touch key.

Figure 12:
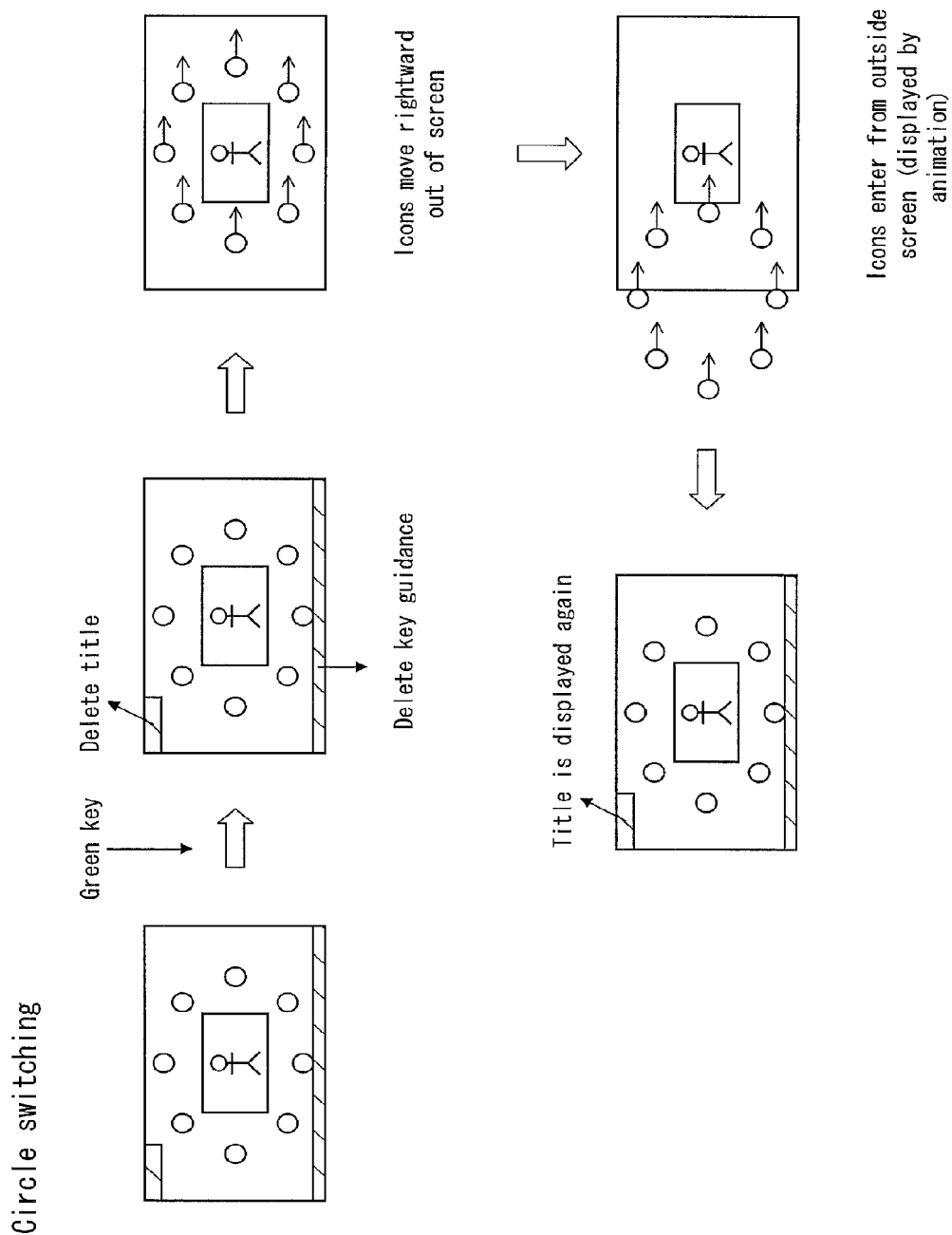
FIG. 12 is an explanatory view showing an example of display control for switching between the main screen and the sub screen.

FIG. 12 is an explanatory view illustrating an example of display control for switching the My Circle screen between the main screen and the sub screen. FIG. 12 illustrates how the display screen of the display 16 changes from the first screen to the fifth screen in a process of switching the My Circle screen between the main screen and the sub screen. The following description will discuss, as an example, switching of the My Circle screen from the main screen to the sub screen.

According to the first screen (leftmost layer), the main screen is displayed. In this case, the My Circle type is displayed, for example, in an upper left part of the display screen so as to indicate that the current type of the My Circle screen is the main screen. Further, in a lower part of the display screen, the foregoing key guidance described above is displayed. In this state, in a case where a predetermined key (e.g., the green key) which causes the main screen and the sub screen to be switched of the remote control 51 is for example operated, the display screen changes from the first screen to the second screen.

According to the second screen, display of the My Circle type which indicates that the current My Circle screen is the main screen and the key guidance are deleted. Thereafter, the display screen changes from the second screen to the third screen.

According to the third screen, the plurality of icons which are main icons displayed on the main screen move, for example, rightward and sequentially disappear from a right side of the display screen. Thereafter, the display screen changes to the fourth screen.

According to the fourth screen, the plurality of icons which are sub icons sequentially come into the display screen from a side of the display screen which side is different from a side from which the plurality of icons which are main icons disappeared, e.g., a left side of the display screen opposite to the right side, as a school of swimming fish with an animation. Thereafter, the plurality of icons which are sub icons move to respective predetermined positions. Accordingly, the display screen changes to the fifth screen.

According to the fifth screen, the plurality of icons which are sub icons are displayed in a circle around the content display region. As a result, display of the sub screen is completed. The My Circle type is displayed, for example, in the upper left part of the display screen so as to indicate that the current My Circle screen is the sub screen. Further, the guide display and the key guidance are displayed in the lower part of the display screen.

(Operation of Selecting Icon)

Figure 13:
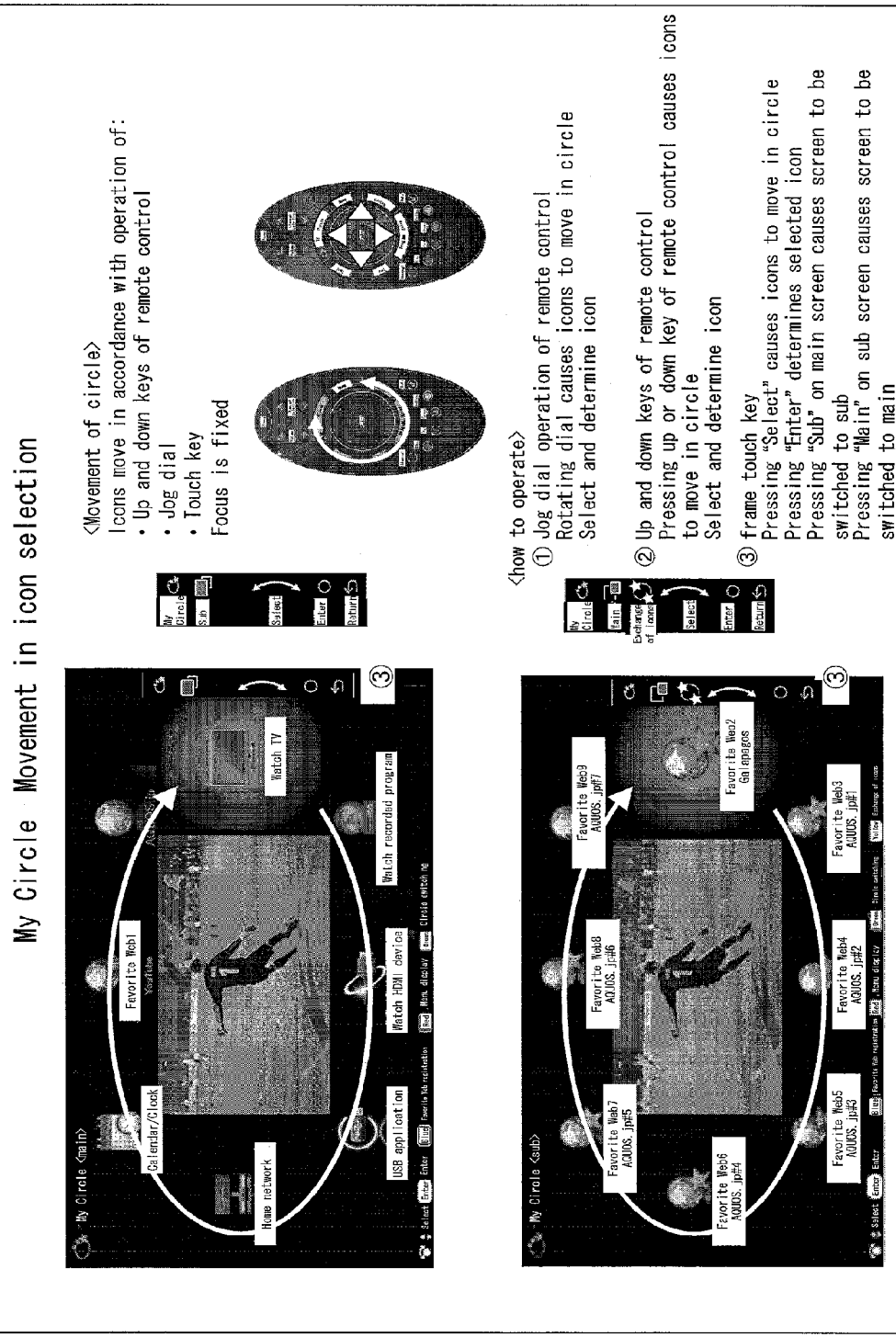
FIG. 13 is an explanatory view showing an example of display control for selection of an icon on the main screen and the sub screen.
Figure 14:
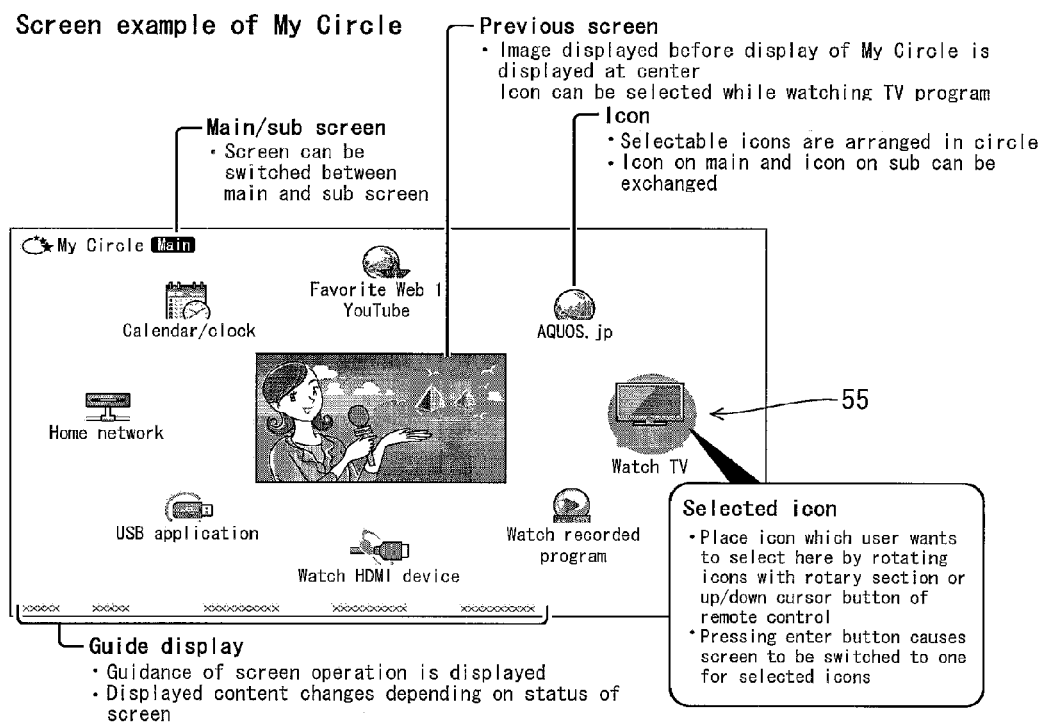
FIG. 14 is an explanatory view showing a display example of the My Circle screen.
Figure 15:
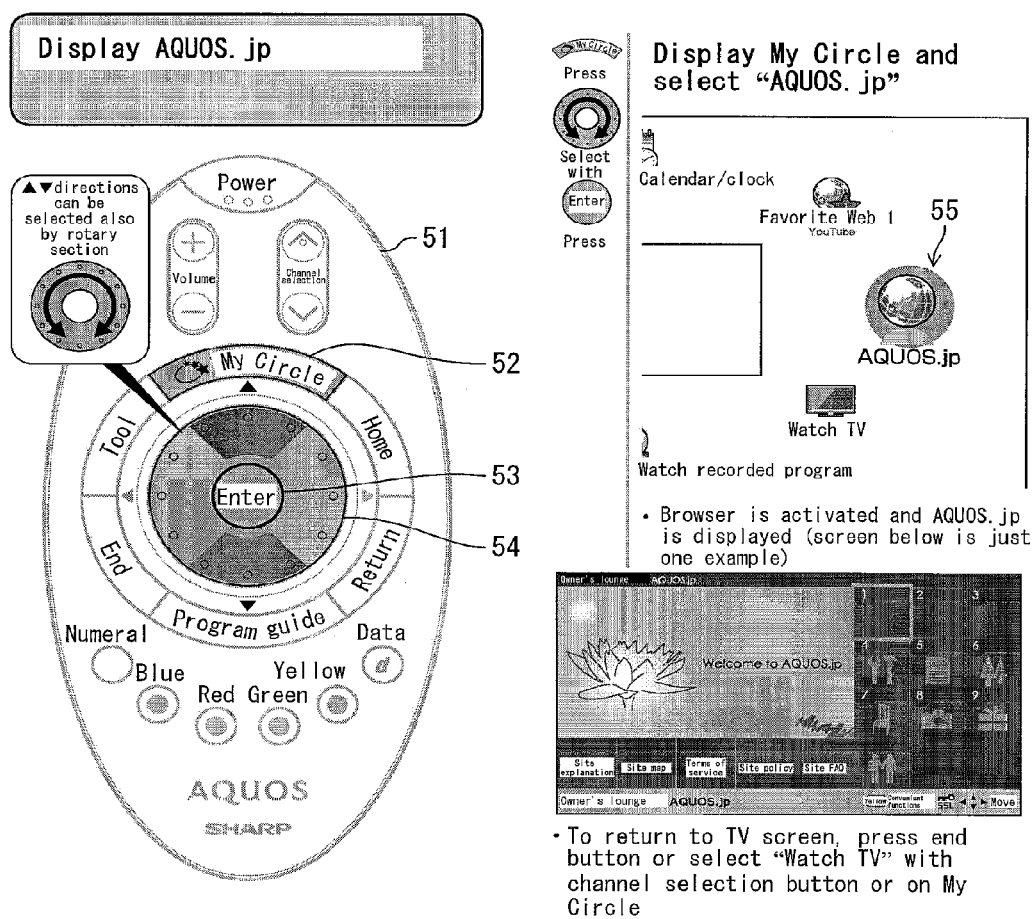
FIG. 15 is an explanatory view for explaining a user's operation of selecting an icon on the My Circle screen.

Next, the following description will discuss an operation of selecting an icon on the My Circle screen. FIG. 13 is an explanatory view illustrating an example of display control for selection of an icon on the main screen and the sub screen. FIG. 14 is an explanatory view illustrating a display example of the My Circle screen. FIG. 15 is an explanatory view for explaining a user's operation of selecting an icon on the My Circle screen.

The monitor 1 is configured such that, in a case where the user gives an instruction to rotate the plurality of icons so as to select any one of the plurality of icons in a state where the main screen or the sub screen is displayed, the plurality of icons move while circling around a content region in the center of the display screen in which region the content is displayed in a reduced size, without overlapping the content region. The instruction to rotate the plurality of icons is given by up and down keys of the remote control 51, a jog dial 54 of the remote control 15 (see FIG. 15), or the touch key displayed on the My Circle screen.

In a case where the plurality of icons circle around the content region, the plurality of icons sequentially pass through a focus position 55. In a case where (i) any one of the plurality of icons is located at the focus position 55 and (ii) an operation of determining the any one of the plurality of icons is carried out, the CPU 14 selects the icon, and then causes content indicated by the icon or a display screen corresponding to a function assigned to the icon to be displayed.

(Display of Function Menu)

The monitor 1 has a plurality of functions related to the My Circle screen and can display a function menu indicative of the plurality of functions. In the function menu, items are included, such as an item for resetting a content set by the user and an item for changing a color of the background image. In a case where a red key (red button) to which display of the function menu is assigned of the remote control 51 is operated, the function menu is displayed, as "My Circle menu", for example, in a lower left or a lower right part of the My Circle screen as illustrated in FIG. 16.

The function menu includes (1) background color change, (2) icon arrangement initialization, and (3) Recommended Web registration. FIG. 16 is an explanatory view illustrating a display state of the function menu on the My Circle screen displayed by the monitor 1.

Figure 17:
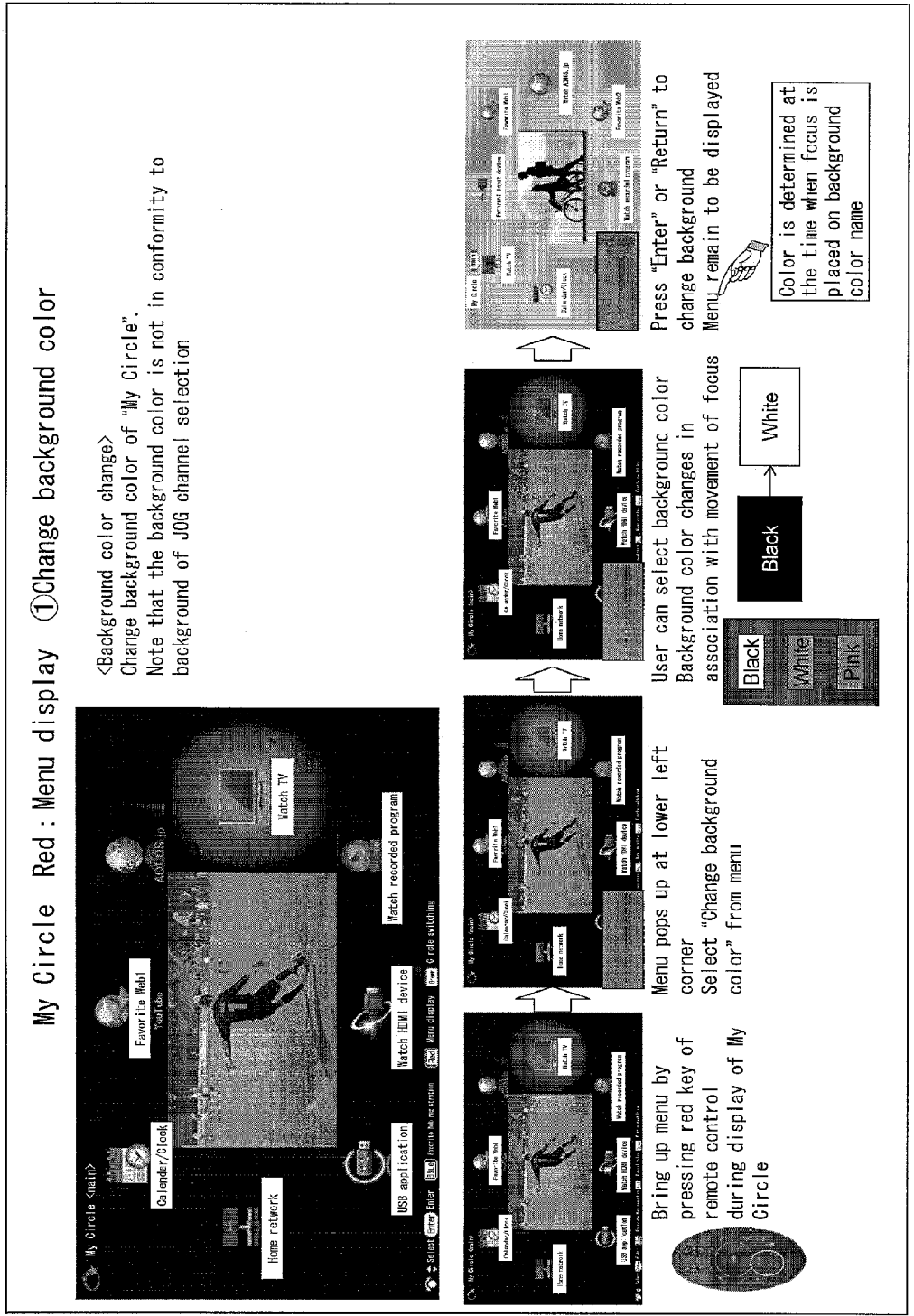
FIG. 17 is an explanatory view showing how the My Circle screen changes in a case where a background color is changed on the My Circle screen.

The (1) background color change is for changing a color of a background layer (middle layer), that is, a background color (for example, black, white, and pink) of the My Circle screen. FIG. 17 is an explanatory view illustrating how the My Circle screen changes in a case where the background color is changed.

In order to change the background color (see FIG. 17), the red key (red button) of the remote control 51 is pressed in a state where the My Circle screen is displayed. This causes the function menu to be displayed. In a case where the background color change is selected from the function menu, a plurality of candidate colors for the background color are displayed. In a case where one of the plurality of candidate colors is selected and the enter button 53 or the return button 56 is operated, the background color of the My Circle screen is changed to the selected one of the plurality of candidate colors.

Figure 18:
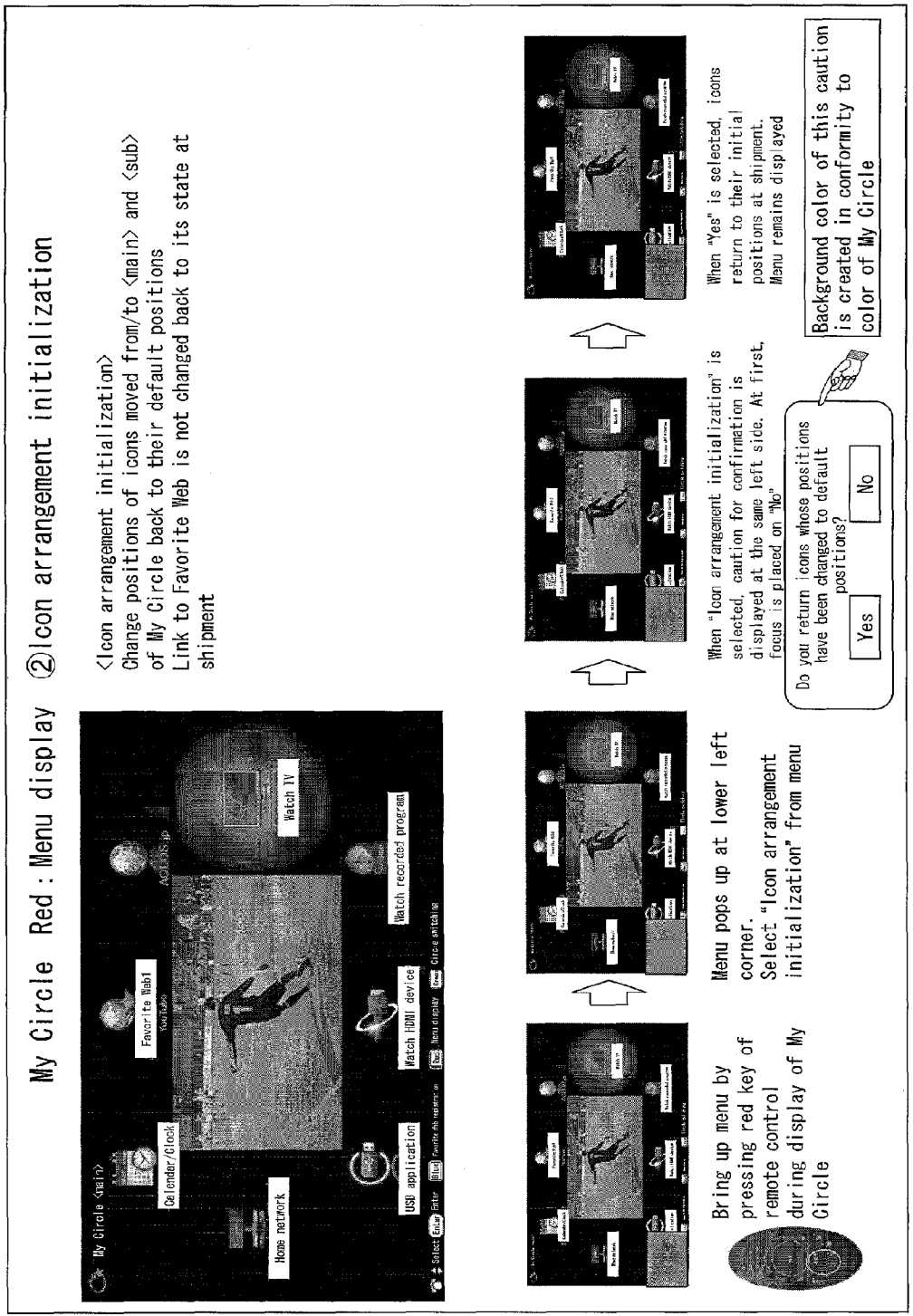
FIG. 18 is an explanatory view showing how the My Circle screen changes in a case where icon arrangement is initialized on the My Circle screen.

The (2) icon arrangement initialization is for initializing arrangement of icons moved from/to the main screen to/from the sub screen to an initial state at shipment. Note that the user can freely change arrangement of the plurality of icons displayed on each of the main screen and the sub screen. Therefore, it is also possible to initialize the arrangement of the plurality of icons displayed on each of the main screen and the sub screen. FIG. 18 is an explanatory view illustrating how the My Circle screen changes in a case where icon arrangement is initialized.

In order to initialize the icon arrangement (see FIG. 18), the red key (red button) of the remote control 51 is pressed in the state where the My Circle screen is displayed. This causes the function menu to be displayed. In a case where the icon arrangement initialization is selected from the function menu, display asking whether or not the icon arrangement is initialized ("Yes" or "No") is carried out. In a case where "Yes" is selected on this display, the icon arrangement on each of the main screen and the sub screen is initialized to the original arrangement before shipment.

The (3) Recommended Web registration is for initializing a URL which the user once registered by overwriting to initial data of a URL of a recommended website (for example, a site listed on AQUOS.jp). Initial data of URLs of recommended websites are stored in an AQUOS.jp server which is an exclusive portal site, as a list of the recommended websites (a content list or a content menu). Alternatively, the initial data can be stored, as the content list, in the memory 21 (see FIG. 2) included in the monitor 1. In either case, in a case where the Recommended Web registration is carried out, one of the recommended websites in the content list is registered in the icon of Favorite Web.

Figure 19:
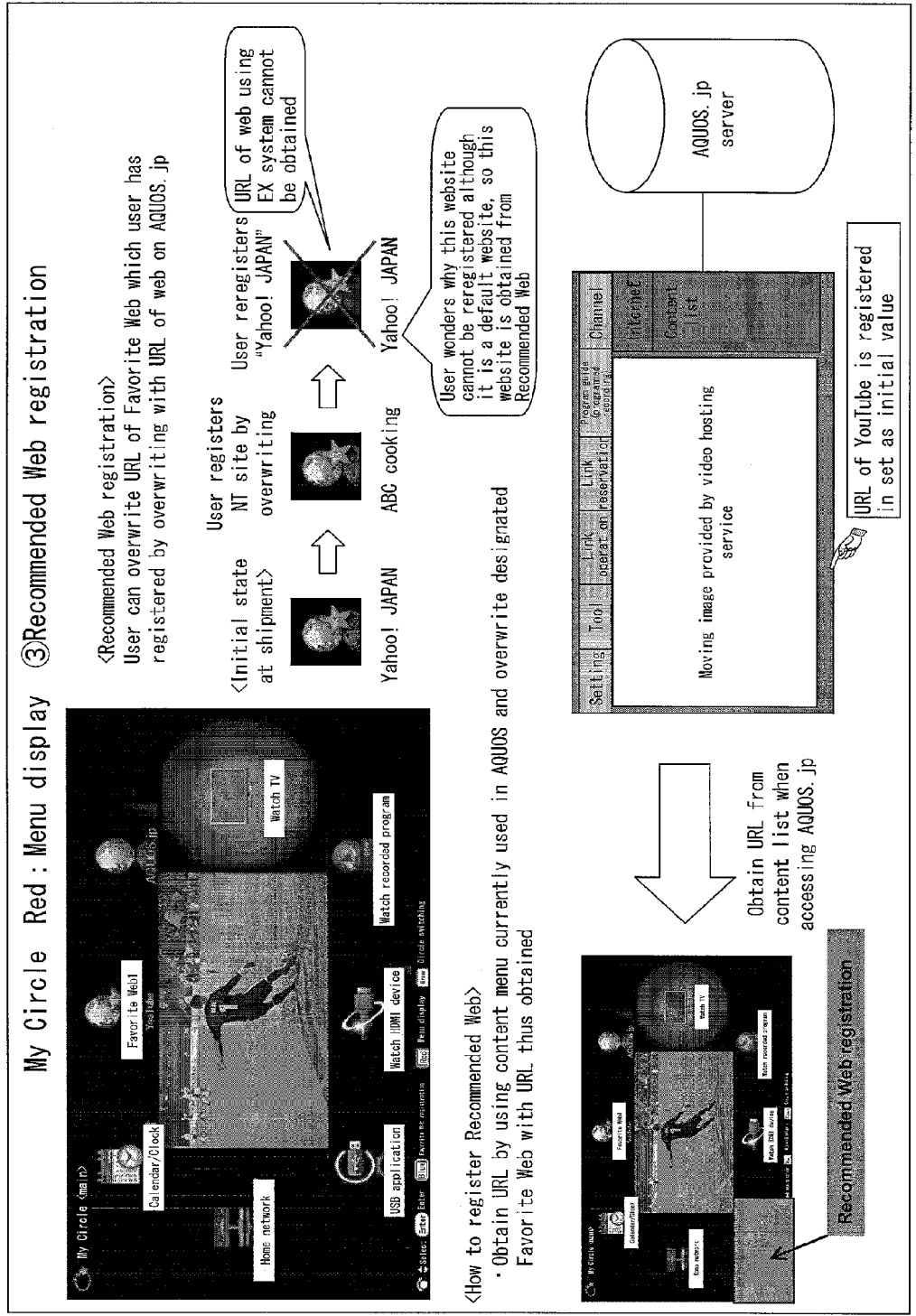
FIG. 19 is an explanatory view showing an overall operation of the monitor for Recommended Web registration on the My Circle screen.

FIG. 19 is an explanatory view illustrating an overall operation of the monitor 1 as to the Recommended Web registration with the use of the exclusive portal site.

As illustrated in FIG. 19, according to the Recommended Web registration, an exclusive browser for displaying a specific website (second browser (described later): for example, an EX engine) is activated, and then the television 10 is connected to an Internet site (for example, AQUOS.jp) which stores the list of the recommended websites. The content list stored in the Internet site is then displayed in the content display region in a state where the My Circle screen is displayed. In a case where the Recommended Web registration is instructed, the monitor 1 obtains a URL of a recommended website from the content list and overwrites a specified Favorite Web with the URL of the recommended website.

(Recommended Website Registration)

Each of FIGS. 20 to 24 is an explanatory view illustrating an operation of the monitor 1 in each step in a case where the Recommended Web registration is carried out.

FIG. 20 is an explanatory view illustrating a display state of the My Circle screen and a display state of the function menu in a case where the Recommended Web registration is carried out on the monitor 1. FIG. 21 is an explanatory view for explaining (i) operations of selecting a Favorite Web to be overwritten from a list and determining the Favorite Web and (ii) an operation of displaying the list of the Recommended Websites, in a case where the Recommended Web registration is carried out on the monitor 1. FIG. 22 is an explanatory view for explaining (i) an operation of displaying a title for confirmation and (ii) an operation of editing the title, at the Recommended Web registration on the monitor 1. FIG. 23 is an explanatory view for explaining an operation of completing the Recommended Web registration and an operation of displaying a registration completion screen on the monitor 1. FIG. 24 is an explanatory view illustrating a display screen of the function menu displayed in a case where completion is instructed on the registration completion screen.

(Exchange of Icons)

On the monitor 1, icons on the main screen and icons on the sub screen can be exchanged. FIG. 25 is an explanatory view showing an icons exchange operation on the My Circle screen. The icons exchange operation is, for example, exchange of one main icon with one sub icon on the main screen. FIG. 25 shows how the display screen of the display 16 changes from a first screen to a fifth screen in exchange of icons on the My Circle screen.

The first screen (left end in FIG. 25) shows a state where the sub screen is displayed on the display 16. When a user handles a predetermined button (e.g. green button) while the main screen is displayed, the sub screen is displayed initially. Next, the user rotates, with a jog dial etc. of the remote control, an icon which the user wants to move from the sub screen to the main screen, so that the icon is moved to a focus position. In this state, the user handles a predetermined button (e.g. yellow button) of the remote control 51 so as to enter an instruction to exchange one main icon with one sub icon. Upon enter of the instruction, the first screen changes to a second screen.

On the second screen, a specific icon (one of icons of a second group) at the focus position of the sub screen moves into the content display region. The focus position is provided, for example, at the right side of the content display region. Thereafter, the second screen changes to a third screen.

On the third screen, the My Circle screen changes from the sub screen to the main screen. The specific icon having moved to the content display region of the sub screen remains displayed on the content display region of the main screen.

Next, the user rotates, with the jog dial etc. of the remote control, an icon which the user wants to move from the main screen to the sub screen, so that the icon is moved to the focus position, and handles an enter button 53 of the remote control. Upon this handling, the third screen changes to a fourth screen.

On the fourth screen, the target main icon (one of icons of a first group) on the focus position is deleted, and the specific icon on the content display region which icon has come from the sub screen is moved to the focus position. Thereafter, the fourth screen changes to the fifth screen. On the fifth screen, exchange of the main icon with the sub icon on the main screen is completed.

The following description will discuss in more detail an icons exchange operation on the My Circle screen on the monitor 1. FIG. 26 is an explanatory view showing a state of initial setting of icons on the main screen and the sub screen of the monitor 1.

In exchanging icons, while the My Circle screen is the sub screen as shown in FIG. 26, a user handles a predetermined button (e.g. yellow key (yellow button)) of the remote control 51 or a touch key captioned "exchange of icons" displayed on the sub screen.

FIGS. 27 to 30 are explanatory views showing operations at individual stages in exchanging icons between the sub screen and the main screen on the monitor 1. FIG. 27 is an explanatory view showing handling of the remote control 51 and a change in a displayed screen of the display 16 in accordance with the handling while the monitor 1 displays the main screen in the icons exchange operation. FIG. 28 is an explanatory view showing handling of the remote control 51 and a change in a displayed screen of the display 16 in accordance with the handling when determining an icon to be included into the main screen in the icons exchange operation. FIG. 29 is an explanatory view showing handling of the remote control 51 and a change in a displayed screen of the display 16 in accordance with the handling when determining an icon to be excluded from the main screen in the icons exchange operation. FIG. 30 is an explanatory view showing a display state of the display 16 when the icons exchange operation is completed.

When a content video image (video plane (rearmost back surface)) is displayed on the whole screen of the display 16, handling the My Circle button 52 of the remote control 51 causes the display 16 to display the main screen as shown in FIG. 27.

Next, in response to an instruction to switch between the main screen and the sub screen by handling, for example, the green key (green button) of the remote control 51, the display 16 switches its displayed screen from the main screen to the sub screen. While the display 16 displays the sub screen, rotating the jog dial 54 of the remote control 51 causes icons on the sub screen to move in such a manner as to move around the content display region.

Next, as shown in FIG. 28, while one of the moving icons is positioned at the focus position 55, handling, for example, the yellow key (yellow button) of the remote control 51 determines a specific icon to be included into the main screen. Thereafter, the specific icon moves into the content display region. This movement is displayed by animation.

Thereafter, as shown in FIG. 29, the displayed screen of the display 16 is changed from the sub screen to the main screen. Next, while the display 16 displays the main screen, rotating the jog dial 54 of the remote control 51 causes the icons on the main screen to move in such a manner as to move around the content display region.

While one of the icons on the main screen is positioned on the focus position 55, handling the enter button 53 determines that icon as a target icon to be excluded from the main screen. At that time, displaying or blinking a left-right arrow between the specific icon having been moved to the content display region and the target icon to be excluded from the main screen helps a user to visually understand that exchange of icons is about to start.

Thereafter, the specific icon having been included into the content display region from the sub screen moves to the focus position 55. This movement is displayed by animation. At that time, the specific icon may be displayed in such a manner as to overlap the target icon to be excluded from the main screen. Thus, as shown in FIG. 30, the exchange of the icons between the sub screen and the main screen is completed.

"One-plate manner" shown in FIG. 29 means preparing and displaying icons and texts on a rectangular region of the graphic plane where icons are drawn. The rectangular region has the same background color as the full-color plane. The prepared icons and texts are displayed in the one-plate manner, so that visibility of OSD and display quality of the icons are secured.

(Case where Icons Cannot be Selected)

FIG. 31 is an explanatory view showing a case where icons cannot be selected on the My Circle screen. As shown in FIG. 31, in a case where the monitor 1 is not connected via a cable with a providing device of content, the display 16 displays a warning that the icon indicative of the content cannot be selected. The warning may be displayed in such a manner that when an unselectable icon is moved to the focus position 55, a small warning is displayed above the unselectable icon. Furthermore, when an operation to determine selection of the unselectable icon is made while the small warning is displayed, a large warning may be displayed. It is effective to display the large warning in the content display region where a content video image is displayed, because displaying the large warning in the content display region is more likely to attract a user's attention.

(Display of Favorite Website)

Figure 32:
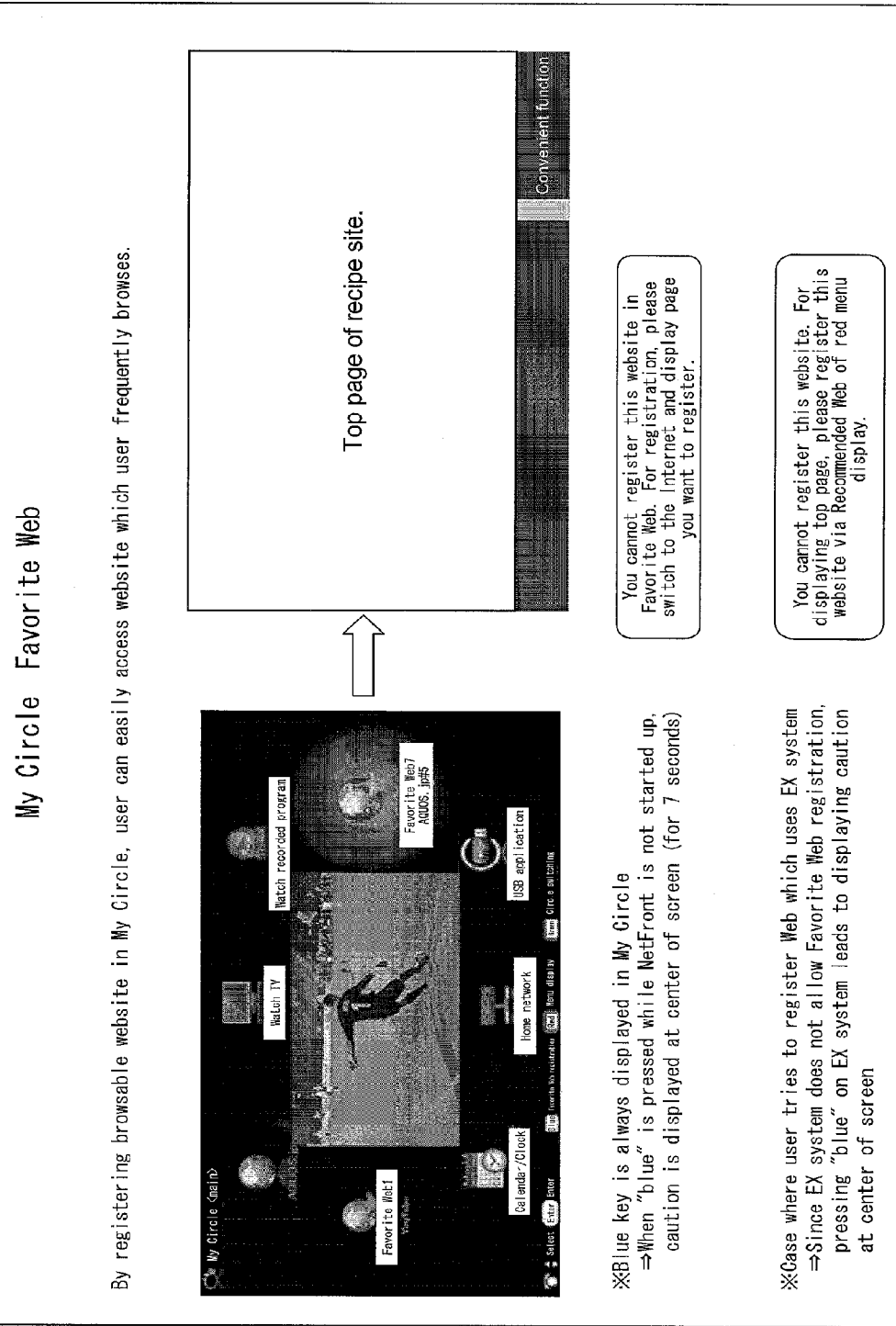
FIG. 32 is an explanatory view showing a state of the My Circle screen where a user's favorite website is registered.

FIG. 32 is an explanatory view showing a state of the My Circle screen where a user's favorite website is registered. By registering in the My Circle screen a website which a user browses frequently, the user can easily accesses the website.

Figure 33:
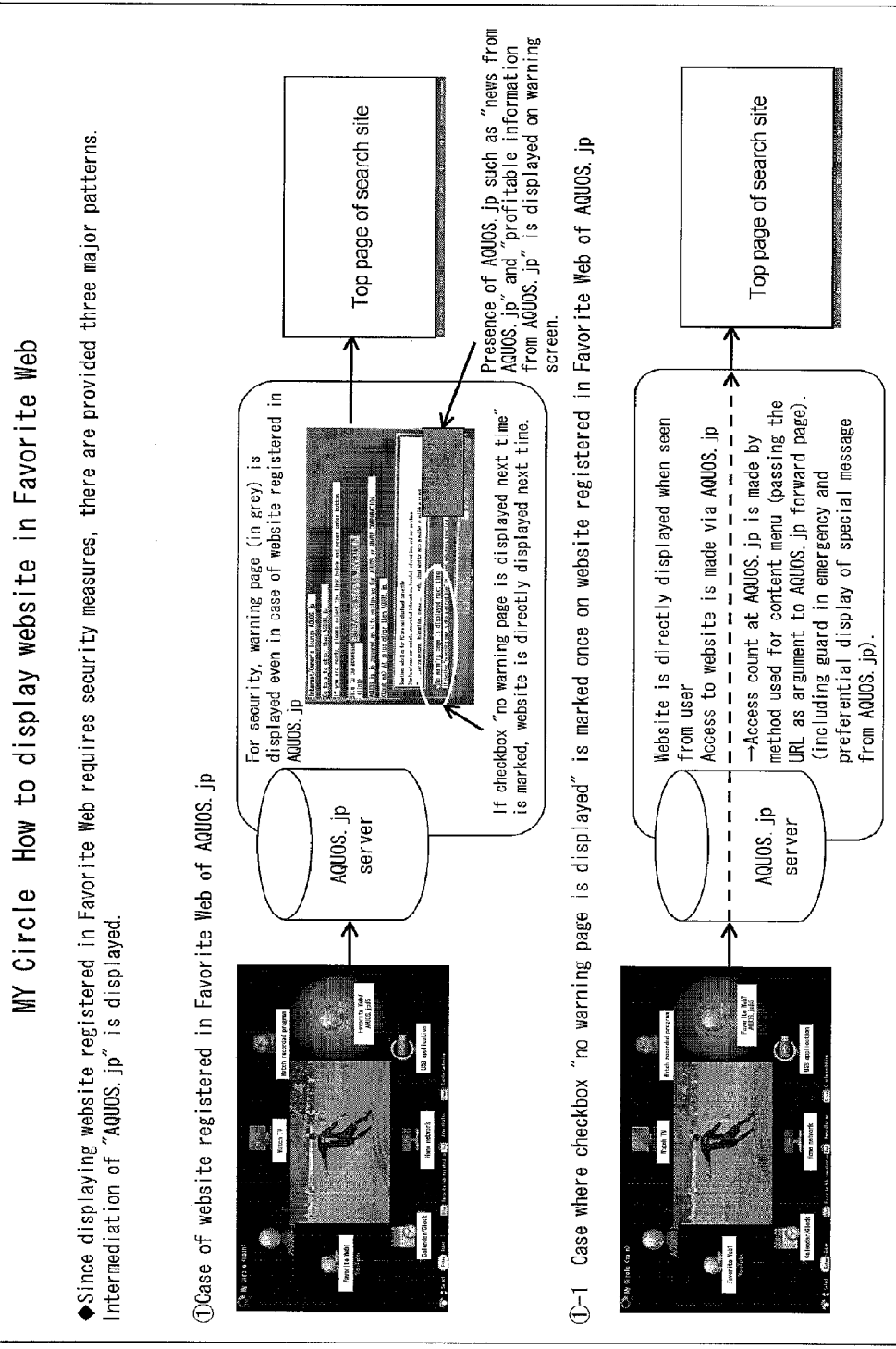
FIG. 33 is an explanatory view showing a method for displaying, on the My Circle screen, a favorite website belonging to a group which is the most reliable in terms of security.
Figure 34:
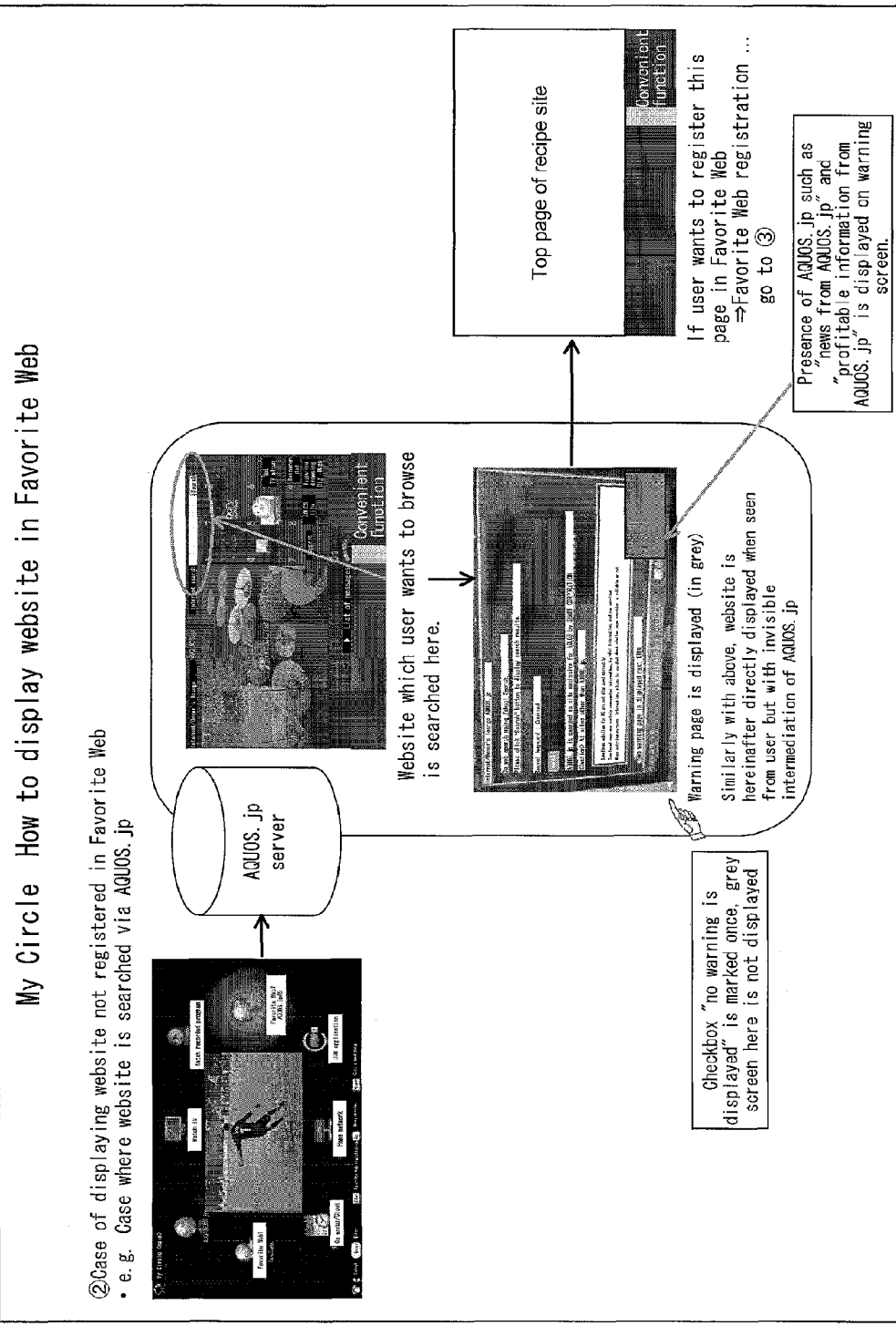
FIG. 34 is an explanatory view showing a method for displaying, on the My Circle screen, a favorite website belonging to a group which is the second most reliable in terms of security.
Figure 35:
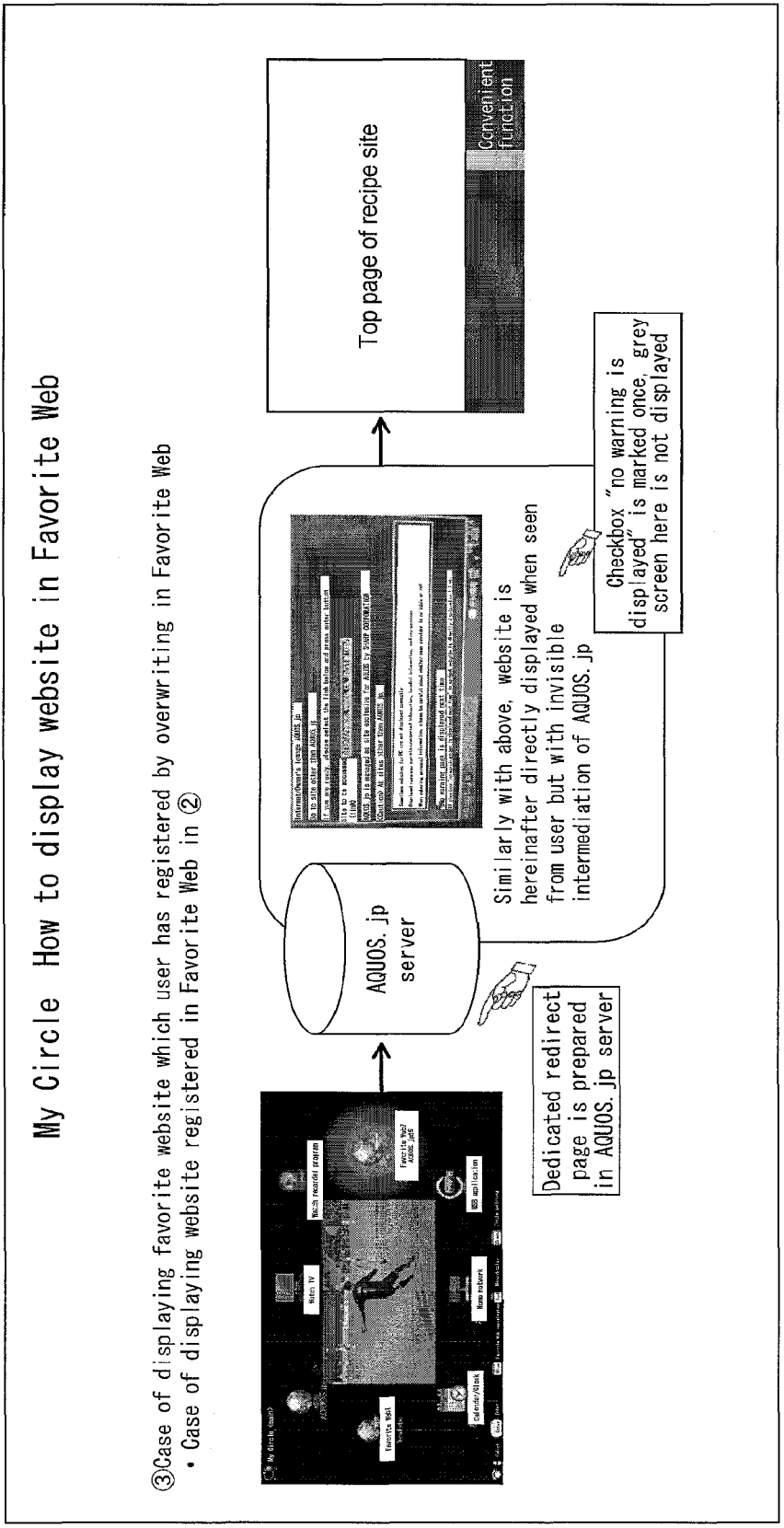
FIG. 35 is an explanatory view showing a method for displaying, on the My Circle screen, a favorite website belonging to a group which is the third most reliable in terms of security.

FIGS. 33 to 35 are explanatory views showing how to display a favorite website registered in the My Circle screen on the monitor 1. In a case of displaying a website registered in a Favorite Web, security measures are needed. Accordingly, how to display a website registered in the Favorite Web differs depending on the degree of needs for security measures for the website.

FIG. 33 is an explanatory view showing a method for displaying a favorite website. This method is employed in a case of displaying a site recommended on a highly reliable website (e.g. "AQUOS.jp" site managed by a provider, a manager etc. of the display control method of the present invention).

FIG. 34 is an explanatory view showing a method for displaying a site which is not registered in the Favorite Web Site. This method is employed, for example, in a case of displaying a site searched via a reliable website (e.g. "AQUOS.jp" site mentioned above).

FIG. 35 is an explanatory view showing a method for displaying a favorite website which the user has registered by overwriting. This method is employed, for example, in a case of displaying a site which a user has searched via the "AQUOS.jp" site for example and which the user has registered by overwriting in the Favorite Web.

In each of FIGS. 33-35, accessing the site registered in the Favorite Web is made via a site with assured security, such as the "AQUOS.jp" site. Furthermore, in a case of searching for a site via the "AQUOS.jp" site, accessing that site is made via the "AQUOS.jp" site.

On the monitor 1, a website which a user is currently browsing can be registered in the Favorite Web and be displayed as an icon on the My Circle screen. FIGS. 36-39 are explanatory views showing an operation of registering a website which the user is currently browsing in the Favorite Web and displaying the website as an icon on the My Circle screen.

Figure 39:
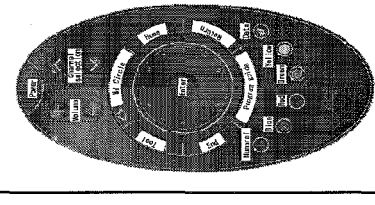
FIG. 39 is an explanatory view showing a state where editing is completed on the title editing screen on the My Circle screen, in a case of registering a website in the Favorite Web.

FIG. 36 is an explanatory view showing handling of the remote control 51 for determining a website to be registered and a change of a displayed screen of the display 16 accompanying the handling, in a case of registering a website in the Favorite Web. FIG. 37 is an explanatory view showing an operation of displaying selection items for Favorite Web registration and an operation of displaying a registration list on the monitor 1, in a case of registering a website in the Favorite Web. FIG. 38 is an explanatory view showing an operation of displaying a title confirmation screen and an operation of displaying a title editing screen on the monitor 1, in a case of registering a website in the Favorite Web. FIG. 39 is an explanatory view showing a state where editing is completed on the title editing screen, in a case of registering a website in the Favorite Web.

In a case of registering a website in the Favorite Web, a website is displayed from a screen displaying a home menu or a My Circle screen as shown in FIG. 36. Next, when a website which a user wants to register is displayed, the user handles the My Circle button 52 of the remote control 51.

When the My Circle button 52 is handled, the website is displayed in a scaled-down form in the content display region, and icons registered in the My Circle screen are displayed around the content display region, as shown FIG. 37. Furthermore, at a guide display at the lower part of the My Circle screen, a selection item named "registration of favorite Web" is displayed as a selection item corresponding to the blue key.

When this selection item is handled (the blue key is pressed) by the user, a registration list showing where the favorite website is to be registered is displayed at the center of the My Circle screen. On this screen, where the favorite website is to be registered is selected by the user from the registration list. The registration list may be displayed in such a manner as to overlap the icons surrounding the registration list, so that the registration is easily viewable to the user.

When where the favorite website is to be registered is selected, the tile confirmation screen is displayed as shown in FIG. 38. When "change of title" is selected on this screen, the tile editing screen is displayed.

Thereafter, as shown in FIG. 39, when editing of the title is completed and "registration" is selected on the title editing screen, registration of the website in the Favorite Web is completed. When the website cannot be registered in the Favorite Web, this information is displayed.

The monitor 1 also provides a Recommended Web registration function which introduces recommended websites (sites registered in AQUOS.jp) for registration of websites. In this case, when Recommended Web registration is selected, a list of recommended websites is displayed, so that the user can select a satisfactory website from the list and register the website.

The television 10 of the present embodiment includes a first browser which enables the television 10 to display websites of the Internet in general and a second browser which enables the television 10 to display a specific website through the display technique and the frame configuration that are optimal to the television 10.

A specific example of the first browser is a NetFront®, and a specific example of the second browser is an EX engine. Websites of Recommended Webs (e.g. Yahoo! JAPAN for AQUOS) preregistered in the television 10 at the time of factory shipment are displayed by the second browser.

The EX engine serving as the second browser cannot retrieve a URL. Accordingly, in a case of registering a recommended website specialized for the second browser, a list of recommended websites (content menu) is retrieved from the AQUOS.jp server which is a dedicated portal site, and the recommended websites in the list are registered in the Favorite Web. In this case, a URL of YouTube (Registered Trademark) only is registered in set as an initial value.

(Calendar/Clock Display)

Figure 40:
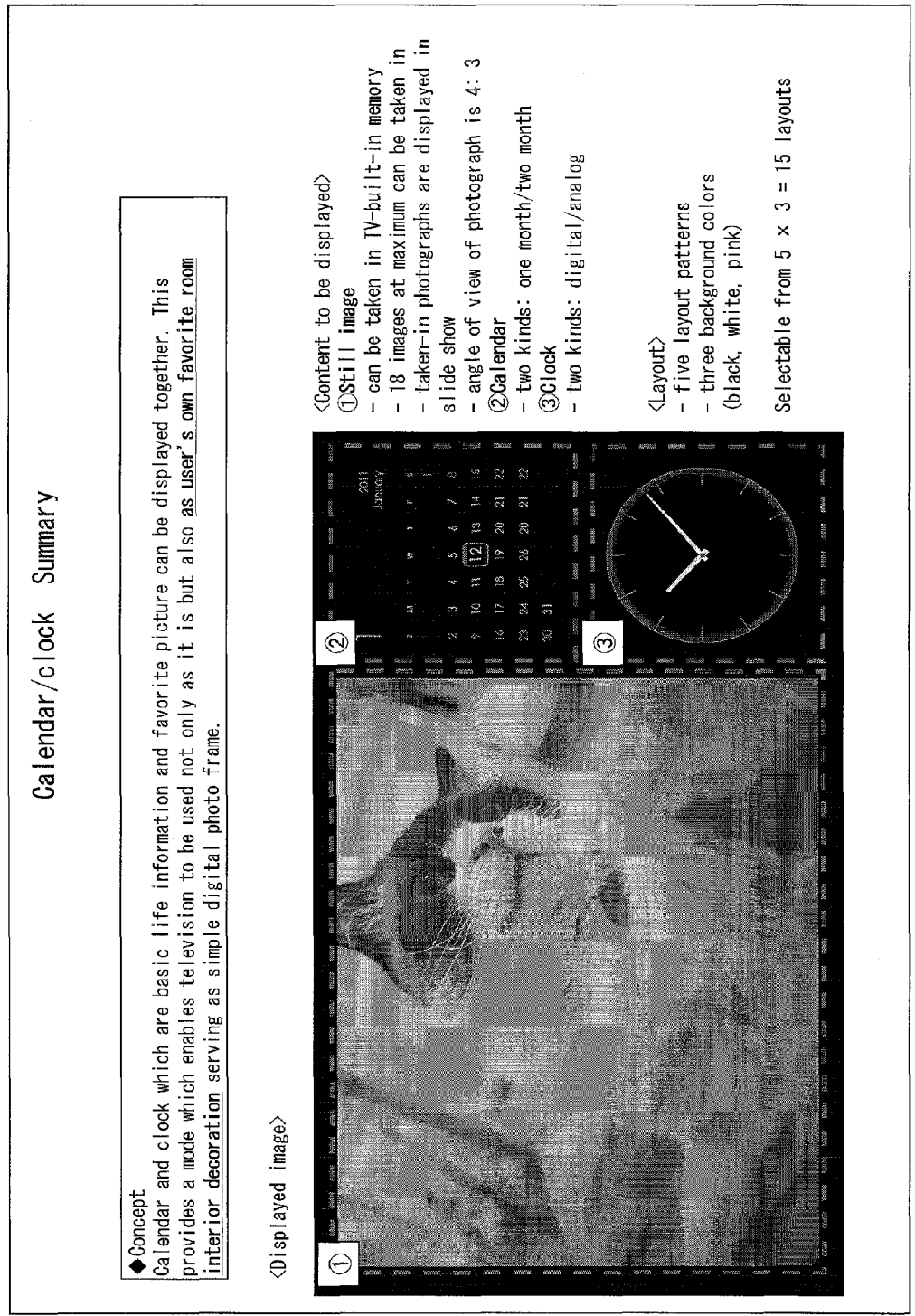
FIG. 40 is an explanatory view showing a display example of a calendar/clock screen displayed as a result of selection of a "calendar/clock" icon on the My Circle screen.

One of menus settable via icons displayed on the main screen is a "calendar/clock" menu. As shown in FIG. 40, in this menu, a calendar and a clock which are basic life information, a favorite picture etc. can be displayed together. This menu provides a mode which enables the television 10 to be used not only as a television but also a user's own interior decoration serving as a simple digital photo frame.

The "calendar/clock" menu provides a plurality of layout patterns which enable a user to freely combine a still image (e.g. photograph), a calendar, and a clock for display. The user can select a favorite layout pattern from the plurality of layout patterns.

Figure 41:
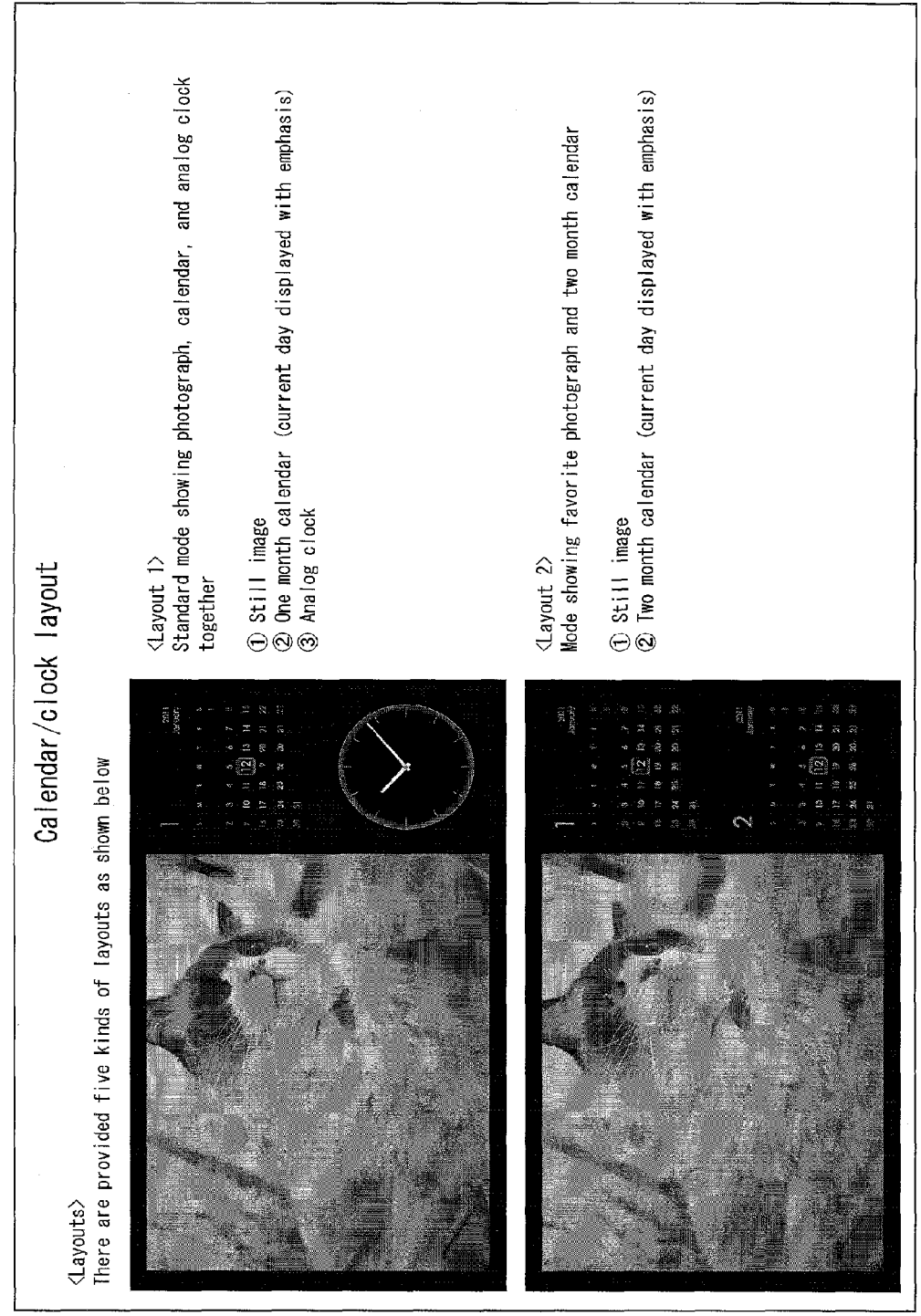
FIG. 41 is an explanatory view showing an example of layout of the calendar/clock screen.
Figure 42:
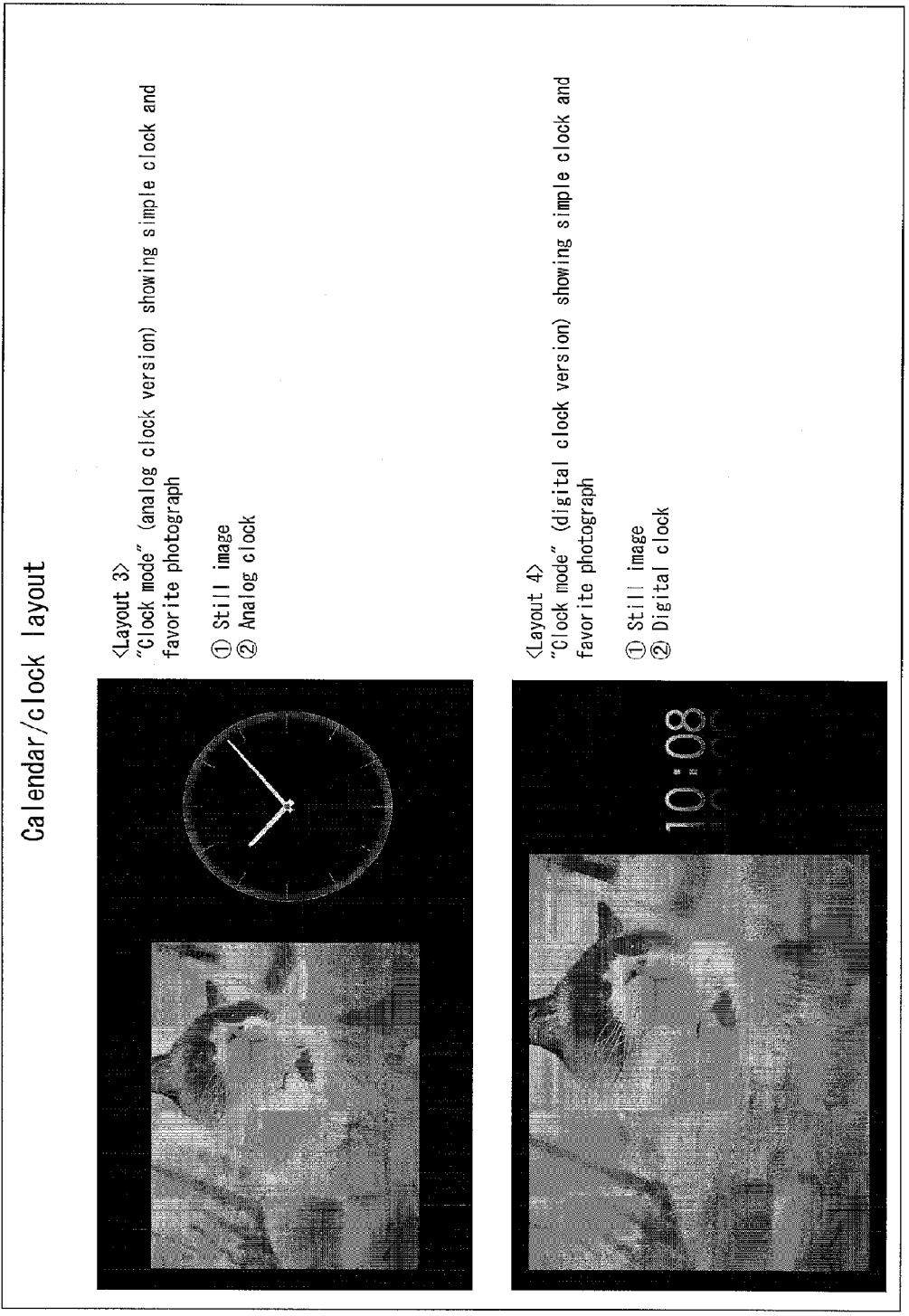
FIG. 42 is an explanatory view showing another example of layout of the calendar/clock screen.
Figure 43:
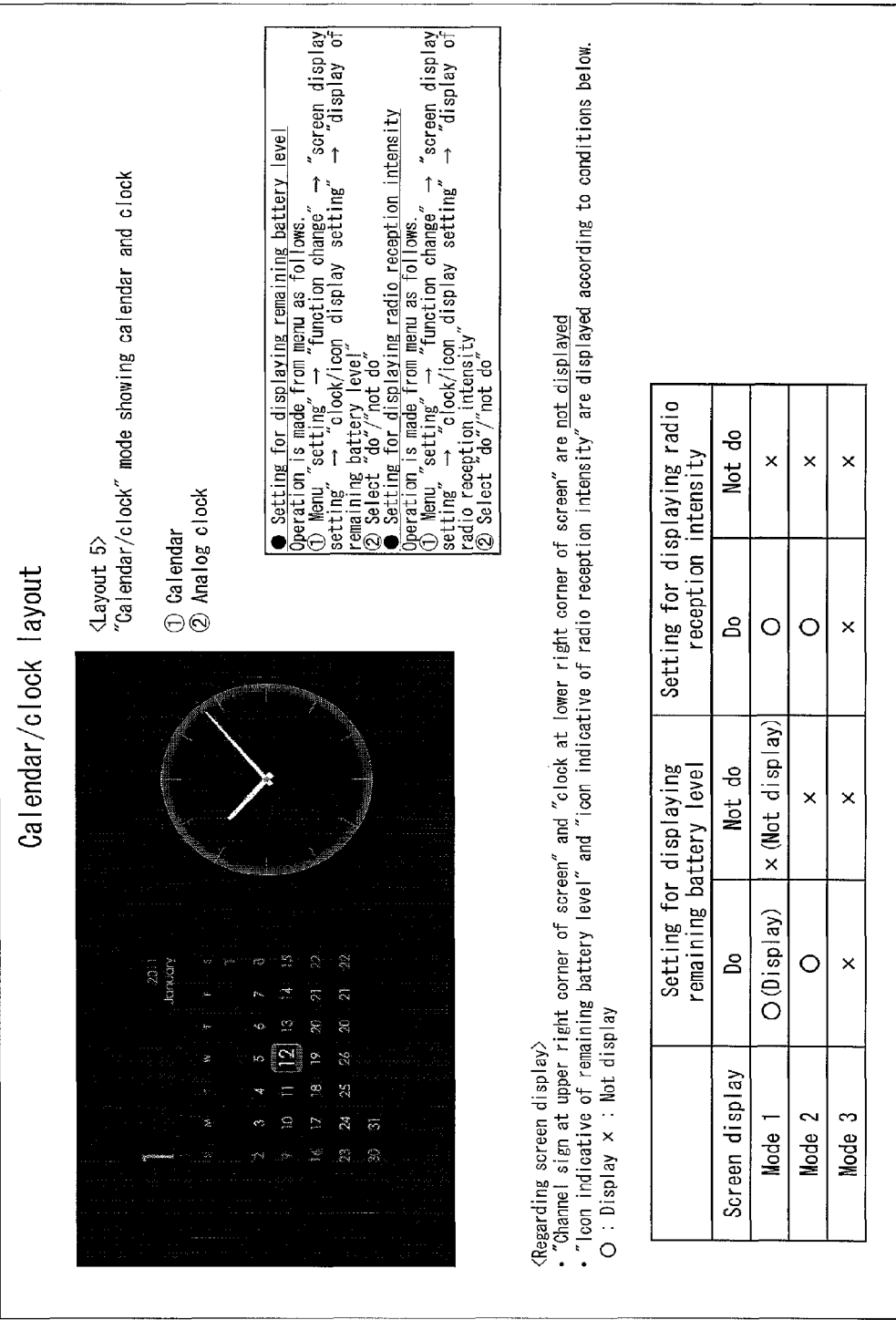
FIG. 43 is an explanatory view showing still another example of layout of the calendar/clock screen.

FIGS. 41 to 43 show five examples of the layout patterns. In the layout patterns, there are provided two kinds of calendar displays: one month display and two month display, and there are provided two kinds of clock displays: digital display and analog display. Of course, the number of the provided layout patterns is not limited to the above.

In FIG. 41, <Layout 1> is a combination of a still image, a one month calendar, and an analog clock, and <Layout 2> is a combination of a still image and a two month calendar.

In FIG. 42, <Layout 3> is a combination of a still image and an analog clock, and <Layout 4> is a combination of a still image and a digital clock.

In FIG. 43, <Layout 5> is a combination of a calendar and an analog clock. In the calendar display, the current day can be displayed with emphasis.

In a case where the television 10 is used as a normal television etc., a channel sign and a clock can be displayed at a corner of the screen. In contrast, in a case where the "calendar/clock" menu is selected, a channel sign and a clock are not displayed. It is preferable that whether to display the remaining battery level and whether to display radio reception level can be set freely (see FIG. 43).

The television 10 in accordance with the present embodiment provides three kinds of modes for screen display.

In the mode 1, channel sign display which displays the number of a selected channel and clock display which displays the current time are made. As for the remaining amount of battery and the intensity of radio reception, an icon indicative of the remaining amount of battery and an icon indicative of intensity of radio reception are displayed if "display" is set for the icons, respectively, and the icons are not displayed if "not display" is set for the icons, respectively.

In the mode 2, channel sign display is not made and clock display is made. As for the remaining amount of battery and the intensity of radio reception, if "display" is set, the above icons are displayed, and if "not displayed" is set, the above icons are not displayed.

In the mode 3, any of a channel sign, a clock, the remaining amount of battery, and the intensity of radio reception is displayed.

In the case where the television 10 is used as a normal television etc., a channel sign and a clock can be displayed at a corner of the screen. In contrast, in the "calendar/clock" menu, a channel sign and a clock are not displayed regardless of what screen display mode is selected.

Whether to display the remaining amount of battery and the intensity of radio reception may be set depending on the screen display mode in the case of the "calendar/clock" menu.

In the "calendar/clock" menu, there may be provided a plurality of background colors so that a user can select a favorite background color. Users request televisions to be a part of interior decoration. Accordingly, there are provided a plurality of external colors (cabinet colors) for the television 10. In the "calendar/clock" menu, the television is used as a part of interior decoration, such as a digital photo frame. A background image is required when displaying not only a photograph but also multi-contents such as a calendar and a clock.

As described above, assume that there are provided m number of layout patterns and n number of background colors. At that time, a user is given m×n choices (m and n are natural numbers).

If there is provided only one color for a background image, there is a possibility that the color is not equal to the color of a television cabinet, resulting in poor interior decoration. Accordingly, it is preferable that there are provided a plurality of background colors corresponding to cabinet colors, so that the background color and the cabinet color are equal to each other or match each other.

As shown in FIG. 44, if there are three kinds of cabinet colors (white, black, and pink), there are provided these three kinds of colors as a background color. As described above, a plurality of background colors corresponding to the plurality of cabinet colors are stored in the television so that a user can select a background color which is equal to or matches the cabinet color. Consequently, when the television screen is used as a part of interior decoration, the external color of the television can be equal to or match the color of the screen, resulting in excellent interior decoration.

In order to display a still image, data such as a photograph is taken into the television via a USB flash drive or a home network, and the data is displayed. In a case where a plurality of data can be taken into the television, the television may be arranged to provide an option of a slideshow which displays the taken-in photographs while switching the photographs.

Figure 45:
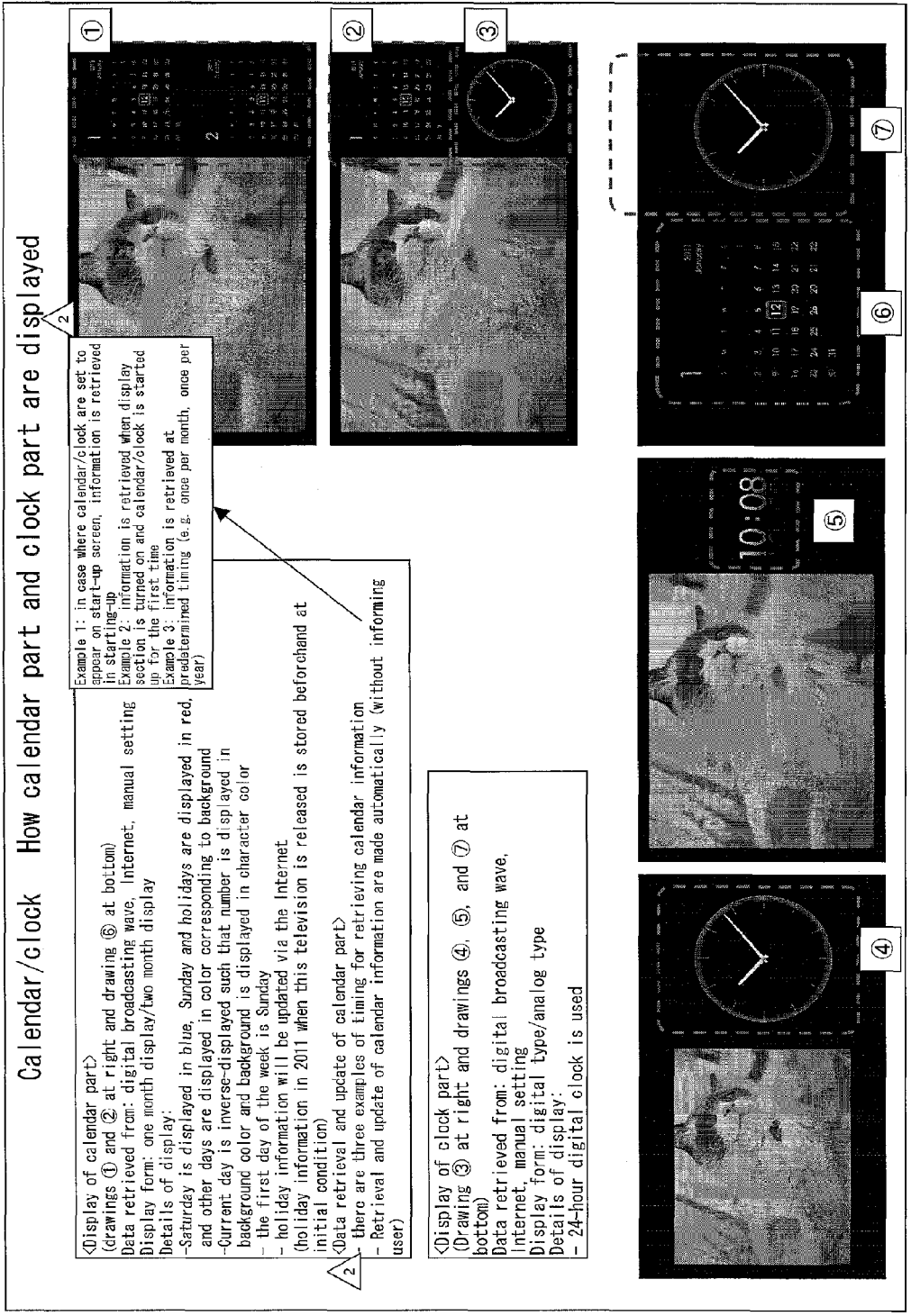
FIG. 45 is an explanatory view showing display specification of calendar and clock.

It is preferable that information regarding display of a calendar part and display of a clock part (e.g. information on holidays) can be retrieved via digital broadcasting waves or the Internet (see FIG. 45). This enables the television to respond to a change in holiday etc.

(Slideshow)

Figure 67:
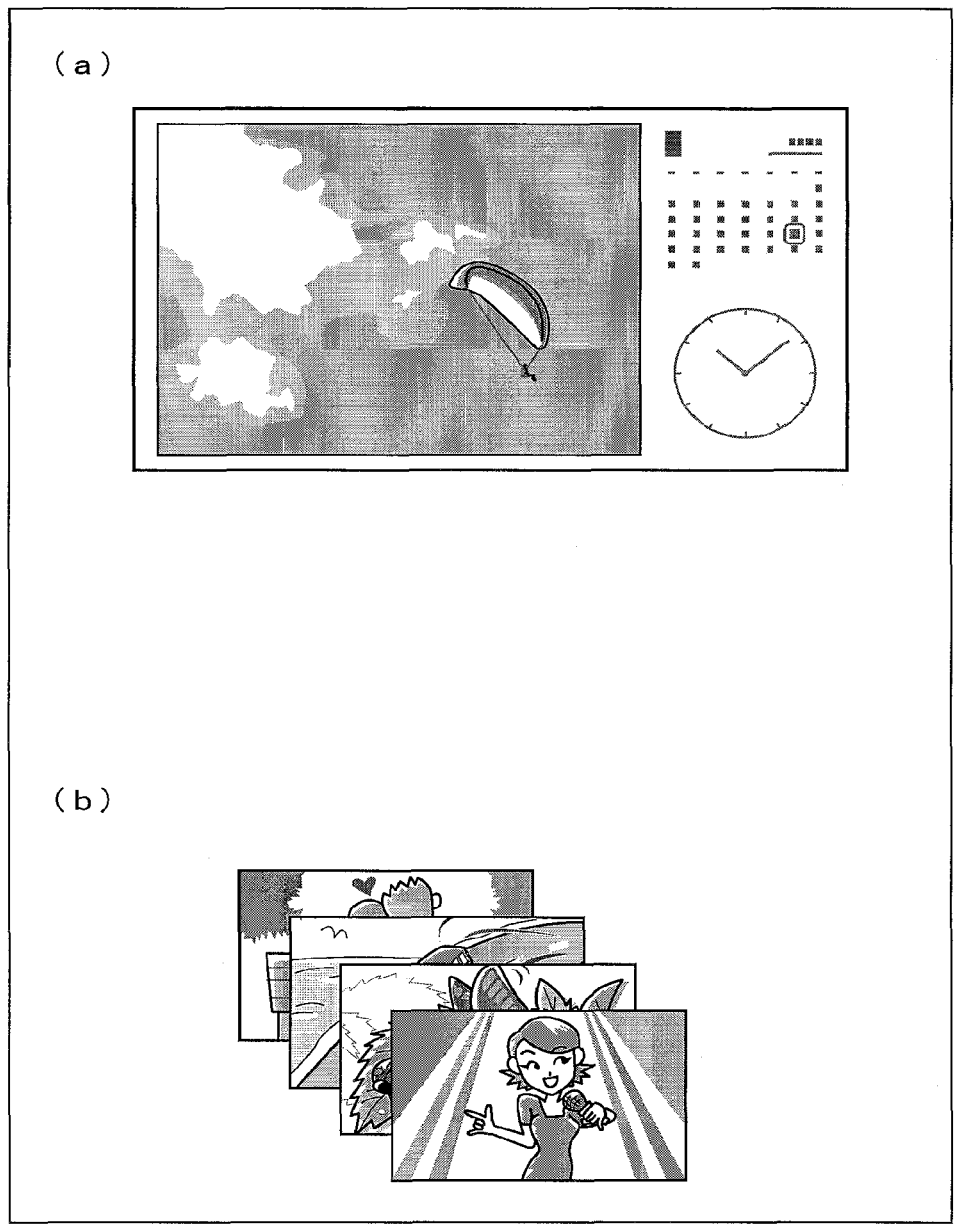
FIG. 67 is an explanatory view showing, as an example of layout of the calendar/clock screen, a display example in which a slide show of still images is displayed.

FIG. 67 is a view showing how the displayed screen of the display 16 changes in a case where the option of a slideshow is selected. When a user selects the option of a slideshow while a still image, a calendar, and a clock are displayed as shown in (a) of FIG. 67, the television starts automatically changing still images displayed on the display 16 per a predetermined period of time (e.g. 5 seconds) as shown in (b) of FIG. 67.

Furthermore, as described above, the television 10 can take in data of still images such as photographs via a USB flash drive or a home network. Examples of a device to be connected with the television 10 via a home network so as to take in still images include, but not limited to, cameras, mobile phones, and smart phones.

(Selection of Layout and Background Color)

Figure 68:
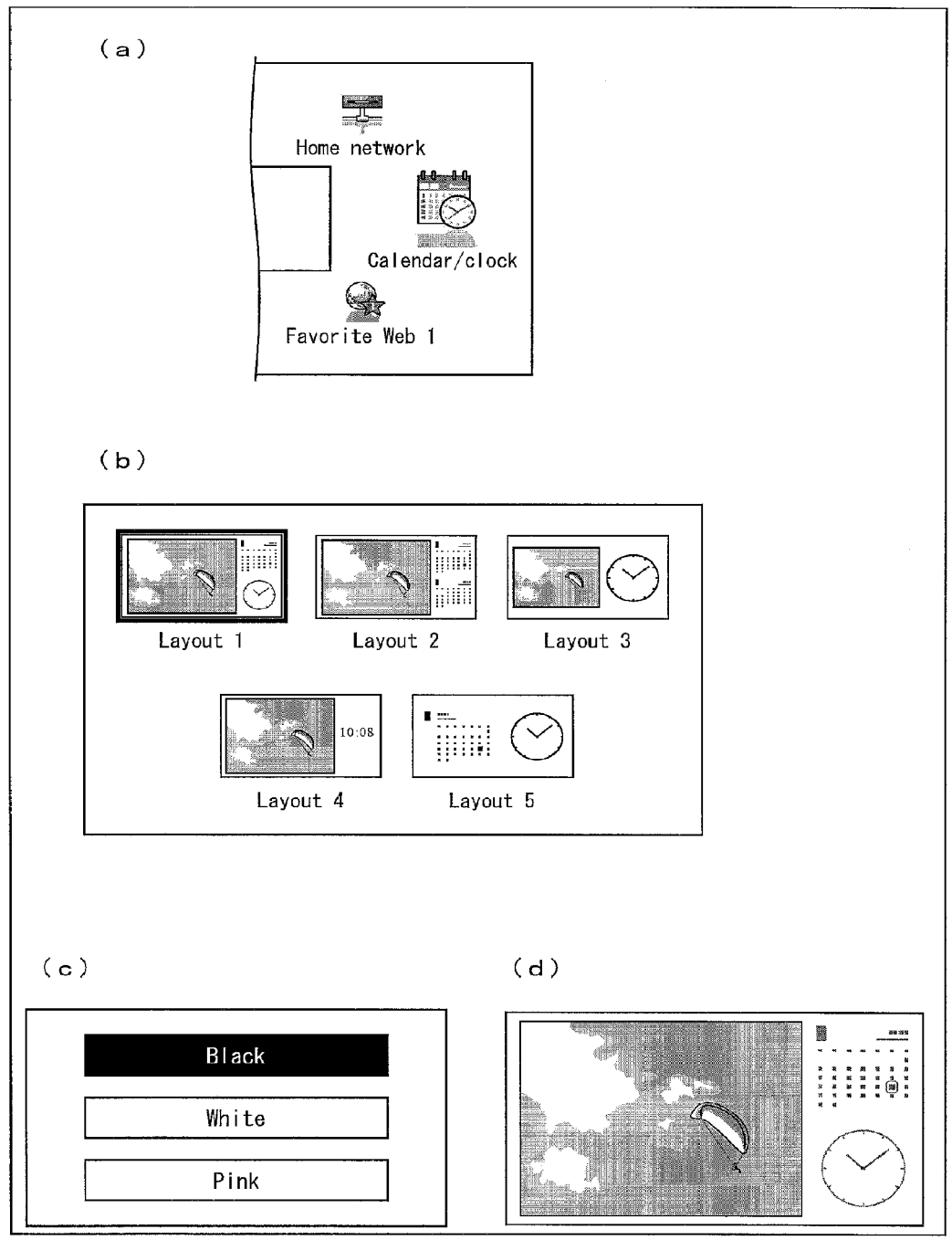
FIG. 68 is a view showing how the display screen changes in a case where a layout pattern and a background color of the calendar/clock screen are selected.

FIG. 68 is a view showing layout patterns for displaying any combinations of a still image, a calendar, and a clock, and how the display screen of the display 16 changes in a case of selecting a background color.

Initially, as shown in (a) of FIG. 68, while the display 16 displays the My Circle screen, a user handles the jog dial of the remote control, so that an icon indicative of displaying the "calendar/clock" menu (also referred to as "calendar/clock" menu icon) moves to the focus position on the My Circle screen. The user can select, by pressing the enter button etc. of the remote control for example, the "calendar/clock" menu icon having moved to the focus position.

When the user selects the "calendar/clock" menu icon, the display screen changes into a layout selection screen as shown in (b) of FIG. 68 where five layout patterns 1-5 (layouts 1-5 in (b) of FIG. 68) for the display screen are displayed as options.

On the layout selection screen, one of the five layout patterns to be displayed is highlighted beforehand. (b) of FIG. 68 shows an example in which the option of a layout pattern 1 is focused by being surrounded by, for example, a black line etc. While the display 16 displays the layout selection screen, the user can move the focus for an option by pressing the cursor button etc. of the remote control. Further, after moving the focus to the option of a desired layout pattern, the user can select the desired layout pattern by pressing the enter button of the remote control.

When the user selects the desired layout pattern, the display screen changes into a background color selection screen where a background color is selected, as shown in (c) of FIG. 68.

As shown in (c) of FIG. 68, the background color selection screen shows options of selectable background colors. On the background color selection screen, one of the options of a background color to be displayed is highlighted beforehand. The user can move the highlight to a desired option, by pressing the cursor button etc. of the remote control. After moving the focus to the desired option, the user can select the desired background color by pressing the enter button etc. of the remote control.

When the user selects the desired background color, the display screen changes into a display screen where a still image (e.g. photograph), a calendar, and a clock are positioned on the selected background color with the selected layout pattern. (d) of FIG. 68 shows a display screen in a case where the option of the layout pattern 1 and the background color "white" are selected.

In a case where one of the options of the layout patterns 2-5 is selected, there may be displayed a display screen where a still image (e.g. photograph), a calendar, and a clock are positioned with the layout pattern shown in one of FIGS. 41 to 43. In a case where the option of the background color being "black" or "white" is selected, there may be displayed a television image with a background color shown in FIG. 44.

(Remaining Battery Level Display and Radio Reception Level Display)

Next, the remaining battery level display and radio reception level display will be described in more details.

First, the remaining battery level display will be described. For the television 10 of the present embodiment, two kinds of power supplies, i.e., a commercial power supply of AC100V and a battery power supply are available.

In a case where the commercial power supply of AC100V is used, the remaining battery level is not displayed. Also in a case where the battery power supply is used and where there is sufficient remaining battery power, it is preferable that the remaining battery level is not displayed. This makes it possible to prevent the remaining battery level from being displayed on the display 16 even in situations in which a user does not need to care about the remaining battery level, thereby preventing the remaining battery level display from hindering an image being displayed.

Meanwhile, in a case where the battery power supply is used and where the remaining battery power is insufficient, it is preferable to display the remaining battery level. By thus displaying the remaining battery level according to need, it is possible to notify a user of insufficiency of the remaining battery power. In a case where the remaining battery power is insufficient, the user can therefore continuously use the television 10 by charging the battery before the battery runs out or by using the commercial power supply of AC100V.

Next, the radio reception level display will be described. The television 10 of the present embodiment achieves radio reception with the use of radio frequency bands of 2.4 GHz and 5 GHz.

These radio frequency bands sometimes conflict with frequency bands used in various radio communication devices (e.g., Bluetooth (Registered Trademark), wireless LAN, etc.) which do not require a license of radio communication and in electronic devices such as a microwave. Accordingly, the television 10 is sometimes subject to an influence of a magnetic field, static electricity, radio disturbance, etc. caused by these electronic devices.

In a case where the radio reception level declines due to radio disturbance etc. caused by an electronic device, the television 10 displays the radio reception level. This makes it possible to notify a user of a decline in radio reception level. In a case where the radio reception level has declined, the user can solve the decline in radio reception level, for example, by distancing the television 10 from the electronic device causing the decline in radio reception level, and thus can continue, for example, watching or recording an image of high quality. By thus displaying the radio reception level in a case where there occurs a decline in radio reception level, it is possible to improve convenience of a user.

Note that such an arrangement is also possible in which a user can determine whether to display or hide the remaining battery level and the radio reception level.

Next, with reference to FIG. 43, the following describes displaying and hiding of the remaining battery level and the radio reception level during calendar/clock display. During calendar/clock display, it is preferable that a channel sign is not displayed and a clock is not displayed in the normal way. In this case, displaying and hiding of the remaining battery level and the radio reception level may be switched between in the mode 1 through 3 as follows.

According to the television 10, a user can select (set) a desired one from operation modes (operation modes 1 through 3 described later are operation modes concerning brightness of the display 16 during use of the battery power supply) (the modes 1 through 3 in FIG. 43). Further, it is possible to individually determine whether or not the remaining battery level is displayed on the screen and whether or not the radio reception level is displayed on the screen.

It is also possible to employ an arrangement in which whether the remaining battery level and the radio reception level are displayed or not during the calendar/clock display is determined in conjunction with these settings (see FIG. 43). For example, the following arrangement is possible. In a case where a user has chosen "to display" the remaining battery level and the radio reception level on the screen, both of the remaining battery level and the radio reception level are displayed in the operation mode 1 and the operation mode 2, and neither the remaining battery level nor the radio reception level are displayed in the operation mode 3.

Meanwhile, in a case where the user has chosen "not to display" the remaining battery level and the radio reception level on the screen, neither the remaining battery level nor the radio reception level are displayed in any of the operation modes 1 through 3. Meanwhile, in a case where the user has chosen "to display" the remaining battery level and "not to display" the radio reception level, only the remaining battery level is displayed in the operation mode 1 and the operation mode 2, and neither the remaining battery level nor the radio reception level are displayed in the operation mode 3.

(In Case of Using Battery Power Supply)

Figure 69:
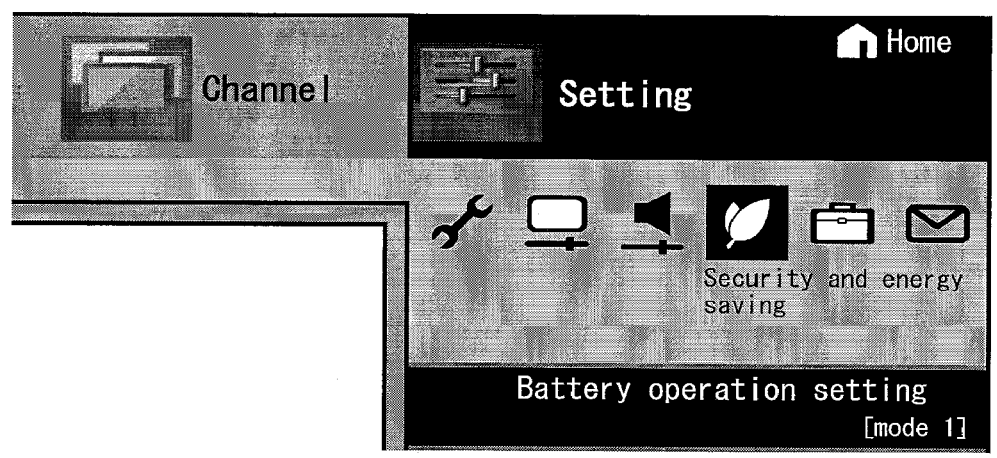
FIG. 69 is an explanatory view for explaining a user's operation for setting display brightness during use of a battery power supply.

With reference to FIG. 69, the following description will discuss the aforementioned operation modes. FIG. 69 is an explanatory view for explaining how a user sets the brightness of the display 16 in a case of using the battery power supply.

The operation modes in the case of using the battery power supply include an operation mode 1 in which brightness of a video image (i.e. brightness of the display 16) is reduced, an operation mode 2 in which brightness of a video image is further reduced as compared to the operation mode 1, and an operation mode 3 in which brightness of a video image is equal to brightness in a case of using a commercial power supply (i.e. brightness of a video image is not reduced).

In a case where the operation mode is the operation mode 1, the television 10 can reduce consumption of the battery by reducing power consumption for display of an image as compared to a case where brightness of a video image is not reduced, thereby enabling a user to view the television 10 with a longer time. In a case where the operation mode is the operation mode 2, the television 10 further reduces consumption of the battery as compared to the operation mode 1, thereby enabling the user to view the television 10 with a further longer time. In a case where the operation mode is the operation mode 3, although the television 10 enables the user to view the television 10 with a shorter time as compared to the operation mode 1, the television 10 enables the user to view a video image with the same brightness as in the case of using the commercial power supply.

The user sets the operation mode in such a manner that home menu>setting>security and energy saving>battery operation setting are sequentially selected from the top menu as shown in FIG. 69. Furthermore, in the battery operation setting, the operation mode is selected from the operation modes 1 (mode 1 in FIG. 69) to 3.

(In Case of Using Commercial Power Supply)

Figure 70:
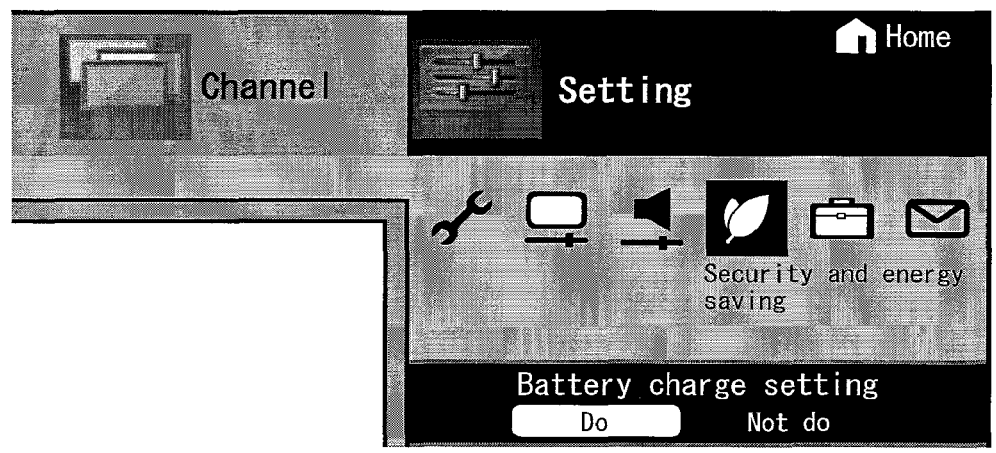
FIG. 70 is an explanatory view for explaining a user's operation for charging a battery during use of a commercial power supply.

With reference to FIG. 70, the following description will discuss how a user charges a battery in the case of using the commercial power supply. FIG. 70 is an explanatory view for explaining how the user charges a battery in the case of using the commercial power supply.

The television 10 in accordance with the present embodiment can be set whether to charge a battery or not in the case of using the commercial power supply. By setting the television 10 not to charge a battery, it is possible to suppress deterioration of the battery, thereby lengthening the life of the battery.

The user sets the television 10 to charge a battery or not in such a manner that home menu>setting>security and energy saving>battery charge setting are selected sequentially from the top menu as shown in FIG. 70. In the battery charge setting, one of options to determine whether to charge a battery or not, i.e. "do" or "not do", is selected.

In a case where "do" is selected, the television 10 operates by using the commercial power supply and at the same time charges a battery. In a case where "not do" is selected, the television 10 operates by using the commercial power supply but does not charge a battery.

In the present embodiment, an explanation was provided above as to a case where the television 10 can operate by using two kinds of power supplies which are an AC 100V commercial power supply and a battery power supply. However, the present invention is not limited to this case. For example, the present invention may employ a configuration in which the monitor 1 or the display 16 can operate by using two kinds of power supplies which are an AC 100V commercial power supply and a battery power supply.

(Frame Touch Key)

The following description will discuss frame touch keys and a screen display relating to the frame touch keys. The frame touch keys herein are touch sensor buttons embedded in a bezel section (frame section of the display 16). In the present embodiment, one power supply key and seven multifunction keys are embedded in the bezel section at the right side of the display, and these eight keys constitute the frame touch keys. The multifunction keys are keys whose functions change depending on scenes.

Since frame touch keys are touch sensor buttons embedded in the bezel section, a user cannot know their existences and their functions. Accordingly, it is necessary to let the user know the existences and functions of the frame touch keys by some means.

The power supply key has a function of switching the power supply from an off-state to an on-state or from the on-state to the off-state. Therefore, by marking a surface of a portion of the bezel section in which portion the power supply key is embedded with a power supply icon indicative of the function of the power supply key, it is possible to let the user know the existence and the function of the power supply key. In contrast, since the multifunction keys change their functions depending on the scenes (display content of the display screen), marking a surface of the bezel section with icons cannot let the user know their functions properly.

Figure 46:
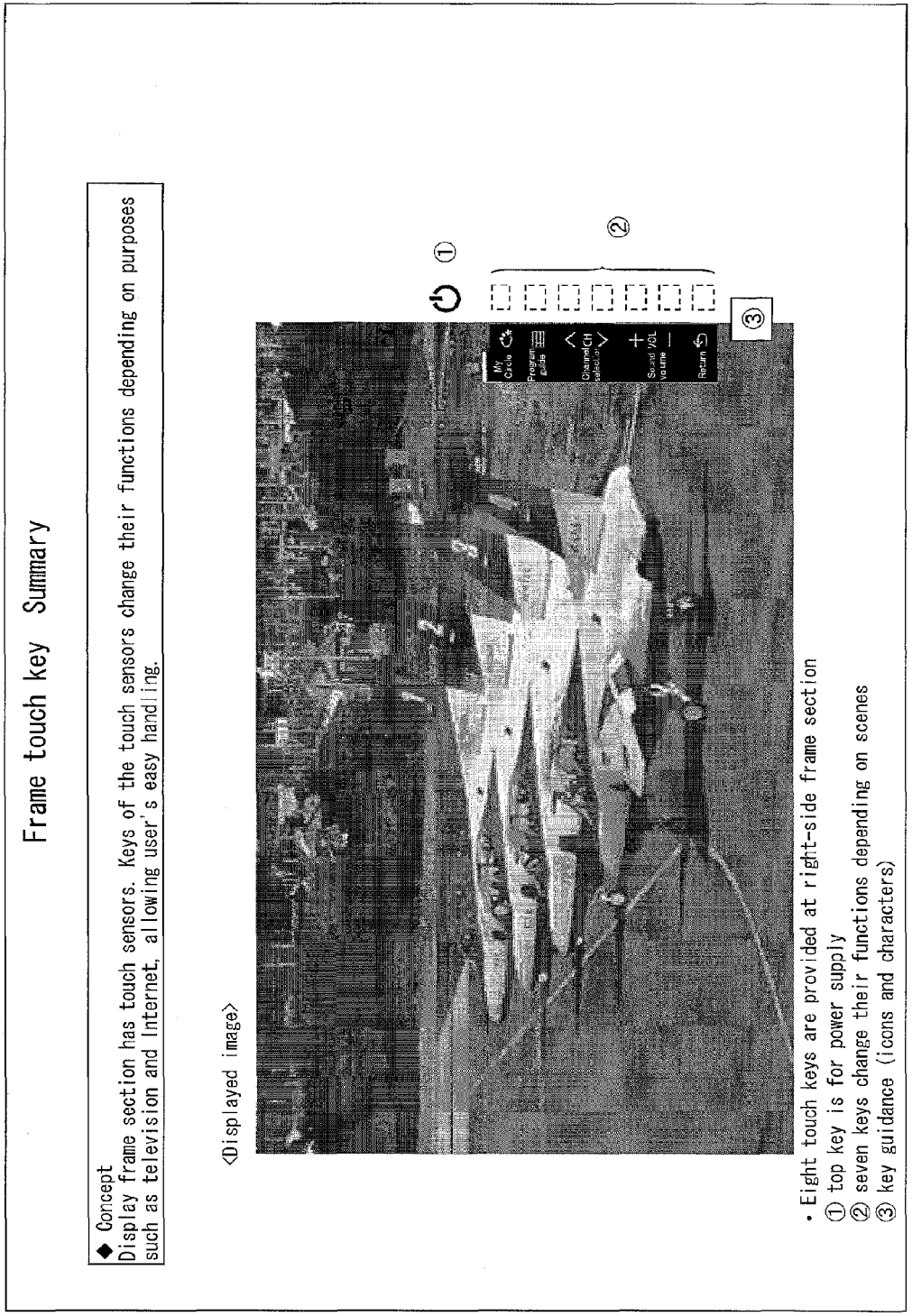
FIG. 46 is a view schematically showing a monitor in which a frame touch key guide is displayed on the display.

Accordingly, as shown in FIG. 46, images (hereinafter "icon" or "guidance icon" and/or text strings (hereinafter "guide" or "text guidance") indicative of the functions of the multifunction keys are OSD displayed on the display of the monitor 1. icons and/or guides are displayed at positions adjacent to corresponding multifunction keys. To be more specific, the icons are displayed at positions adjacent to the corresponding multifunction keys, and guides are displayed at positions adjacent to the corresponding icons. Hereinafter, icons and/or guides indicative of the functions of the multifunction keys are generally referred to as a "frame touch key guide".

Figure 47:
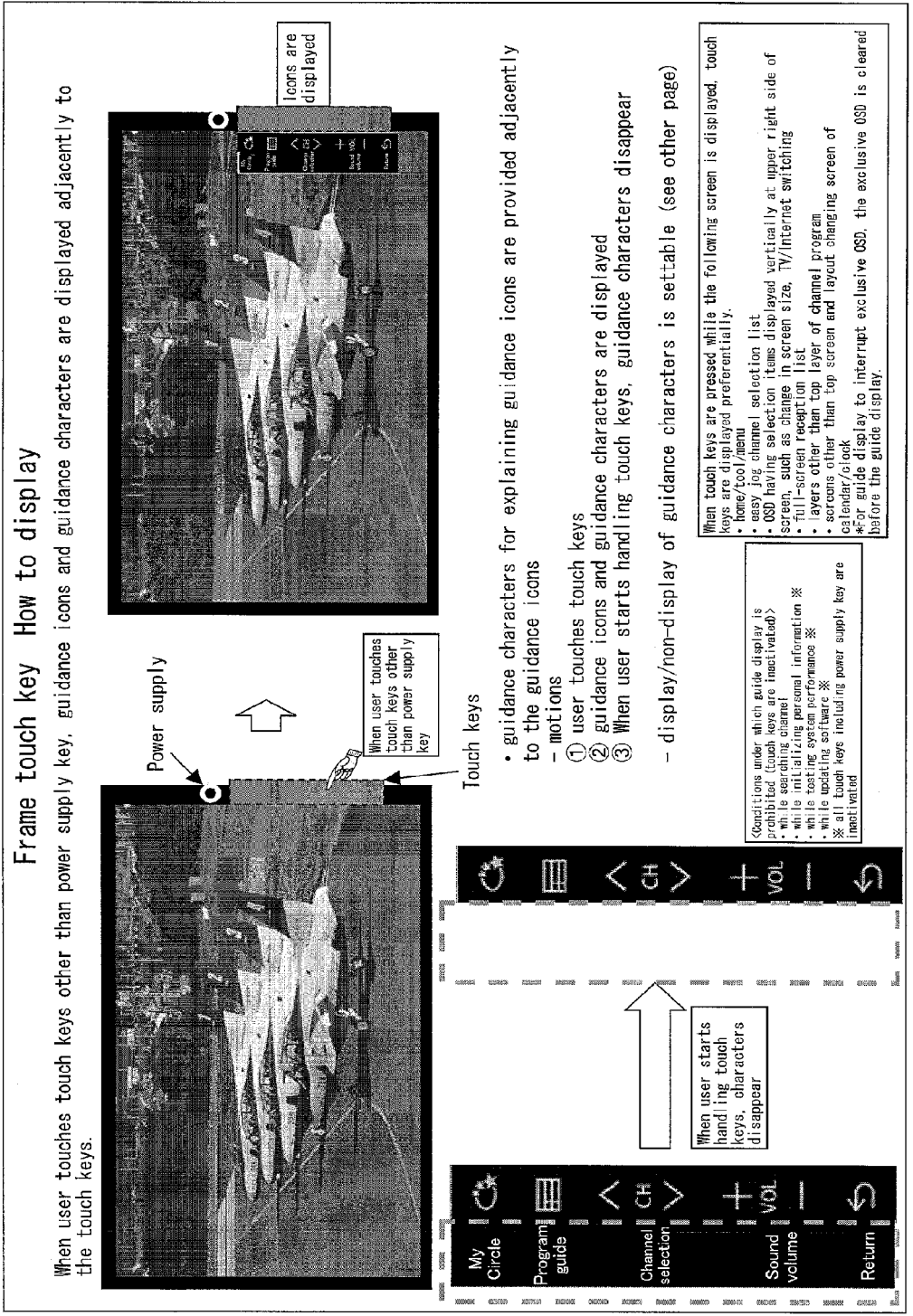
FIG. 47 is an explanatory view for explaining a timing at which display of the frame touch key guide starts.

FIG. 47 is an explanatory view for explaining timing to start display of the frame touch key guide.

As shown in FIG. 47, when detecting that one of the multifunction keys is touched, the monitor 1 causes the display 16 to OSD display the frame touch keys. When detecting that a user starts handling of the multifunction key (e.g. second touch on the multifunction key, handling of key has caused the corresponding function to be exerted), the monitor 1 stops (deletes) display of the guide. After deleting the guide, the monitor 1 continues to display the icons (as for timing to stop display of the icons, see the later description).

There may be employed a configuration that whether the guide is to be displayed or not is determined by a user in advance, as mentioned later. There may be employed a configuration that the guide is not displayed while searching a channel, while initializing personal information, while testing system performance, and while updating software. There may be employed a configuration that no operation, including the operation of the power supply key, is accepted while initializing personal information, while testing system performance, and while updating software.

There is a case where when the frame touch key guide is to be OSD displayed, other UI (user interface) is already OSD displayed. In a case where the UI already OSD displayed is an exclusive UI which is banned to be displayed simultaneously with other UI, the monitor 1 stops displaying the exclusive UI and then starts displaying the frame touch key guide. In a case where the UI already OSD displayed is a non-exclusive UI which is allowed to be displayed simultaneously with other UI, the monitor 1 displays the non-exclusive UI and the frame touch key guide simultaneously.

At that time, the monitor 1 determines which UI is displayed preferentially (which UI is displayed at the front) according to the kind of the non-exclusive UI already OSD displayed. An example of the non-exclusive UI to which the frame touch key guide is to be displayed preferentially is a UI on a home/tool/menu screen. As for other non-exclusive UI to which the frame touch key guide is to be displayed preferentially, see the descriptions in FIG. 47.

Figure 48:
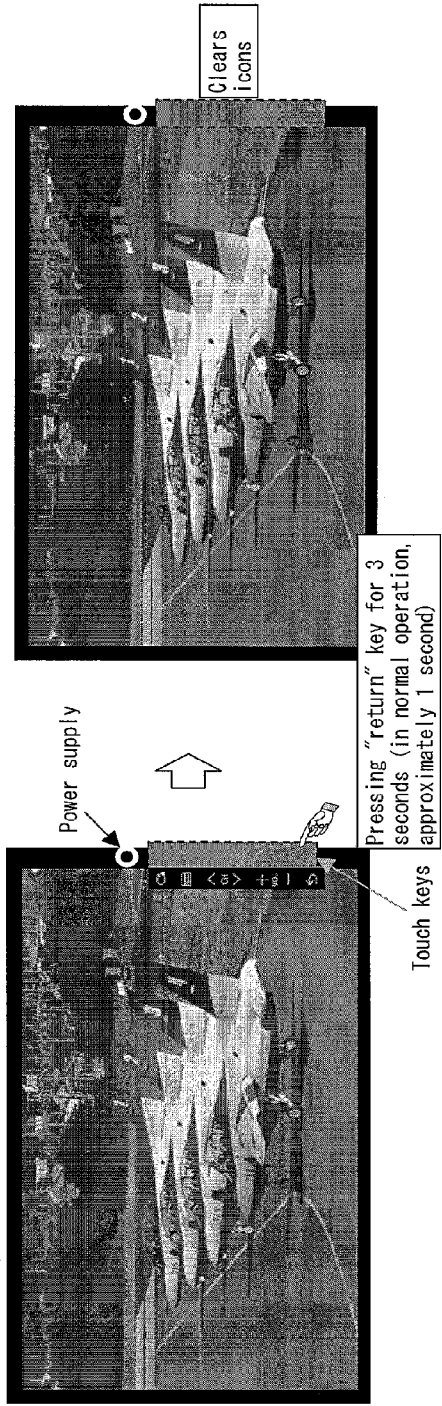
FIG. 48 is an explanatory view for explaining a timing at which display of the frame touch key guide ends.

FIG. 48 is an explanatory view for explaining timing to stop (delete) displaying the frame touch key guide.

As shown in FIG. 48, in a case where the frame touch key guide is displayed and then no operation is made for 60 seconds or in a case where a "return" key (key functioning as a "return" key among the multifunction keys) is pressed for a long time (e.g. pressed for 3 seconds or more), the monitor 1 stops (deletes) displaying the frame touch key guide. In a case where an operation to instruct the monitor 1 to display the home/tool/menu screen is made while the frame touch key guide is displayed, the monitor 1 stops displaying the frame touch key guide and then starts displaying the home/tool/menu screen. An operation serving as a trigger for stopping displaying the frame touch key guide is not limited to an operation to instruct the monitor 1 to display the home/tool/menu screen. As for other operation serving as a trigger for stopping displaying the frame touch key guide, see the descriptions in FIG. 48.

FIGS. 49 and 50 are views showing the lists of icons and guides to be displayed as the frame touch key guide in individual scenes (set conditions).

For example, as shown in the fifth column of FIG. 49, while the My Circle screen is displayed, six multifunction keys other than the third multifunction key from the top are used for (1) an operation to clear the My Circle screen, (2) an operation to switch the My Circle screen from the main screen to the sub screen, (3) an operation to change a focus (to rotate icons counterclockwise), (4) an operation to change a focus (to rotate icons clockwise), (5) a determining operation to select the focused icon, and (6) an operation to restore the screen from the My Circle screen to a screen displayed prior to the My Circle screen, respectively. A My Circle icon and "My Circle" (text guidance) are displayed adjacently to a first multifunction key, and a sub screen icon and "Sub" (text guidance) are displayed adjacently to a second multifunction key. Icons and text guidance displayed adjacently to other multifunction keys are determined similarly.

Figure 51:
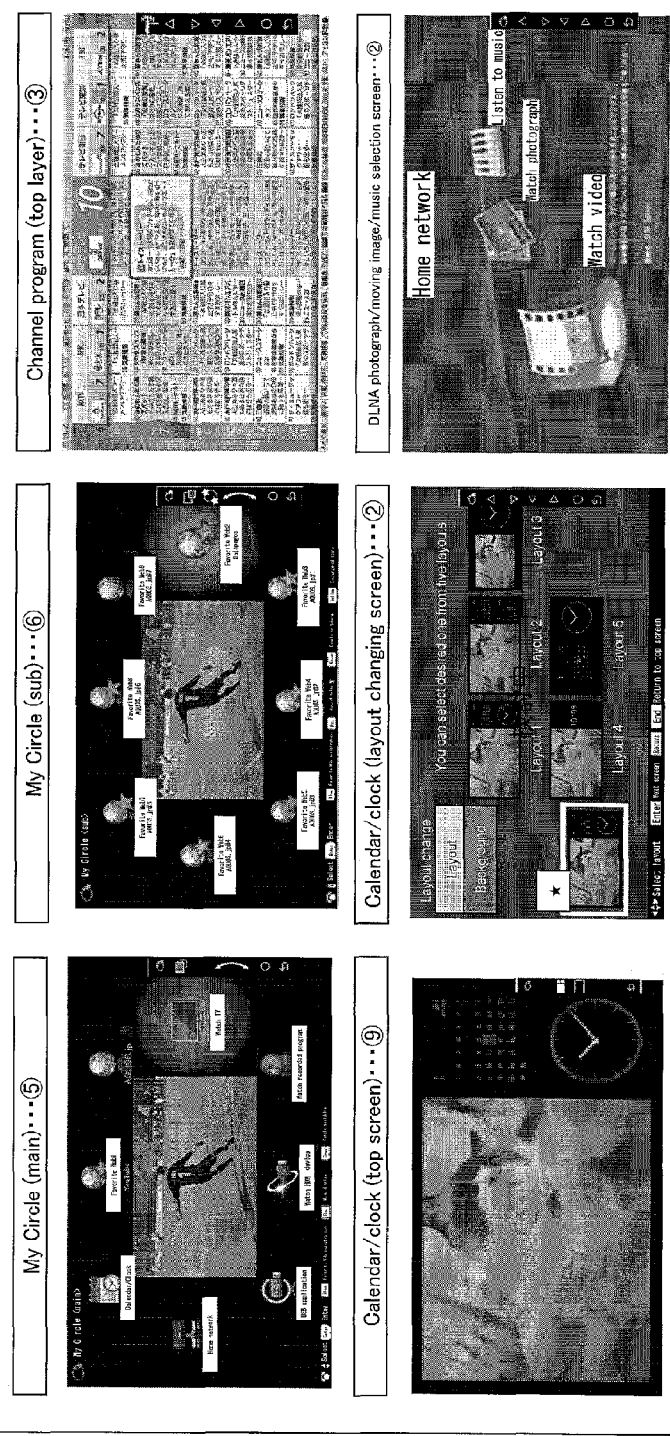
FIG. 51 is a view showing display examples of various UI screens overlapped with the frame touch key guide.

FIG. 51 is a view showing display examples of UI screens overlapped with the frame touch key guide. A screen at the upper left is the My Circle (main) screen overlapped with the frame touch key guide. A screen at the upper center is the My Circle (sub) screen overlapped with the frame touch key guide. A screen at the upper right is a channel program (top) screen overlapped with the frame touch key guide. A screen at the lower left is a calendar/clock (top) screen. A screen at the lower center is a calendar/clock (layout changed) screen overlapped with the frame touch key guide. A screen at the lower right is an UI screen of a home network (DLNA) application, overlapped with the frame touch key guide.

Figure 52:
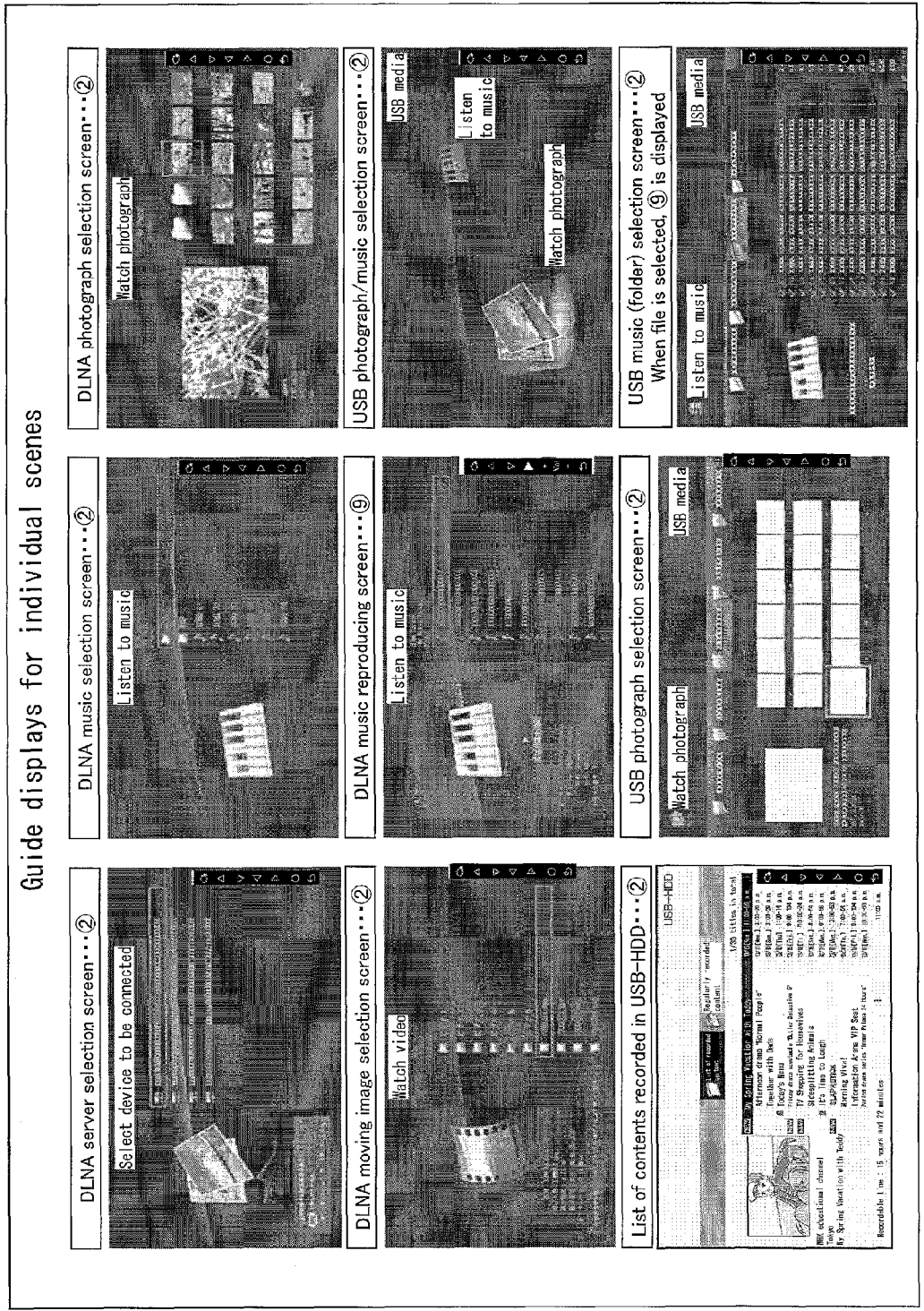
FIG. 52 is a view showing a display example of UI screens of a home network (DLNA) application overlapped with the frame touch key guide.

FIG. 52 is a view showing other UI screen of a home network (DLNA) application, overlapped with the frame touch key guide.

Figure 53:
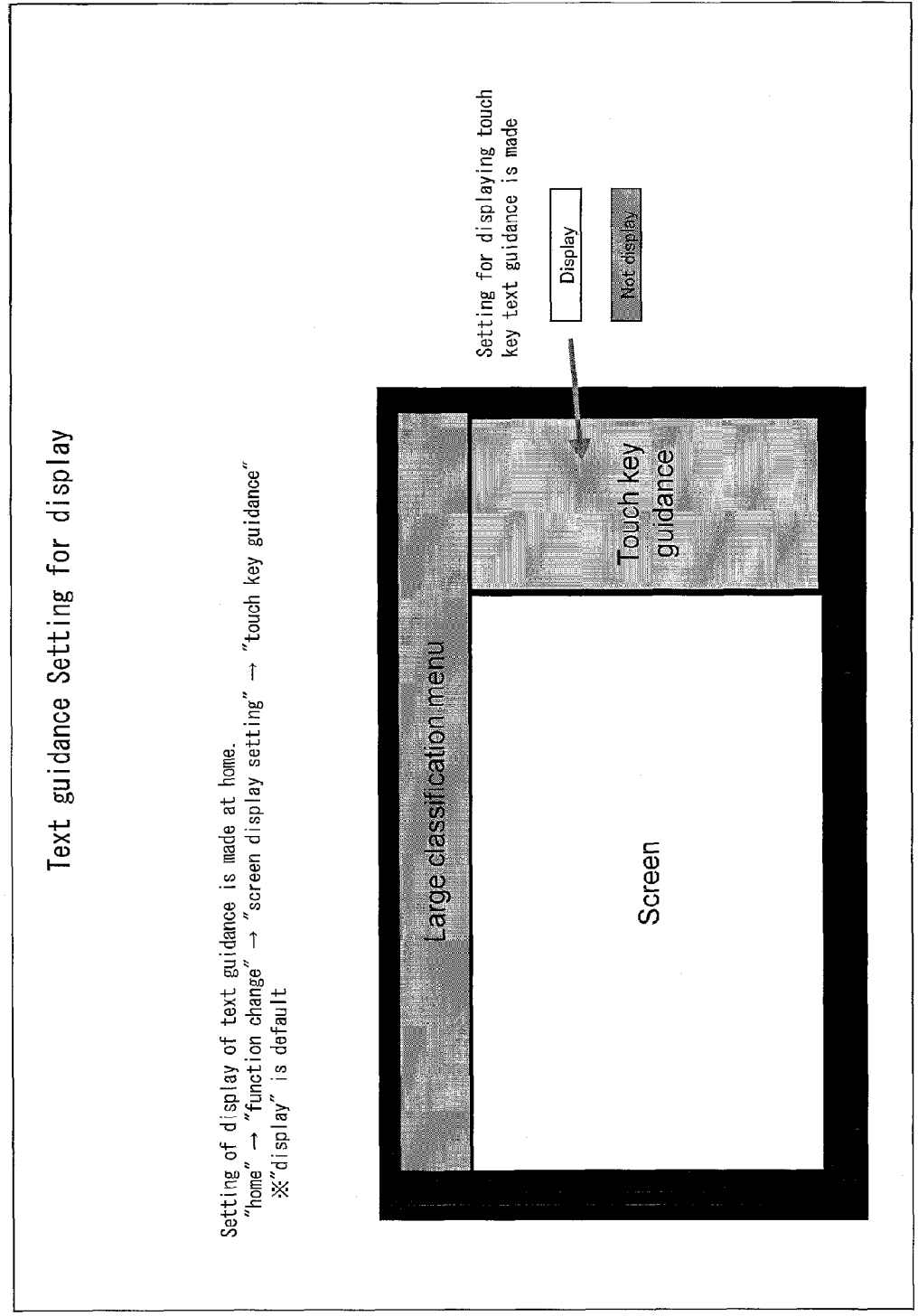
FIG. 53 is an explanatory view for explaining an operation of setting whether or not a text guidance is included in the frame touch key guide.

On the monitor 1, a user can set freely whether the frame touch key guide includes text guidance or not. As shown in FIG. 53, a setting window for setting appears, for example, by sequentially selecting home>function change>screen display setting>touch key guidance from the top menu.

Furthermore, as shown in FIG. 53, the setting window for setting is provided with a caption "Setting for displaying touch key text guidance is made", a "display" button to be selected when a user wants to incorporate the text guidance into the frame touch key guide, and a "non-display" button to be selected when the user does not want to incorporate the text guidance into the frame touch key guide.

Furthermore, when a multifunction key positioned at the lowest of the multifunction keys is pressed for a long time (e.g. pressed for 5 seconds or more), the monitor 1 displays a setting window for switching remote controls to be used.

As shown in FIG. 54, the setting window is also overlapped with the frame touch key guide. Pressing a multifunction key at the right side of a left-facing triangle selects a remote control with a remote control number 1, and pressing a multifunction key at the right side of a right-facing triangle selects a remote control with a remote control number 2.

(Numeric Key Input)

Figure 56:
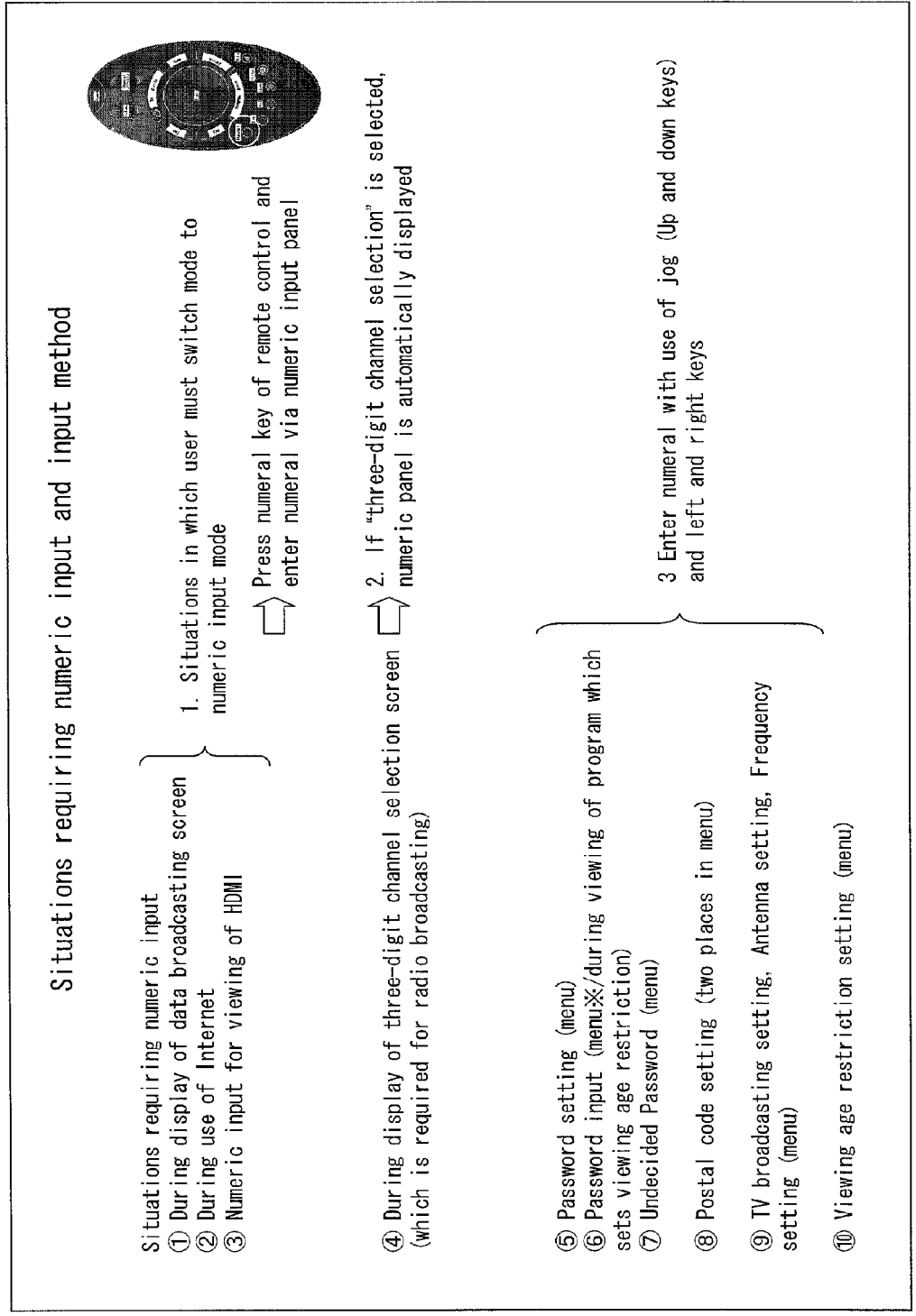
FIG. 56 is an explanatory view showing situations requiring numeric input and a numeric input method.

In the device of the present embodiment, numeric keys are removed from the remote control 51 (see FIG. 55). This requires another method for numeric input via the remote control without the use of conventional numeric keys, in situations which conventionally require numeric keys (such as data broadcasting and Internet) other than channel selecting operations. FIG. 56 shows situations which require numeric input in the present device. The following describes methods A through C below as the method for numeric input via the remote control.

<Method A>

For numeric input on a data broadcasting screen, during use of the Internet, during HDMI viewing, etc., it is necessary for a user to exchange the mode to a numeric input mode. In such situations, numeric input is accomplished by the method A.

According to the method A, a user pushes a "numeral" button (see FIG. 55) provided on the remote control. In response to this, a numeric input panel is displayed on the display 16 (see FIG. 55 and FIG. 57). The numeric input panel may be movable from a default position.

The numeric input panel displays 12 numerals (1 to 12) so that the user can input these numerals, as with conventional numeric keys. The user can select a numeral by moving a cursor displayed on the numeric input panel with the use of the jog dial or the cursor keys (up, down, left, and right keys). When the user pushes an enter key in a state where a numeral is being selected, the numeral is inputted.

Figure 58:
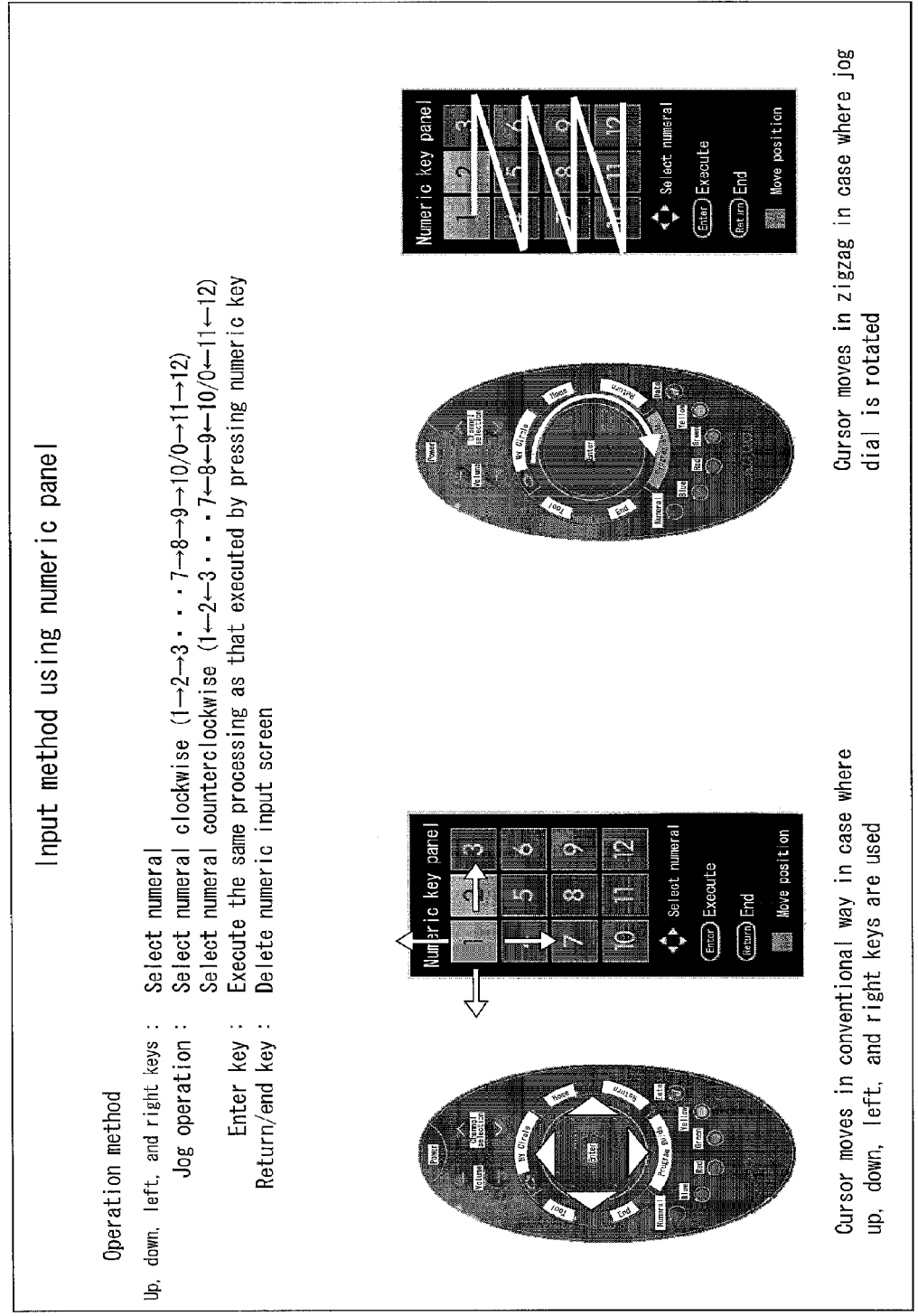
FIG. 58 is an explanatory view showing an example of how to operate the remote control in order to select a numeral on the numeric input panel.

As shown in FIG. 58, in a case where the cursor keys are used to select a numeral, the cursor for selecting a numeral can be moved up, down, left, and right on the numeric input panel displaying the 12 numerals. Meanwhile, in a case where the jog dial is used to select a numeral, rotating the jog dial clockwise changes a numeral being selected in the order of 12, 1, 2, 3, . . . , 9, 10/0, 11, 12, and 1, and rotating the jog dial counterclockwise changes a numeral being selected in the order of 1, 12, 11, 10/0, 9, . . . , 3, 2, 1, and 12. In a case where the user wants to hide the numeric input panel, the user just pushes a return/end key.

<Method B>

Figure 59:
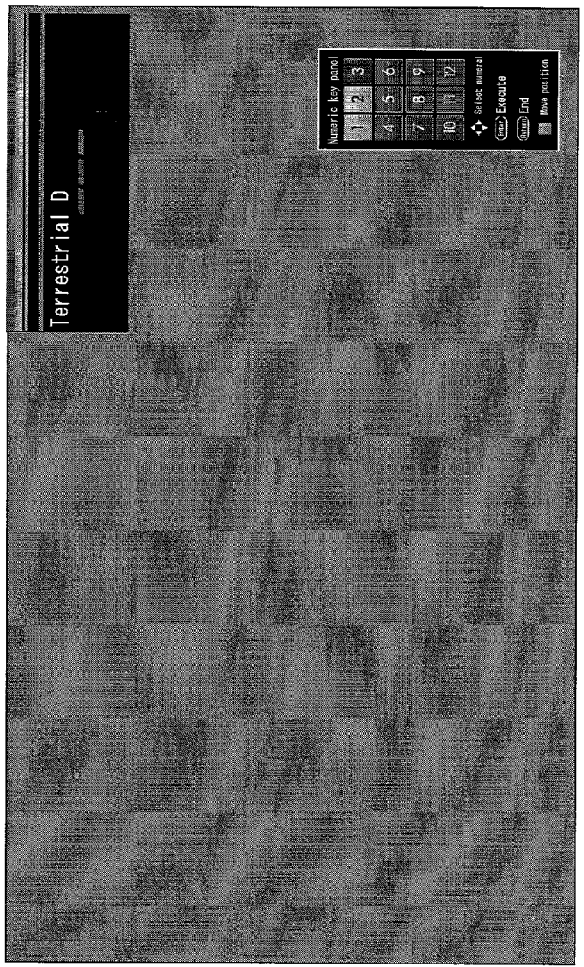
FIG. 59 is an explanatory view showing a state where the numeric input panel has been automatically brought up on the display screen in a case where an application requiring numeric input is activated.

The method B is a method for numeric input in cases of "three-digit channel selection". During display of a three-digit channel selection input screen (which is necessary for selection of a channel of CS broadcasting, radio broadcasting, or the like), the numeric input panel is automatically displayed in response to selection of "three-digit channel selection" (see FIG. 59). This numeric input panel and a method for numeric input are identical to those of the method A, and therefore are not explained in detail.

<Method C>

The method C is a method for use in input of a numeric string made up of the predetermined number of digits, such as a postal number, a frequency, a password, and a viewing age restriction (see FIGS. 60 through 63).

Figure 60:
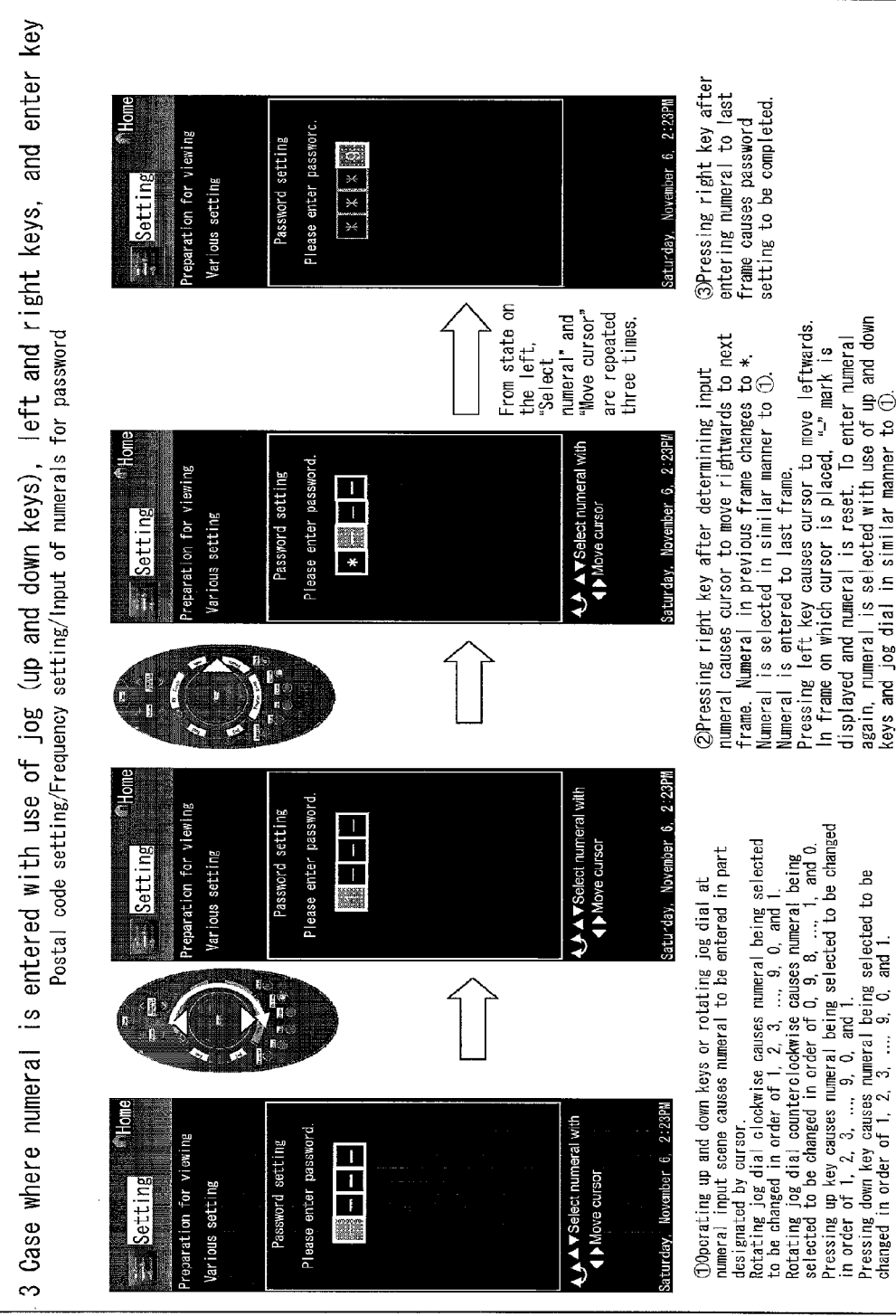
FIG. 60 is an explanatory view showing an example of how to operate the remote control in order to select a numeral in a case where an entry field for a four-digit password is displayed on the display screen.
Figure 61:
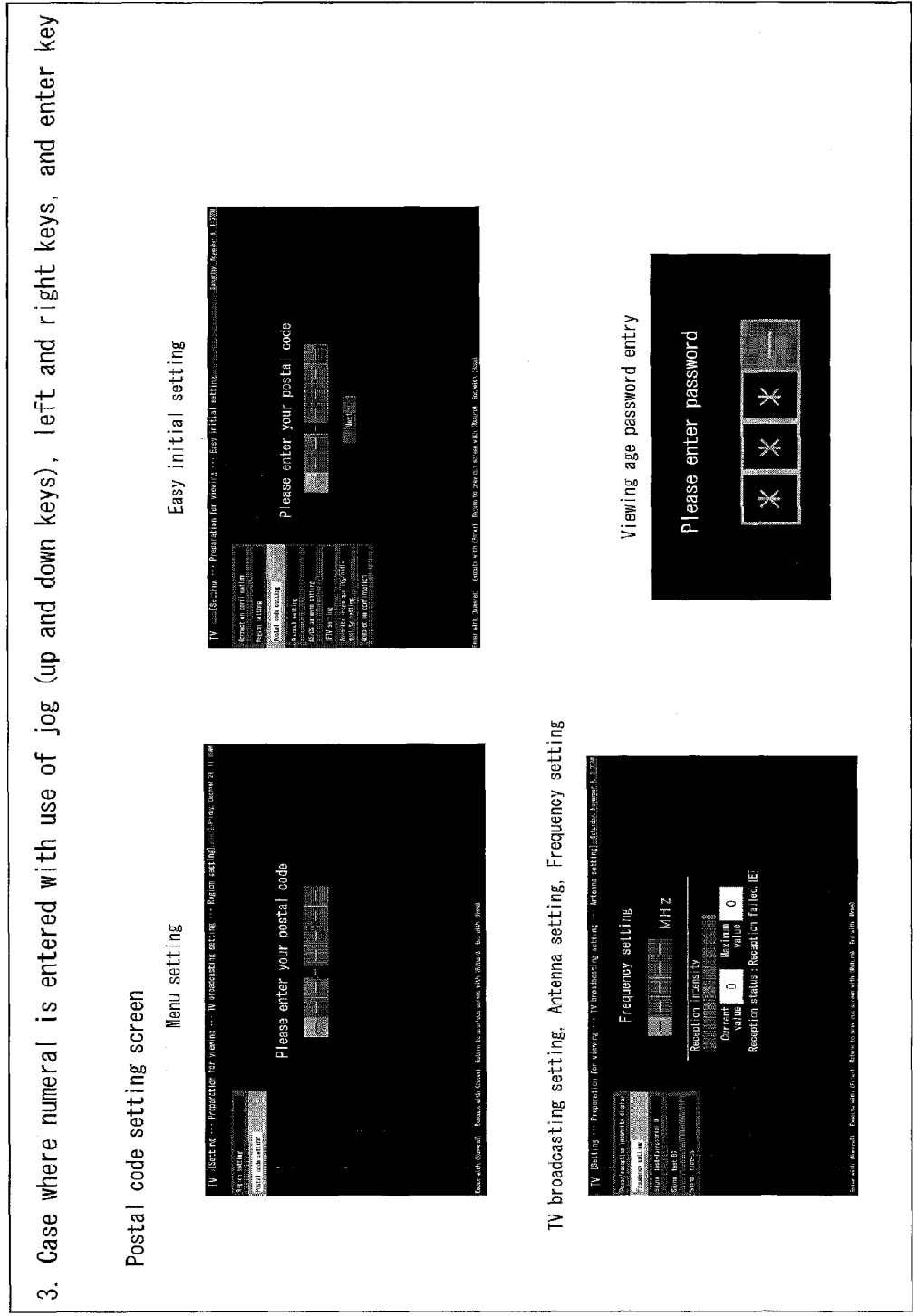
FIG. 61 is an explanatory view showing scenes in which a numeral is selected on the display screen via the remote control.
Figure 62:
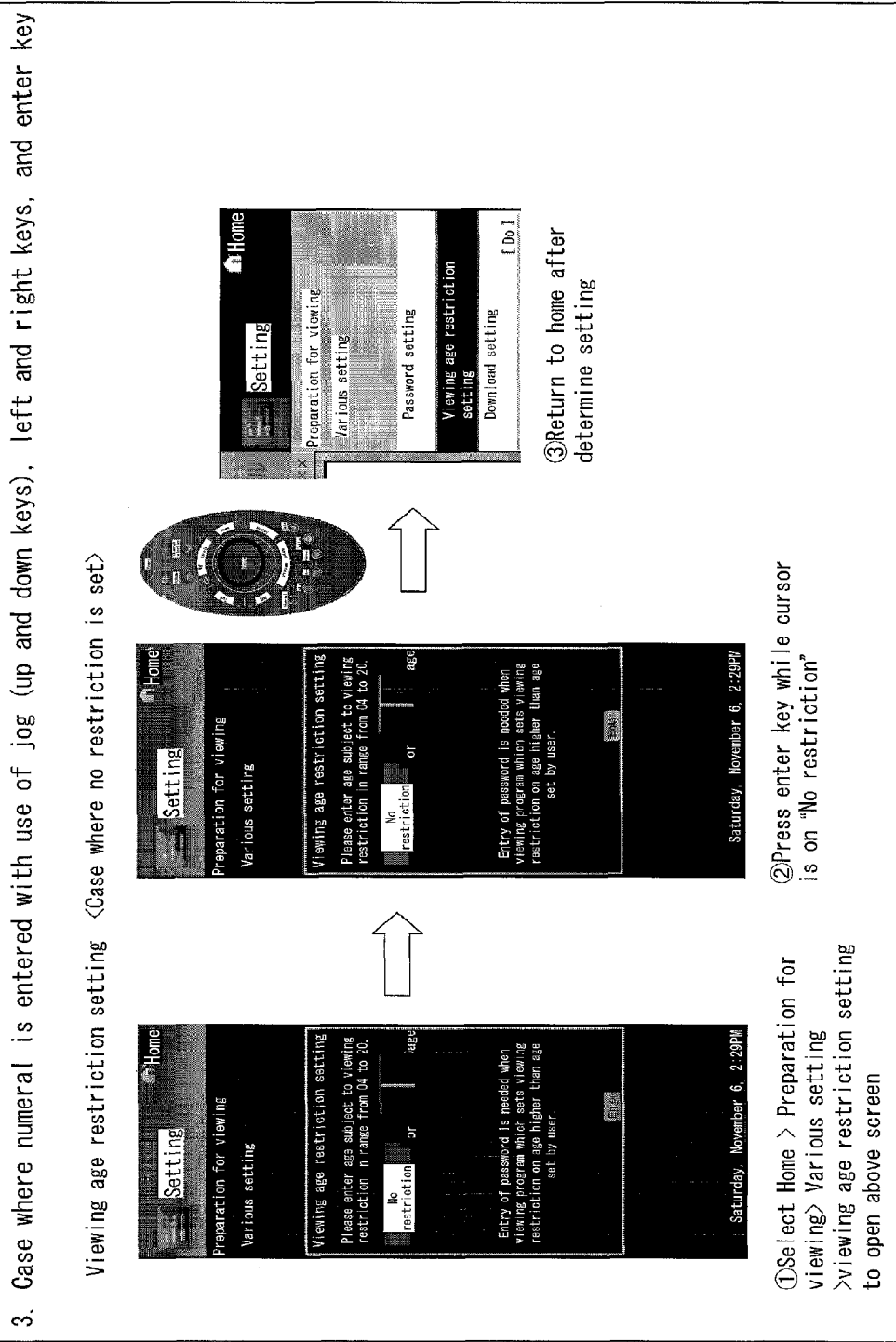
FIG. 62 is an explanatory view showing an example of how to operate the remote control in order to select an item in a case where an entry field for setting a viewing age restriction is displayed on the display screen.
Figure 63:
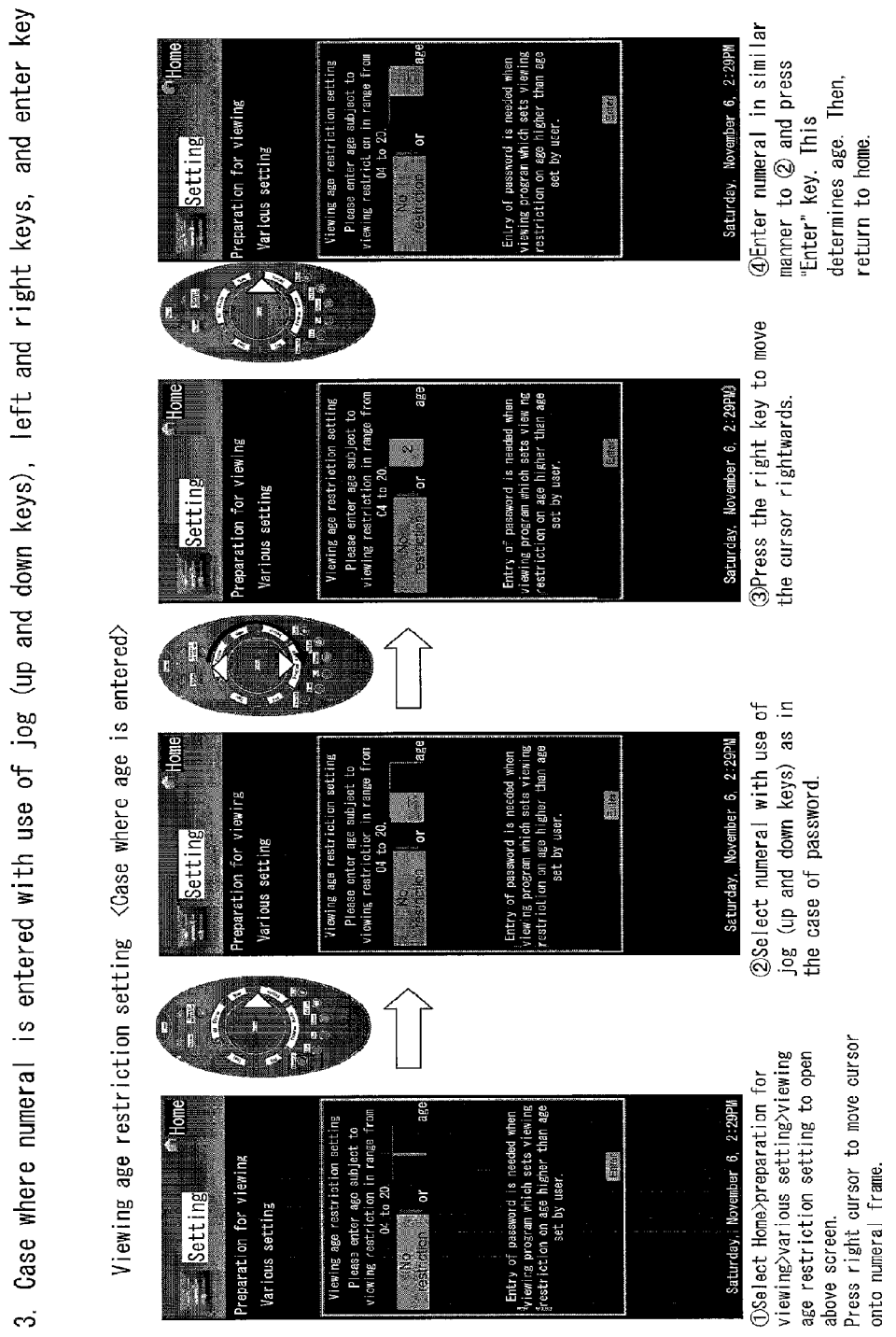
FIG. 63 is an explanatory view showing an example of how to operate the remote control in order to select an item in a case where an entry field for setting a viewing age restriction is displayed on the display screen.

The following describes a numeric input method according to the method C with reference to FIG. 60. Note that FIG. 60 shows an example in which a four-digit password is inputted.

On a screen for the numeric input according to the method C, boxes for input of a numeral made up of the predetermined number of digits are displayed. At first, the cursor is positioned on a leftmost box. The jog dial or the up and down cursor keys are used to select a number in the box on which the cursor is positioned. In a case where the jog dial is rotated clockwise or the up cursor key is pressed, the number being selected is changed in the order of 1, 2, 3, . . . , 9, 0, 1. Meanwhile, in a case where the jog dial is rotated counterclockwise or the down cursor key is pressed, the number being selected is changed in the order of 1, 0, 9, . . . , 3, 2, 1.

When a user pushes the right cursor key after determining a number in the box on which the cursor is positioned, the cursor is moved rightward to an adjacent box. Then, the user selects a number in the box to which the cursor has moved in a similar manner to that described above with the use of the jog dial or the up and down cursor keys. When the user pushes the left cursor key, the cursor moves leftward to the adjacent box, and the user can change the number in the box which the user has selected to another number.

By repeating the above operation, numbers in all of the boxes are selected. Then, when the user pushes the right cursor key while the cursor is being positioned on the rightmost box, setting of the numbers is completed.

The display control device of the present invention may include:

(i) a memory in which initial data indicative of an address of a recommended Internet website, and (ii) an address registration control section which, in a case where a user tries to reregister the address of the recommended Internet website, which is a default address registered on the menu screen, after having overwritten the address with another address, (i) permits the reregistration when it is carried out with the use of the initial data, but (ii) does not permit the reregistration when it is carried out with the use of data indicative of an address which is obtained by the user via the Internet and which is indicative of another internet website whose title entirely or partially coincides with that of the recommended Internet website.

The CPU 14 shown in FIG. 2 serves as the address registration control section.

(Animation Draw Update Rate)

The television 10 of the present embodiment may be configured to change the draw rate (frame rate) of the My Circle screen (circular menu) in accordance with a speed at which the icons displayed in a circle on the My Circle screen move. The following describes an arrangement in which the draw rate of the My Circle screen is changed in accordance with a speed at which the icons displayed on the My Circle screen move. Note that the moving animation of the icons on the My Circle screen is achieved by the graphic plane generating section 4 (animation generating means) as described above.

The following describes a generation rate of graphic planes in the graphic plane generating section 4. The panel controller 15 causes the graphic planes thus generated to be drawn on the display 16 at a frame rate identical to the generation rate. The frame rate of the My Circle screen can be thus changed in accordance with the moving speed of the icons.

Note that the moving speed of the icons displayed on the My Circle screen is designated by moving speed designating information indicative of a rotation speed of the jog dial 54. The moving speed designating information is a command sent from the remote control 51 in response to an operation of the jog dial 54 of the remote control 51. The command sent from the remote control 51 is received by a receiving section (command obtaining section) (not shown) of the television 10.

In a case where the graphic plane generating section 4 determines that the moving speed of the icons falls in a medium-speed range, the graphic plane generating section sets the generation rate of graphic planes at a predetermined generation rate (first frame rate). Meanwhile, in a case where the graphic plane generating section 4 determines that the moving speed of the icons falls in a high-speed range or a low-speed range, the graphic plane generating section 4 sets the generation rate of graphic planes at a generation rate (second frame rate), for example 60 frames/sec (hereinafter expressed by fps (Frames Per Second), higher than the generation rate set in the case where it is determined that the moving speed of the icons falls in the medium-speed range.

Specifically, in a case where it is determined that the moving speed of the icons falls in the low-speed range, the graphic plane generating section 4 generates graphic planes at a generation rate (frame rate) of 60 fps for example. In the case where the moving speed of the icons falls in the low-speed range, an amount of change in positions of the icons during 1 frame is small. Accordingly, generating graphic planes at the generation rate of 60 fps makes it possible to make an afterimage less noticeable, thereby achieving smooth animation.

In the case where the moving speed of the icons falls in the medium-speed range, the graphic plane generating section 4 generates graphic planes at a generation rate of 30 fps for example. In the case where the moving speed of the icons falls in the medium-speed range, an afterimage is noticeable during movement of the icons. Therefore, by reducing the generation rate of the graphic planes, the afterimage can be made less noticeable.

In the case where the moving speed of the icons falls in the high-speed range, the graphic plane generating section 4 generates graphic planes at a generation rate of 60 fps for example. In the case where the moving speed of the icons falls in the high-speed range, an amount of change in positions of the icons during 1 frame is large. Therefore, even in a case where the graphic planes are generated at the generation rate of 60 fps, the icons are displayed in a frame-by-frame manner, and therefore no noticeable afterimage is observed.

The graphic plane generating section 4 updates, at different rates, an image part and a text part that constitute an icon. The graphic plane generating section 4 redraws the image part every frame, and redraws the text part every n frames (n is an integer equal to or larger than 2). For example, the graphic plane generating section 4 updates a position of the image part on the My Circle screen at a rate of 60 fps, and updates a position of the text part on the My Circle screen at a rate of 30 fps.

Specifically, in a case where the positions of the image part and the text part are updated in a graphic plane generated at a certain point of time, the position of the image part is updated but the position of the text part is not updated in a graphic plane generated right after the graphic plane generated at the certain point of time. That is, the position of the text part is updated once every two graphic planes. Note that the present invention is not limited to this. The position of the text part may be updated every three graphic planes. That is, it is only necessary that the position of the text part be updated every n graphic planes.

By drawing the image part at 60 fps, which gives more priority to smoothness than to an afterimage, it is possible to achieve smooth moving animation. Further, by drawing the text part at 30 fps, which gives more priority to easiness of reading texts than to smoothness, it is possible to achieve animation allowing for easy reading of texts. It is thus possible to achieve both (i) animation allowing for smooth movement of the image part of the icon and (ii) animation allowing for easy reading of the text part.

Further, the graphic plane generating section 4 changes a color of the icons in accordance with a speed at which a user operates the jog dial 54. In a case where it is determined that the moving speed of the icons falls in the low-speed range, the graphic plane generating section 4 uses a large number of gradations (first number of gradations) for drawing of the icons. Meanwhile, in a case where it is determined that the moving speed of the icons falls in the medium-speed range or the high-speed range, the graphic plane generating section 4 uses a small number of gradations (second number of gradations) for drawing of the icons.

For example, in a case where the jog dial 54 is not operated, i.e., in a case where the icons are not moved, the graphic plane generating section 4 draws the icons in a manner which gives priority to design by using a variety of halftone colors. In a case where the jog dial 54 is operated at a low speed, i.e., in a case where the moving speed of the icons is low, the graphic plane generating section 4 draws the icons in a manner which gives priority to design by using a variety of halftone colors.

In a case where the icons are not moved, there occurs no afterimage, and in a case where the moving speed of the icons is low, there occurs no noticeable afterimage. Accordingly, in a case where the jog dial 54 is not operated or in a case where the jog dial 54 is operated at a low speed, the icons can be presented to a user in vivid colors.

Meanwhile, in a case where the jog dial 54 is operated at a medium speed or a high speed, i.e., in a case where the moving speed of the icons is high, the graphic plane generating section 4 draws the icons in a manner which gives priority to contrast by reducing the number of halftones which are likely to cause an afterimage. In a case where the icons are moved at a medium speed or a high speed, an afterimage becomes noticeable. In view of this, in a case where the jog dial 54 is operated at a medium speed or a high speed, the icons are thus displayed in colors with high contrast. This makes it possible to achieve animation which allows a user to feel less uncomfortable with the afterimage.

The present embodiment has dealt with a case where the generation rate of the graphic planes is 60 fps or 30 fps, but this is illustrative only, and the present invention is not limited to this.

According to the arrangement, the television 10 can suppress an afterimage during movement of menu items, and thereby improve visibility for a user.

<Modification 1>

The present embodiment has discussed, as an example of exchanging of icons on the My Circle screen, an arrangement in which a specific icon is determined on a sub screen, and then a target icon is determined on a main screen. Note, however, that the present invention is not limited to this. For example, it is also possible to employ an arrangement in which the target icon is determined on the main screen, and then the specific icon is determined on the sub screen. Further, it is also possible to employ an arrangement in which a double-sided arrow is displayed between the specific icon and the target icon in the process of exchanging the icons on the My Circle screen.

Figure 71:
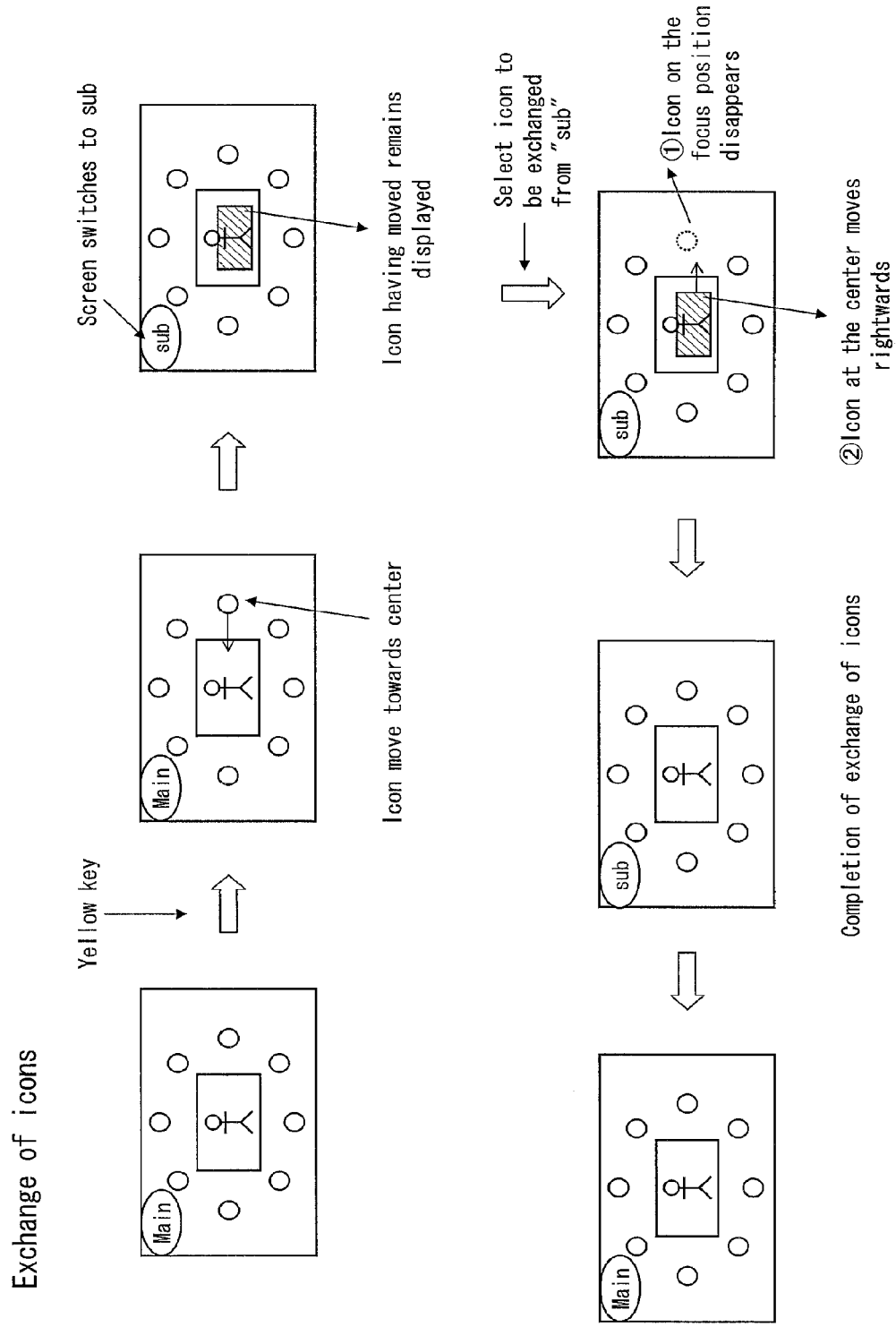
FIG. 71 is an explanatory view showing another example of a process of an icons exchanging operation on the My Circle screen.
Figure 72:
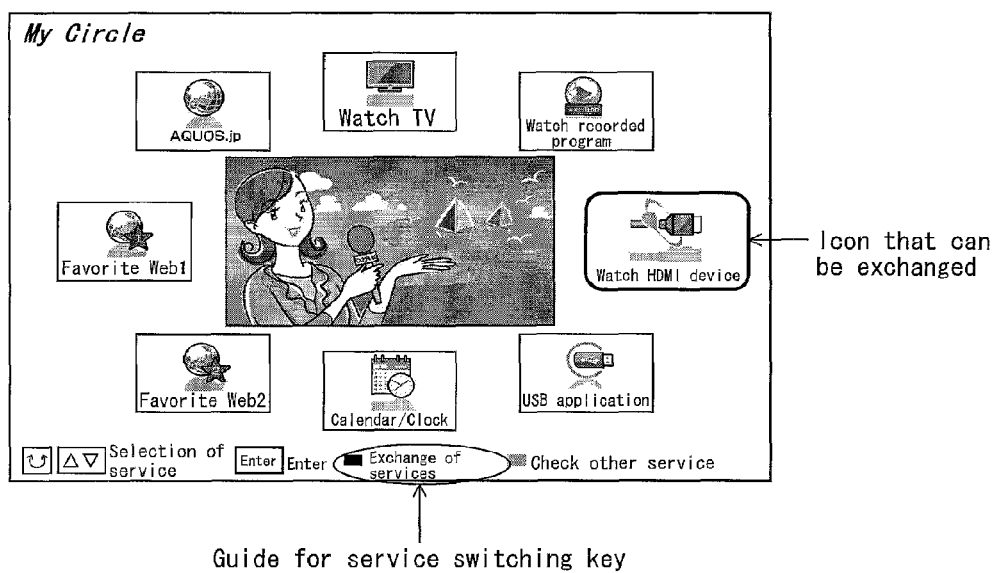
FIG. 72 is an explanatory view showing a change of a displayed screen of the display when determining an icon to be excluded from the main screen in the icons exchange operation on the My Circle screen.
Figure 73:
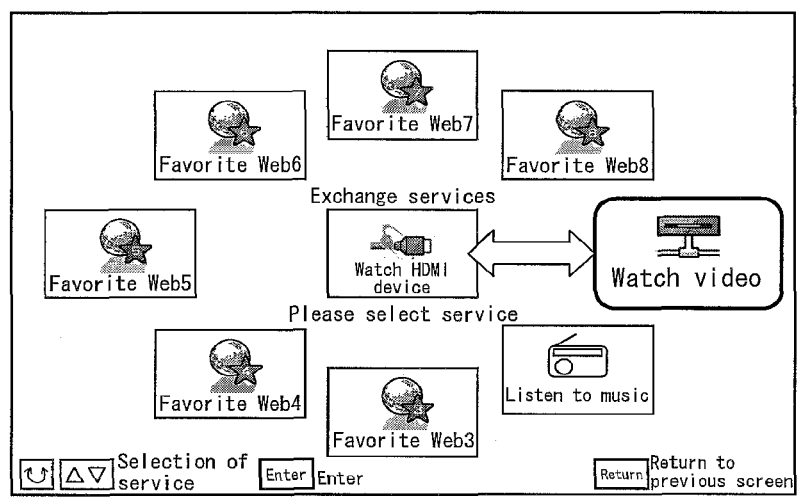
FIG. 73 is an explanatory view showing a change of a displayed screen of the display when determining an icon to be included in the main screen in the icons exchange operation on the My Circle screen.

The following describes another example of a process of an icon exchanging operation on the My Circle screen with reference to FIGS. 71 through 73. FIG. 71 is an explanatory view showing another example of a process of an icon exchanging operation on the My Circle screen. FIG. 71 shows how the display screen of the display 16 changes from a first screen to a fifth screen. FIG. 72 is an explanatory view showing, in the process of the icon exchanging operation on the My Circle screen, how the display 16 changes in a case where an icon is removed from the main screen. FIG. 73 is an explanatory view showing, in the process of the icon exchanging operation on the My Circle screen, how the display 16 changes in a case where an icon to be added to the main screen is determined.

When a user handles a predetermined button (e.g., green button) provided on the remote control 51, the main screen is displayed first as shown in FIG. 72. The first screen (left end) is a state in which the main screen is displayed on the display 16.

Next, the icon which the user wants to remove from the main screen is moved to the focus position by causing the icon to move in a circle with the jog dial 54 or the like of the remote control 51. When a predetermined key (e.g., a yellow button) provided on the remote control 51 as a key for instructing exchanging of icons is handled in this state, a target icon is determined and the first screen changes to a second screen as shown in FIG. 72. The focus position 55 is, for example, set at the right side of the content display region.

On the second screen, the target icon located on the focus position 55 on the main screen moves into the content display region. Then, the second screen changes to a third screen.

On the third screen, the My Circle screen is changed from the main screen to a sub screen. At this moment, a double-sided arrow is displayed between the target icon determined on the main screen and an icon located on the focus position 55 on the sub screen (see FIG. 73). On this sub screen, the target icon of the main screen that has moved into the content display region is kept being displayed on the content display region.

Next, an icon which the user wants to move from the sub screen to the main screen is moved to the focus position by causing the icon to move in a circle with the jog dial 54 or the like of the remote control 51. When the enter button 53 of the remote control 51 is operated in this state, a specific icon is determined. Then, the third screen changes to a fourth screen.

On the fourth screen, the specific icon thus determined is highlighted (see FIG. 73). Then, the specific icon is deleted, and the target icon located on the content display region is moved to the focus position 55.

Specifically, how the target icon pointed by the double-sided arrow, which points the specific icon located on the focus position 55 as well, is moved to the focus position 55 is displayed by animation.

Then, the fourth screen changes to the fifth screen. On the fifth screen, an operation of exchanging a sub icon on the sub screen is finished. Next, the fifth screen changes to a sixth screen.

On the sixth screen, the main screen including the specific icon exchanged with the target icon (removed from the sub icons on the sub screen) is displayed. Thus, an operation of exchanging a main icon on the main screen is finished.

According to the arrangement, (i) the normally displayed main screen and sub screen and (ii) the icon exchanging screens are similar in layout and operation method. This improves visibility and operability of the screens. In addition, the double-sided arrow between the specific icon and the target icon allows a user to easily understand that the specific icon and the target icon are to be exchanged with each other.

It is thus possible for a user to comfortably carry out an operation of exchanging a menu item included in a main menu and a menu item included in a sub menu.

<Modification 2>

Figure 74:
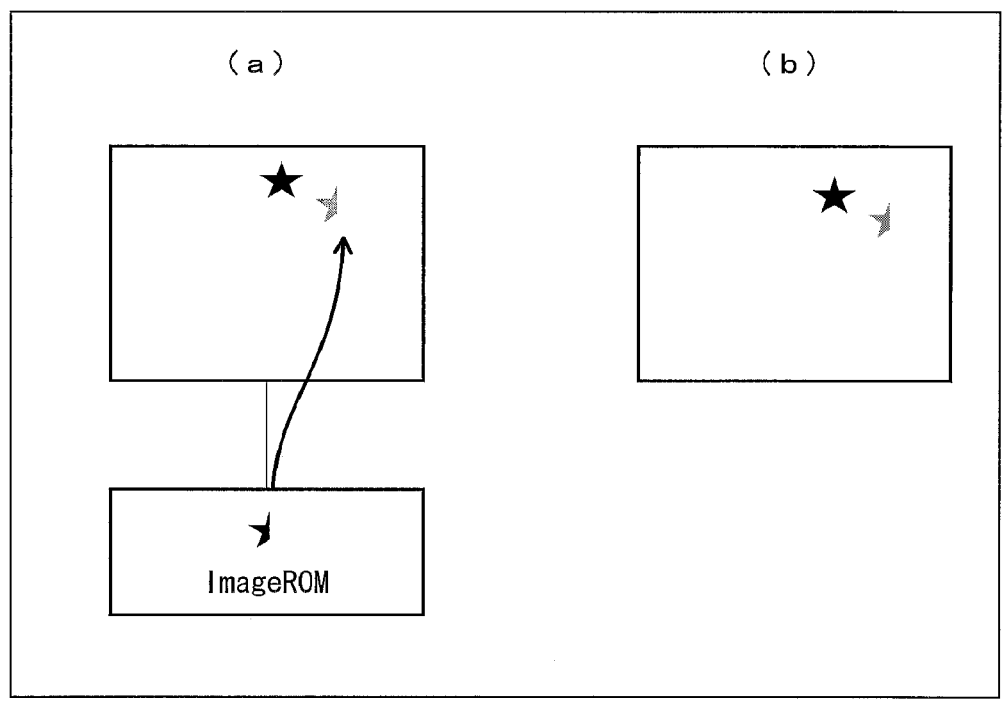
FIG. 74 is an explanatory view for explaining how a screen is generated in a case where a virtual image icon is drawn with the use of a real image icon.
Figure 75:
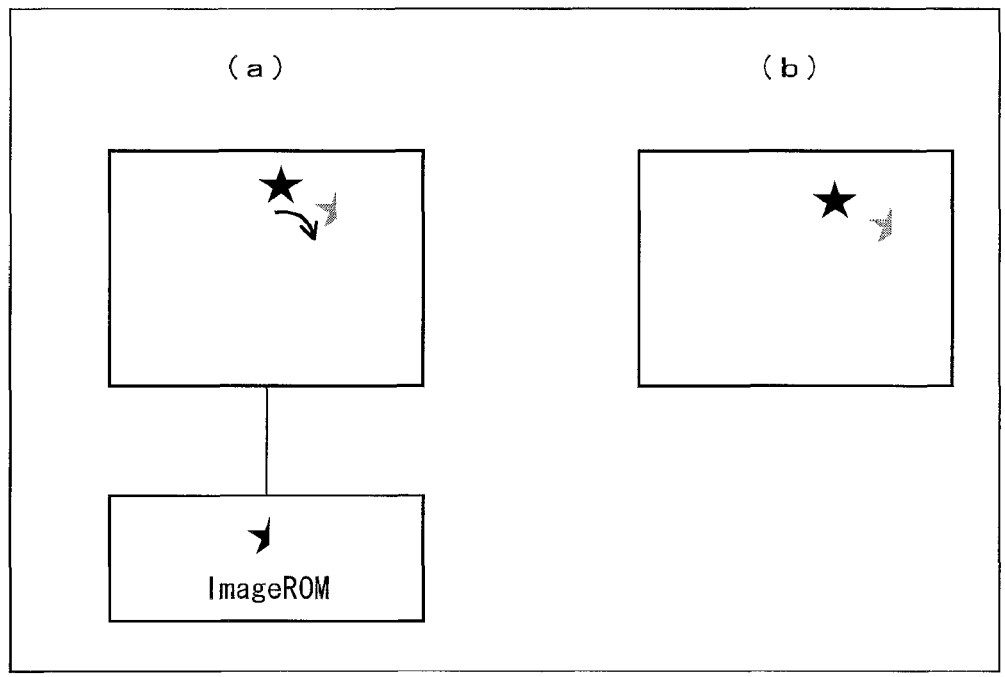
FIG. 75 is an explanatory view for explaining how a screen is generated in a case where a virtual image icon is drawn with the use of hardware acceleration.
Figure 76:
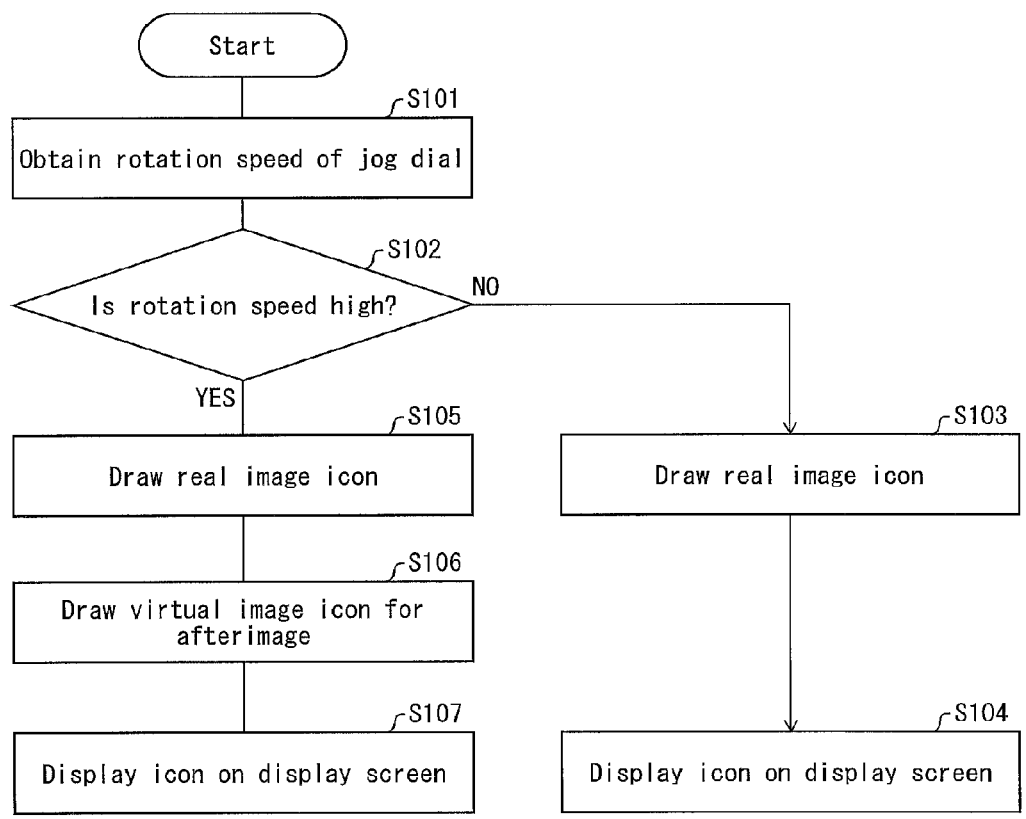
FIG. 76 is a flow chart showing a flow of display processing of the My Circle screen using the virtual image icon.

As a method for achieving smooth icon moving animation on the My Circle screen, it is possible to employ a method of drawing, in addition to a generally drawn icon (hereinafter sometimes referred to as a real image icon), an icon (hereinafter sometimes referred to as a virtual image icon (afterimage icon)) which represents an afterimage of the real image icon that has moved and which follows the movement of the real image icon. With reference to FIGS. 74 through 76, the present Modification discusses an arrangement in which smooth icon moving animation is achieved by drawing a virtual image icon in addition to a real image icon on the My Circle screen.

(Use of Real Icon)

First, with reference to FIG. 74, the following describes an arrangement in which a virtual image icon is drawn with use of a real image icon. FIG. 74 is an explanatory view for explaining a process for generating a screen in a case where a virtual image icon is drawn with use of a real image icon.

As shown in (a) of FIG. 74, the graphic plane generating section 4 (first animation generating means, second animation generating means) generates a graphic plane on which a real image icon is drawn (hereinafter sometimes referred to as a real image graphic plane (first animation)), with the use of image data read out from a UI image buffer (ImageROM in FIG. 74). Further, the graphic plane generating section 4 generates a graphic plane on which a virtual image icon is drawn (hereinafter sometimes referred to as a virtual image graphic plane (second animation)) with the use of the real image icon drawn on the real image graphic plane. Specifically, the virtual image graphic plane is generated by drawing the virtual image icon with reference to the image data which is referred to for drawing of the real image icon.

The real image graphic plane and the virtual image graphic plane generated by the graphic plane generating section 4 are supplied to the second mixer 5*c*. As shown in (b) of FIG. 74, the second mixer 5*c* generates a graphic plane for display (third animation) by superimposing the virtual image graphic plane that has been made semi-transparent on the real image graphic plane according to alpha blending.

(Hardware Acceleration)

Next, with reference to FIG. 75, the following describes an arrangement in which a virtual image icon is drawn with the use of hardware acceleration. FIG. 75 is an explanatory view for explaining a process for generating a screen in a case where a virtual image icon is drawn with the use of hardware acceleration.

As shown in (a) of FIG. 75, the graphic plane generating section 4 generates a real image graphic plane with the use of image data read out from the UI image buffer. Further, the graphic plane generating section 4 generates a virtual image graphic plane by drawing, with the use of hardware acceleration, a virtual image icon on the basis of the real image icon drawn on the real image graphic plane.

The real image graphic plane and the virtual image graphic plane generated by the graphic plane generating section 4 are supplied to the second mixer 5*c*. As shown in (b) of FIG. 75, the second mixer 5*c* generates a graphic plane for display (third animation) by superimposing the virtual image graphic plane that has been made semi-transparent on the real image graphic plane according to alpha blending.

(Display Processing of My Circle Screen)

Next, with reference to FIG. 76, the following describes a flow of display processing of the My Circle screen with the use of a virtual image icon. FIG. 76 is a flow chart showing a flow of display processing of the My Circle screen with the use of a virtual image icon.

When a user rotates the jog dial 54 of the remote control 51, the television 10 obtains rotation speed of the jog dial 54 (step S101) as shown in FIG. 76. The rotation speed of the jog dial 54 thus obtained is supplied to the CPU 14.

The CPU 14 determines whether the rotation speed of the jog dial thus supplied is high or not (step S102). A method for determining whether the rotation speed of the jog dial thus supplied is high or not can be, but is not limited to, a method of determining whether or not the rotation speed is higher than a predetermined threshold value, for example.

In a case where the rotation speed of the jog dial is not high (i.e., is low) (NO in step S102), the graphic plane generating section 4 of the CPU 14 generates a real image graphic plane by drawing a real image icon (step S103).

The second mixer 5*c* generates an image signal for displaying the My Circle screen by superimposing the real image graphic plane on an output image of the image signal processing circuit 5*b*. The image signal generated by the second mixer 5*c* is supplied to the panel controller 15, and is then displayed on the display 16 (step S104).

In a case where the rotation speed of the jog dial is high (YES in step S102), the graphic plane generating section 4 first generates a real image graphic plane by drawing a real image icon (step S105).

Next, the graphic plane generating section 4 generates a virtual image graphic plane by drawing a virtual image icon (step S106).

The second mixer 5*c* generates an image signal for displaying the My Circle screen by superimposing the real image graphic plane and the virtual image graphic plane on an output image of the image signal processing circuit 5*b*. The image signal generated by the second mixer 5*c* is supplied to the panel controller 15, and is then displayed on the display 16 (step S107).

The present Modification describes a case where alpha blending is used, as an example of a method for superimposing a graphic plane on which a virtual image icon is drawn on a graphic plane on which a real image icon is drawn, but the present invention is not limited to this.

According to the arrangement, the television 10 achieves smooth icon moving animation even in a case where a draw update rate is reduced in order to increase the number of icons which simultaneously move in a circle on the My Circle screen.

This makes it possible to reduce the draw update rate. Therefore, a low-cost chip that could not be conventionally employed as the CPU 14 due to its low draw update capacity can be a candidate for the CPU 14. Further, it is possible to achieve smooth icon moving animation even in a case of a television (so-called 4K2K television) including a display having a resolution of approximately 4000×2000 in which the draw update rate need be low due to its high resolution.

Further, in the case where a virtual image icon is drawn with the use of a real image icon, a new icon for drawing a virtual image icon need not be stored in the UI image buffer, and it is therefore possible to prevent icon data from doubling. In the case where a virtual image icon is drawn with the use of hardware acceleration, it is possible to minimize a load applied to the CPU 14.

[Additional Remark 1]

According to the arrangements disclosed in Patent Literatures 1 through 3, no attention is paid to a problem that occurs in a case where content is displayed within a circular ring (circular orbit), on which menu items or icons are arranged, on a menu screen allowing a user to select a desired item.

For example, the menu screen is displayed in a case where a user who is watching TV wants to exchange the content to another one. In this case, it is preferable to use a user interface which allows the user to select another content while continuously viewing a television program, as in Patent Literature 1.

However, Patent Literatures 2 and 3 neither disclose nor suggest that content is displayed simultaneously with the ring of icons.

Meanwhile, Patent Literature 1 discloses that (i) menu items are displayed as a frame of rectangles along four sides of a display screen and (ii) a television image is displayed in a reduced sized inside the frame. However, since the menu items are disposed along the four sides of the display screen with no space therebetween, there is a problem that layout flexibility is extremely low.

Figure 64:
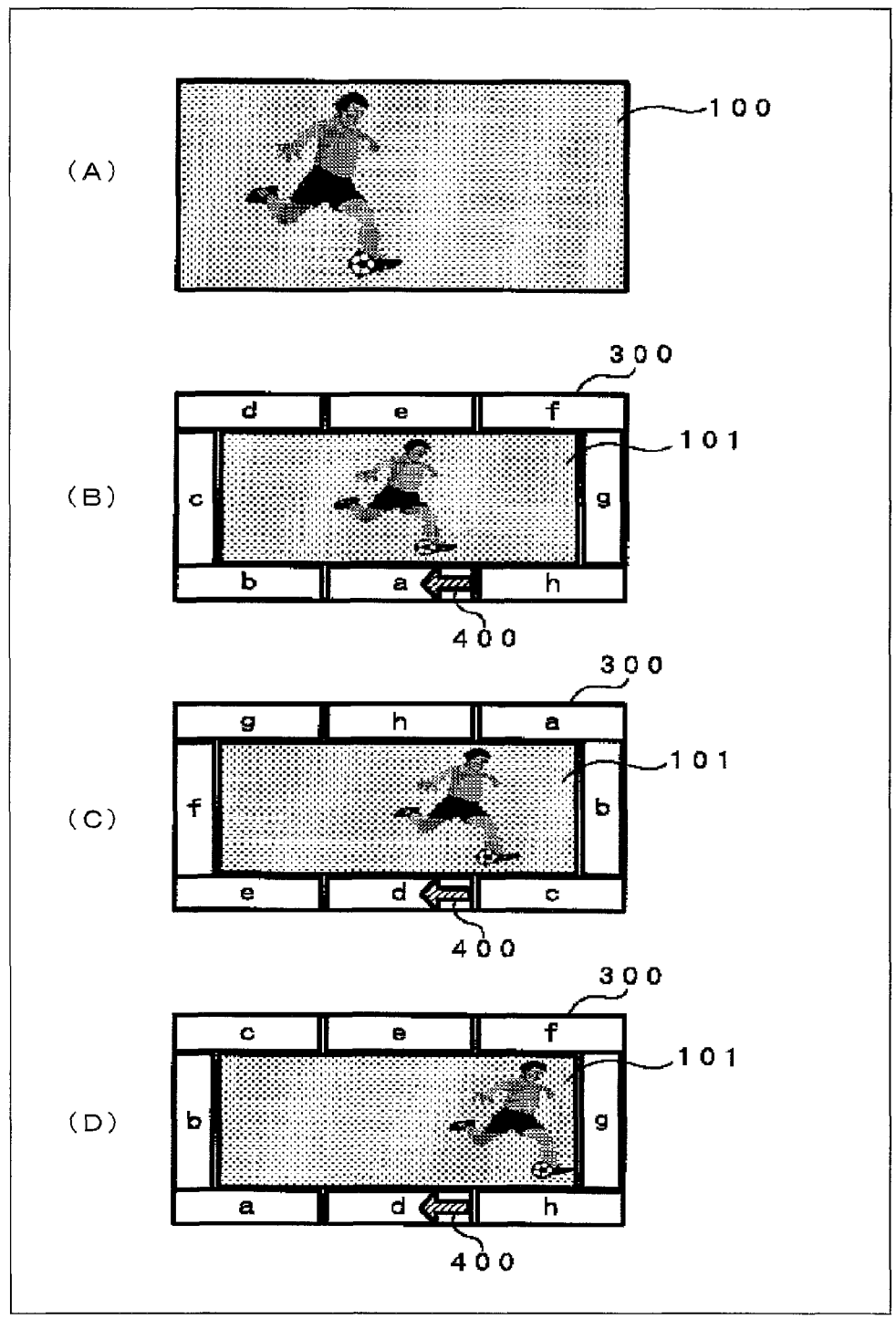
FIG. 64 is an explanatory view showing a display example of a conventional menu screen.
Figure 65:
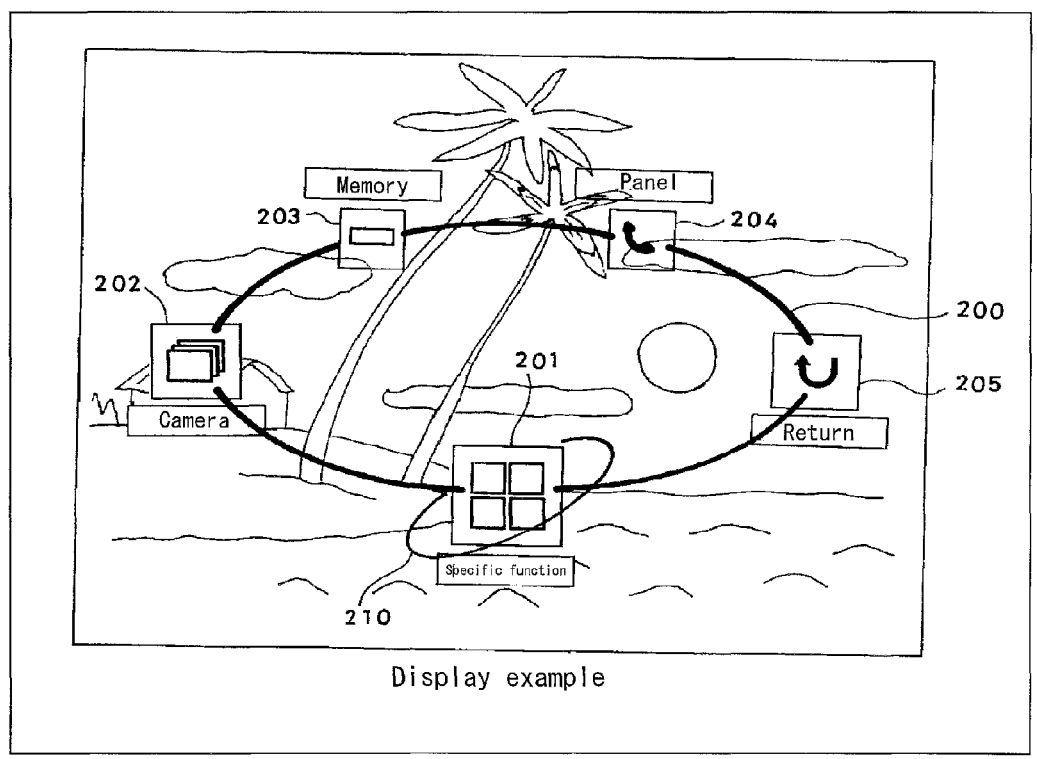
FIG. 65 is an explanatory view showing another display example of a conventional menu screen.
Figure 66:
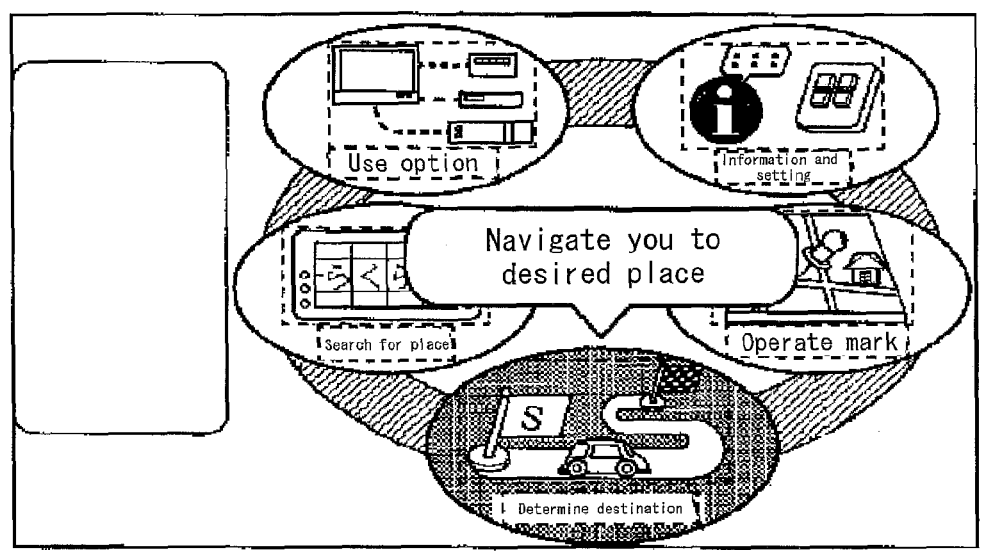
FIG. 66 is an explanatory view showing still another display example of a conventional menu screen.

In a case where the plurality of icons are disposed in a circle around a rectangular display region, layout restriction becomes strict from the perspective of spaces between icons and symmetry of the icons. Further, for example, the display shape of the menu item b shown in FIG. 64 is changed from a horizontally long shape to a vertically long shape as a result of change in position from (B) of FIG. 64 to (C) of FIG. 64. Accordingly, there is another problem that displayed as the menu items are texts at best which are not likely to be subject to an influence of a change in shape.

It is therefore difficult to display the icons arranged in a circle in Patent Literature 2 on the menu display screen of Patent Literature 1. It is still more difficult to display icons arranged in a circle so that they do not overlap a television image displayed in a reduced size. Further, each icon is generally accompanied with a text string which is indicative of a type etc. of the icon and which is made up of large characters for visibility for a user. It is therefore impossible to arrive, from the disclosures of Patent Literatures 1 through 3, at the idea of displaying icons in a circle which occupy large display spaces and which have various design shapes so that the icons circle around an image of content displayed in a region surrounded by the icons while not overlapping the image of the content.

According to the audio/video control system of Patent Literature 4, the top screen and the content-disposed screen are utterly different from each other in layout of buttons. Since there is no relevance in layout between the top screen and the content-disposed screen, a user is forced to search the content-disposed screen for a content selecting button of the top screen whose name is to be changed. Further, on the content-disposed screen, a large number of buttons are displayed which include (i) a plurality of content selecting buttons to be displayed on the top screen and (ii) a plurality of content selecting buttons to be exchanged with such content selecting buttons. This makes the screen even more complicated for a user.

The following Embodiments 1 through 19 were accomplished in view of the above problems, and an object of these Embodiments 1 through 19 is to provide a technique for displaying a menu screen which allows a user to comfortably select a desired item in a multi-function display device.

Embodiment 1

In order to achieve the above object, a method for controlling display of a menu screen includes:

(1) the step A1 of displaying, on a content display region located in a central part of a display screen, a moving image or a still image which is content so that the content is displayed in a size smaller than the display screen; and (2) the step A2 of displaying, around the content display region, a plurality of icons in a circle so that the plurality of icons sequentially move to a specific position in accordance with a user's selecting operation while moving around the content display region without overlapping the content display region.

According to the method, an image of content which a user was watching before display of the menu screen is displayed in a reduced size without being hindered by a string of icons which move in a circle. This allows the user to comfortably carry out an icon selecting operation while continuously watching the image of the content.

Note that an icon in the present invention is made up of at least one of a pictorial symbol, a pictogram, a character, a drawing pattern, and a drawing or any combination of these.

Embodiment 2

In order to achieve the above object, a method for controlling display of a menu screen includes the steps of:

(1) separately creating first display data for displaying, on a content display region located in a central part of a display screen, a moving image or a still image which is a content so that the content is displayed in a size smaller than the display screen, (2) and second display data for displaying, around the content display region, a plurality of icons in a circle so that the plurality of icons sequentially move to a specific position in accordance with a user's selecting operation while moving around the content display region without overlapping the content display region; and (3) displaying the menu screen by superimposing the first display data and the second display data.

According to the method, it is possible to produce an effect of simplifying a display data creation process and reducing a load applied to a CPU by separately creating first display data and second display data, in addition to the above effect of allowing a user to comfortably carry out an icon selecting operation while continuously watching the image of the content.

Embodiment 3

The method is arranged such that (1) the menu screen can be switched between (i) a first menu screen on which a combination of icons of a first group is displayed as the plurality of icons and (ii) a second menu screen on which a combination of icons of a second group which are different from the icons of the first group is displayed as the plurality of icon; and the method further includes:

(2) the step B1 of displaying the second menu screen;

(3) the step B2 of moving one of the icons of the second group to the specific position in accordance with the user's selecting operation;

(4) the step B3 of moving said one of the icons of the second group from the specific position into the content display region upon receipt of a user's instruction to exchange said one of the icons of the second group with one of the icons of the first group;

(5) the step B4 of switching the second menu screen with the first menu screen;

(6) the step B5 of moving, to the specific position, said one of the icons of the first group, which the user wants to exchange, in accordance with the user's selecting operation; and (7) the step B6 of exchanging said one of the icons of the first group with said one of the icons of the second group by moving, upon receipt of a user's instruction to exchange said one of the icons of the first group with said one of the icons of the second group, said one of the icons of the second group from the content display region onto said one of the icons of the first group which is displayed in the specific position.

According to the method, the menu screen is switched between two types of menu screens. This produces the following advantages. For example, in a case where the first menu screen is a default screen which is preferentially displayed, a combination of icons which a user use frequently or icons which are recommended for the user can be displayed in a circle on the first menu screen. This allows the use to further comfortably carry out the operation of selecting a desired item.

Further, since the two screens, i.e., the first menu screen and the second menu screen are similar in layout and method of user's operation, the screens are easy for the user to see and operate.

In the content display region located at the center of the first menu screen and the second menu screen, content is continuously displayed regardless of whether the first menu screen or the second menu screen is being displayed. This allows a user to carry out an operation of exchanging an icon displayed on the first menu screen and an icon displayed on the second menu screen while continuously watching the content.

Further, the content display region serves as a place where an icon which a user wants to exchange with another one temporarily stays. Thus, processing of exchanging the menu screens and processing of moving icons on the menu screens into/from the content display region are automatically carried out in association with each other. As a result, it is only necessary for a user to carry out an operation of moving the icons to be exchanged into the specific position on the menu screens. Further, it is very easy for a user to grasp visual relevance between the first menu screen and the second menu screen. It is therefore possible to provide a comfortable and highly-convenient user interface.

Embodiment 4

The method is arranged such that (1) the menu screen can be switched between (i) a first menu screen on which a combination of icons of a first group is displayed as the plurality of icons and (ii) a second menu screen on which a combination of icons of a second group which are different from the icons of the first group is displayed as the plurality of icon; and the method further includes:

(2) the step B1 of displaying the second menu screen;

(3) the step B2 of moving one of the icons of the second group to the specific position in accordance with the user's selecting operation;

(4) the step B3 of moving said one of the icons of the second group from the specific position into the content display region upon receipt of a user's instruction to exchange one of the icons of the second group with one of the icons of the first group;

(5) the step B4 of switching the second menu screen with the first menu screen;

(6) the step B7 of moving, to the specific position, said one of the icons of the first group, which the user wants to exchange, in accordance with the user's selecting operation;

(7) the step B8 of hiding said one of the icons of the first group upon receipt of a user's instruction to exchange said one of the icons of the first group with said one of the icons of the second group; and (8) the step B9 of exchanging said one of the icons of the first group with said one of the icons of the second group by moving said one of the icons of the second group from the content display region to the specific position.

As in the above method, it is possible to employ an arrangement in which when a user moves, to the specific position, one of the icons of the first group displayed on the first menu screen which the user wants to exchange with another one, the one of the icons of the first group is hidden. This also makes it possible to provide a highly-convenient user interface.

Embodiment 5

The method further includes the steps of:

(1) preparing a first browser and a second browser, the first browser being capable of displaying a general Internet website, and the second browser being capable of displaying a specialized website which is specialized so as to be displayed in a display state adapted for a display device including the display screen; and (2) the display device (i) accessing a server with which the display device can exclusively communicate, (ii) obtaining, from the server, a list of addresses of a plurality of websites including the specialized website, and (iii) registering the specialized website with use of the addresses included in the list.

According to the arrangement, since the address of the specialized website is different from the address of the general Internet website, the address of the specialized website is registered in the display device as a default address at a factory shipment.

A system in which the second browser obtains the address of the specialized website is already in practical use (e.g., a browser for mobile phones and a website for mobile phones), but has a problem that a system scale becomes large and complicated. Therefore, there is a demand for a small-scale simple system which does not require the second browser to obtain the address of the specialized website.

In this case, if a user overwrites the address of the specialized website with an address of a website displayed with the first browser, the second browser, which cannot obtain the address of the specialized website, cannot reregister the address of the specialized website. That is, there arises a problem that the specialized website cannot be displayed in a display state adapted to the display device.

In view of the problem, a list of addresses of a plurality of websites including the specialized website is stored in a server which the display device can exclusively communicate with. This makes it possible to reregister the address of the specialized website with the use of the addresses included in the list.

When a user tries to view the website of the address thus reregistered, the second browser is activated, and the specialized website can be displayed in a display state adapted to the display device.

Embodiment 6

The method further includes:

(1) in a case where a specific icon included in the plurality of icons is moved to the specific position by the user's selecting operation, (2) the step C1 of determining whether the specific icon is selectable or not;

(3) the step C2 of displaying, on top of the specific icon, a warning message notifying the user of inability to select the specific icon in a case where it is determined that the specific icon is not selectable; and (4) the step C3 of displaying the waning message within the content display region in a case where the user further gives an instruction to select the specific icon.

According to the method, in a case where a user selects a specific icon, but an application corresponding to the specific icon is not activated or display processing of a function corresponding to the specific icon cannot be executed, a warning message notifying the user of inability to select the specific icon is displayed on top of the specific icon as a first step.

In a case where the user further gives an instruction to determine selection of the specific icon regardless of the warning message, the warning message is displayed within the content display region as a second step.

This increases the possibility that the user notices the warning message in the second step even in a case where the user is distracted by viewing of the content and does not notice the warning message in the first step.

As a result, it is possible to provide a highly convenient user interface.

Embodiment 7

The method is arranged such that
the step A1 includes:

(1) the step A11 of causing, in response to a user's instruction to display the menu screen, the moving image or the still image displayed in a full size on the display screen to be successively reduced to a size of the content display region; and (2) the step A12 of displaying a background image in a region around the content display region; and (3) the step A2 includes the step A21 of causing the plurality of icons dispersed in a peripheral region of the display screen to move towards a center of the content display region and to be disposed in a circle around the content display region.

According to the method, progress of the way in which the display screen which displays content in a full size changes to the menu screen can be shown to a user as animation. This makes it possible to provide an unconventional and novel user interface.

Embodiment 8

The method further includes:

(1) in a case where a user's instruction to hide the menu screen that is being displayed is given, (2) the step D1 of causing the plurality of icons disposed in a circle around the content display region to radially move towards a peripheral region of the display screen;

(3) the step D2 of hiding a background image displayed in a region around the content display region; and (4) the step D3 of causing the moving image or the still image displayed in the content display region to be successively enlarged to a size of the display screen.

According to the method, progress of the change from the menu screen to the display screen which is generally displayed can be shown to a user as animation in a case where the menu screen is closed and the display screen is displayed again. This makes it possible to provide an unconventional and novel user interface.

Embodiment 9

The method is arranged such that (1) the menu screen can be switched between (i) a first menu screen on which a combination of icons of a first group is displayed as the plurality of icons and (ii) a second menu screen on which a combination of icons of a second group which are different from the icons of the first group is displayed as the plurality of icon; and
the method further includes:

(2) in a case where a user's instruction to switch the first menu screen with the second menu screen is given, (3) the step D11 of causing the icons of the first group disposed in a circle around the content display region to move towards one side of the display screen and sequentially disappear from the one side to an outside of the display screen; and (4) the step D12 of causing the icons of the second group to sequentially appear from another side of the display screen into the display screen and move to respective predetermined positions.

This makes it possible to display menu screen exchanging animation in an unconventional and novel manner.

Embodiment 10

The method is arranged such that (1) the plurality of icons include a date and time icon concerning date and time; and
the method further includes:

(2) the step E1 of moving the date and time icon to the specific position in response to the user's selecting operation and then accepting a user's instruction to select the date and time icon; and (3) the step E2 of causing, in response to the step E1, the menu screen to shift to a date and time screen including at least one of a calendar image or a clock image.

According to the method, at least one of a calendar and a clock can be displayed on a television screen, a display screen of a personal computer, or the like while the display device (e.g., the television or the personal computer) including the display screen on which the menu screen is displayed is not in use. This allows the television screen, the display screen of the personal computer, or the like to be used as an interior.

Embodiment 11

The method further includes the step E3 of displaying, in response to a user's instruction, (i) options for layout of an image of a content designated by the user, the calendar image, and the clock image on the date and time screen or (ii) options for a background color of the date and time screen.

According to the method, not only a calendar and a clock but also an image of content designated by a user can be displayed in user's favorite layout and background color.

As a result, it is possible to provide a more comfortable user interface.

The method further includes (1) the step F1 of causing, in response to a user's touch on any one of a plurality of touch keys disposed in a frame part of the display screen, at least one of (i) icons and (ii) text strings indicative of functions of the plurality of touch keys to be displayed on the display screen in respective positions corresponding to the plurality of touch keys, and (2) the at least one of (i) the icons and (ii) the text strings indicative of the functions of the plurality of touch keys changes in accordance with the display content of the display screen.

According to the method, only in a case where a user wants to select a certain function with respect to display content on the display screen, the user touches any one of a plurality of touch keys disposed in a frame part. Thus, functions assigned to the plurality of touch keys can be displayed on the display screen.

This produces (i) a first effect of avoiding wastefully displaying icons or menu items on the display screen when they are not needed and (ii) a second effect of preventing the icons or the menu items from hindering content displayed on the display screen when the content is displayed in a full size.

Embodiment 13

The method further includes:

(1) the step G1 of causing, in response to a user's touch on any one of a plurality of touch keys disposed in a frame part of the display screen, icons and text strings indicative of functions of the plurality of touch keys to be displayed on the display in respective positions corresponding to the plurality of touch keys; and (2) the step G2 of hiding the text strings indicative of the functions in response to a user's touch on one of the plurality of touch keys that corresponds to a desired function after the step G1.

According to the method, once a user selects a desired function after seeing icons or text strings, it is possible to display only minimum information needed for the user. In one aspect, only an icon indicative of the function selected by the user is left, and the other icons are hidden.

This makes it possible to improve the first effect and the second effect.

Embodiment 14

The method further includes the step G3 of hiding the icons indicative of the functions when the user continuously touches a specific one of the plurality of touch keys for a predetermined period of time or longer.

This makes it possible to further improve the first effect and the second effect.

Embodiment 15

The method further includes (1) the step H1 of bringing up a numeric key panel on the display screen in response to a user's operation of a remote control, (2) movement of a cursor on the numeric key panel thus displayed being in conjunction with operation of the remote control.

According to the method, it is possible to eliminate numeral buttons from the remote control. This produces an effect of simplifying a configuration of the remote control and an effect of improving usability of the remote control.

As a result, it is possible to provide an even more comfortable user interface.

Embodiment 16

The method further includes:

(1) the step I1 of causing, in response to a user's instruction, the menu screen to change to a specific screen for a function which requires numeric input; and (2) the step I2 of bringing up a numeric key panel on the specific screen in response to the change to the specific screen.

According to the method, a numeric key panel is automatically brought up on the display screen in situations requiring numeric input. This improves convenience for a user.

Further, it is only necessary that the remote control have a member for moving a cursor on the numeric key panel so that a user can select a desired numeral on the numeric key panel displayed on the display screen. That is, it is possible to eliminate a numeral button from the remote control. It is thus possible to simplify a configuration of the remote control.

Embodiment 17

A display control device includes:

(1) a first display processing section which creates first display data for displaying, on a content display region located in a central part of a display screen, a moving image or a still image which is a content so that the content is displayed in a size smaller than the display screen;

(2) a second display processing section which creates second display data for displaying, around the content display region, a plurality of icons in a circle so that the plurality of icons sequentially move to a specific position in accordance with a user's selecting operation while moving around the content display region without overlapping the content display region; and (3) a third display processing section for creating display data of a menu screen on basis of the first display data and the second display data.

This also produces the effect described above for the method corresponding to this arrangement.

Embodiment 18

The display control device further includes (1) a fourth display processing section which creates third display data for displaying a background of the menu screen, (2) the third display processing section creating the display data of the menu screen by superimposing the first display data, the second display data, and the third display data.

According to the arrangement, third display data for displaying background of the menu screen is prepared separately from the first display data and the second display data. Use of the third display data allows a user to be given a greater degree of freedom in customizing the menu screen.

Embodiment 19

The method is arranged such that:

(1) the menu screen can be switched between (i) a first menu screen on which a combination of icons of a first group is displayed as the plurality of icons and (ii) a second menu screen on which a combination of icons of a second group which are different from the icons of the first group is displayed as the plurality of icon; and the method further includes:

(2) the step J1 of displaying the first menu screen;

(3) the step J2 of moving one of the icons of the first group to the specific position in accordance with the user's selecting operation;

(4) the step J3 of moving said one of the icons of the first group from the specific position into the content display region upon receipt of a user's instruction to exchange said one of the icons of the first group with one of the icons of the second group;

(5) the step J4 of switching the first menu screen with the second menu screen;

(6) the step J5 of moving said one of the icons of the second group, which the user wants to exchange, to the specific position in accordance with the user's selecting operation;

(7) the step J6 of hiding said one of the icons of the second group upon receipt of a user's instruction to exchange said one of the icons of the first group with said one of the icons of the second group;

(8) the step J7 of exchanging said one of the icons of the first group with said one of the icons of the second group by moving said one of the icons of the first group from the content display region to the specific position; and (9) the step J8 of switching the second menu screen with the first menu screen which includes said one of the icons of the second group hidden in the step J6.

As in the method, it is possible to employ an arrangement in which one of the icons of the first group which one is to be exchanged is moved into the content display region on the first menu screen, and then one of the icons of the second group which one a user wants to exchange is selected on the second menu screen. This also makes it possible to provide a highly convenient user interface.

Note that a combination of a feature described in a certain claim and a feature described in another claim is not limited to a combination with a feature described in a claim which is cited in the certain claim, but can be a combination with a feature described in a claim which is not cited in the certain claim provided that the object of the present invention can be attained.

Embodiments Described in the Present Specification

The present specification includes the following Embodiments in addition to the Embodiments 1 through 19.

Embodiment A

Such an operation method is proposed in which (i) a plurality of menu items displayed in a circle (sometimes referred to as a circular menu) on a display device are caused to move in a circle by operating a circular input key provided on a remote control, and thus (ii) a desired menu item is moved to a predetermined focus position so as to be a candidate for a menu item to be selected.

However, in consideration of visibility of such a circular menu and an amount of operation of the circular input key necessary for selection of the desired menu item, the number of menu items that can be displayed at one time is limited. In view of this, such a technique is proposed in which (i) frequently used (frequently selected) menu items are presented to a user as a main menu which is included in the circular menu and (ii) less frequently used (less frequently selected) menu items are presented to a user as a sub menu which is not included in the circular menu.

For example, Patent Literature 5 discloses a remote control including a ring-shaped input section that can rotationally move in a circumferential direction. By operating the ring-shaped input section, a circular menu displayed on an image display device can be rotated.

However, frequently used menu items vary depending on a user. Accordingly, in a case where a desired menu item which a user wants to frequently use is included in the sub menu, the use must select the desired menu item from the sub menu which generally requires a larger number of operations than the main menu to display the desired menu item. That is, the user must go through complicated operations.

Meanwhile, Patent Literature 4 discloses an audio/video control system in which a plurality of devices are connected to a control device, and operations of the plurality of devices are controlled in accordance with a user's instruction given to the control device. On a touch panel type display screen in this system, a top screen is displayed upon activation of power. On the top screen, a plurality of content selecting buttons are displayed. Button names of these content selecting buttons are changeable with other button names that are not displayed on the top screen.

When replacing button names, the top screen is exchanged to a content-disposed screen. The content-disposed screen has (i) a TOP-selected-content display region in which names of a plurality of content selecting buttons which should be displayed on the top screen are displayed and (ii) a spare-content display region in which names of a plurality of spare-content selecting buttons which are prepared in advance in addition to the content selecting buttons are displayed.

However, according to the audio/video control system of Patent Literature 4, the top screen and the content-disposed screen are utterly different from each other in layout of buttons. Since there is no relevance in layout between the top screen and the content-disposed screen, a user is forced to search the content-disposed screen for a content selecting button of the top screen whose name is to be changed. Further, on the content-disposed screen, a large number of buttons, i.e., (i) a plurality of content selecting buttons which should be displayed on the top screen and (ii) a plurality of spare-content selecting buttons are disposed. This makes the screen even more complicated for a user.

The present specification includes the following Embodiments for solving the above problem. An object of these Embodiments is to provide a display control device which allows a user to comfortably exchange a menu item included in a main menu with a menu item included in a sub menu.

Embodiment A1

A method for controlling display of a menu screen on which a plurality of icons are displayed in a circle and which can be switched between (i) a first menu screen on which a combination of icons of a first group is displayed as the plurality of icons and (ii) a second menu screen on which a combination of icons of a second group which are different from the icons of the first group is displayed as the plurality of icon;

the method including:

the step a1 of displaying the second menu screen;

the step a2 of (i) moving one of the icons of the second group to a specific position in accordance with a user's selecting operation for causing the plurality of icons to move in a circle and to sequentially move to the specific position and (ii) moving the one of the icons of the second group from the specific position to a specific region located in a central part of a display screen;

the step a3 of switching the second menu screen with the first menu screen while leaving the one of the icons of the second group displayed in the specific region, upon receipt of a user's instruction to exchange the one of the icons of the second group with one of the icons of the first group; and the step a4 of exchanging the one of the icons of the second group with the one of the icons of the first group by (i) moving the one of the icons of the first group, which the user wants to exchange, to the specific position in accordance with the user's selecting operation and (ii) moving the one of the icons of the second group from the specific region onto the one of the icons of the first group which one is displayed on the specific position.

According to the method, the menu screen can be switched between two types of menu screens. This produces the following advantages. For example, in a case where the first menu screen is a default screen which is preferentially displayed, a combination of icons which a user use frequently or icons which are recommended for the user can be displayed in a circle on the first menu screen. This allows the use to further comfortably carry out the operation of selecting a desired item.

Further, since the two screens, i.e., the first menu screen and the second menu screen are similar in layout and method of user's operation, the screens are easy for the user to see and operate.

Further, the specific region serves as a place where an icon which a user wants to exchange with another one temporarily stays. Thus, processing of exchanging the menu screens and processing of moving icons on the menu screens into/from the specific region are automatically carried out in association with each other. As a result, it is only necessary for a user to carry out an operation of moving the icons to be exchanged into the specific position on the menu screens. Further, it is very easy for a user to grasp visual relevance between the first menu screen and the second menu screen. It is therefore possible to provide a comfortable and highly-convenient user interface.

Embodiment A2

A method for controlling display of a menu screen on which a plurality of icons are displayed in a circle and which can be switched between (i) a first menu screen on which a combination of icons of a first group is displayed as the plurality of icons and (ii) a second menu screen on which a combination of icons of a second group which are different from the icons of the first group is displayed as the plurality of icon;

the method including:

the step b1 of displaying the second menu screen;

the step b2 of moving one of the icons of the second group to a specific position in accordance with a user's selecting operation for causing the plurality of icons to move in a circle and to sequentially move to the specific position;

the step b3 of moving the one of the icons of the second group from the specific position to a specific region located in a central part of a display screen upon receipt of a user's instruction to exchange the one of the icons of the second group with one of the icons of the first group;

the step b4 of switching the second menu screen with the first menu screen while leaving the one of the icons of the second group displayed in the specific region;

the step b5 of (i) moving the one of the icons of the first group, which the user wants to exchange, to the specific position in accordance with the user's selecting operation and (ii) hiding the one of the icons of the first group; and the step b6 of exchanging the one of the icons of the second group with the one of the icons of the first group by moving the one of the icons of the second group from the specific region to the specific position.

As in the above method, it is possible to employ an arrangement in which when a user moves, to the specific position, one of the icons of the first group displayed on the first menu screen which the user wants to exchange with another one, the one of the icons of the first group is hidden. This also makes it possible to provide a highly-convenient user interface.

Embodiment A3

A method for controlling display of a menu screen on which a plurality of icons are displayed in a circle and which can be switched between (i) a first menu screen on which a combination of icons of a first group is displayed as the plurality of icons and (ii) a second menu screen on which a combination of icons of a second group which are different from the icons of the first group is displayed as the plurality of icon;

the method including:

the step c1 of displaying the first menu screen;

the step c2 of moving one of the icons of the first group to a specific position in accordance with a user's selecting operation for causing the plurality of icons to move in a circle and to sequentially move to the specific position;

the step c3 of moving the one of the icons of the first group from the specific position to a specific region located in a central part of a display screen upon receipt of a user's instruction to exchange the one of the icons of the first group with one of the icons of the second group;

the step c4 of switching the first menu screen with the second menu screen while leaving the one of the icons of the first group displayed in the specific region;

the step c5 of moving the one of the icons of the second group, which the user wants to exchange, to the specific position in accordance with the user's selecting operation;

the step c6 of hiding the one of the icons of the second group upon receipt of a user's instruction to exchange the one of the icons of the first group with the one of the icons of the second group;

the step c7 of exchanging the one of the icons of the second group with the one of the icons of the first group by moving the one of the icons of the first group from the specific region to the specific position; and the step c8 of switching the second menu screen with the first menu screen which contains the one of the icons of the second group hidden in the step c6.

As in the method, it is possible to employ an arrangement in which one of the icons of the first group which one is to be exchanged is moved into the specific region (content display region) on the first menu screen, and then one of the icons of the second group which one a user wants to exchange is selected on the second menu screen. This also makes it possible to provide a highly convenient user interface.

Embodiment A4

The method according to any one of A1 through A3, wherein an arrow is displayed between the specific region and the specific position.

The arrangement allows a user to easily recognize that an icon displayed in the specific region (one of the icons of the second group or one of the icons of the first group) and an icon displayed in the specific position (one of the icons of the first group or one of the icons of the second group) are to be exchanged with each other.

Embodiment A5

A display control device in which a menu screen on which a plurality of icons are displayed in a circle can be switched between (i) a first menu screen on which a combination of icons of a first group is displayed as the plurality of icons and (ii) a second menu screen on which a combination of icons of a second group which are different from the icons of the first group is displayed as the plurality of icon;
the display control device including:
display means for displaying the second menu screen;
moving means for (i) moving one of the icons of the second group to a specific position in accordance with a user's selecting operation for causing the plurality of icons to move in a circle and to sequentially move to the specific position and (ii) moving the one of the icons of the second group from the specific position to a specific region located in a central part of a display screen;
switching means for switching the second menu screen with the first menu screen while leaving the one of the icons of the second group displayed in the specific region, upon receipt of a user's instruction to exchange the one of the icons of the second group with one of the icons of the first group; and
exchanging means for exchanging the one of the icons of the second group with the one of the icons of the first group by (i) moving the one of the icons of the first group, which the user wants to exchange, to the specific position in accordance with the user's selecting operation and (ii) moving the one of the icons of the second group from the specific region onto the one of the icons of the first group which one is displayed on the specific position.

This makes it possible to produce a similar effect to that of the above method.

(Additional Remark Regarding Embodiments A1 Through A5)

The Embodiments A1 through A5 can be accomplished, for example, by causing the CPU 14 shown in FIG. 2 to function as each means of the display control device or by causing the CPU 14 to execute the above steps.

Embodiment B

Such a display device is starting to be developed in which a desired icon is selected by rotating a plurality of icons (sometimes referred to as a circular menu) displayed in a circle so that the desired icon is moved to a predetermined position.

However, such rotation of the circular menu results in occurrence of an afterimage, which causes a problem of a decline in visibility for a user.

The present specification includes the following Embodiments for solving the above problem. An object of these Embodiments is to provide a display control device which can improve visibility during movement of an icon by suppressing an afterimage during movement of the icon.

Embodiment B1

An animation generating device including:
animation generating means for generating animation showing movement of an icon; and
command obtaining means for obtaining a command including moving speed designating information for designating a moving speed of the icon;
the animation generating means setting a frame rate of the animation by referring to the moving speed designating information included in the command obtained by the command obtaining means.

According to the arrangement, the animation generating means generates the animation at a frame rate corresponding to the moving speed of the icon by referring to the moving speed designating information. This allows the animation generating means to generate animation most suitable for the moving speed of the icon. Therefore, the animation generating device can improve visibility during movement of an icon by suppressing an afterimage during movement of the icon.

Embodiment B2

The animation generating device according to B1, wherein:
the animation generating means determines which of a high-speed range, a medium-speed range, and a low-speed range the moving speed designated by the moving speed designating information falls in,
the animation generating means sets the frame rate of the animation at a predetermined first frame rate in a case where it is determined that the moving speed falls in the medium-speed range, and
the animation generating means sets the frame rate of the animation at a predetermined second frame rate higher than the first frame rate in a case where it is determined that the moving speed falls in the high-speed range or the low-speed range.

According to the arrangement, the animation generating means generates the animation at the first frame rate (low frame rate) in a case where the moving speed of the icon falls in the medium-speed range, and generates the animation at the second frame rate (high frame rate) in a case where the moving speed of the icon falls in the high-speed range or the low-speed range.

In a case where the moving speed of the icon falls in the low-speed range, an amount of change in position of the icon during 1 frame of the animation is small, and therefore the animation generating device can make an afterimage less noticeable by generating the animation at a high frame rate. In a case where the moving speed of the icon falls in the medium-speed range, in which case an afterimage is noticeable at a high frame rate, the animation generating device can make an afterimage less noticeable by generating the animation at a low frame rate. In a case where the moving speed of the icon falls in the high-speed range, an amount of change in position of the icon during 1 frame of the animation is large, and therefore the animation generating device can make an afterimage less noticeable by generating the animation at a high frame rate which causes the icon to be displayed in a frame-by-frame manner

Embodiment B3

The animation generating device according to B2, wherein
the first frame rate is 30 frames/sec, and the second frame rate is 60 frames/sec.

According to the arrangement, the animation generating device can display the animation at an optimum frame rate in a case where the animation is displayed on a liquid crystal panel.

Embodiment B4

The animation generating device according to B1, wherein
the icon includes an image part and a text part; and
the animation generating means redraws the image part every frame and redraws the text part every n frames (n is an integer equal to or larger than 2).

According to the arrangement, the animation generating means can make a rate at which the text part of the icon is redrawn lower than a rate at which the image part of the icon is redrawn. By thus redrawing the image part every frame, that is, giving a priority to smoothness over an afterimage, it is possible to achieve smooth moving animation. Further, by drawing the text part at 30 fps, that is, giving a priority to easiness to read a text over smoothness, it is possible to achieve animation which allows a text to be easily read.

Especially in a case where the icon includes a text part, an afterimage of the text part is more remarkable than that of an image part, and therefore visibility of the text part is worse than that of the image part. However, according to the arrangement, it is possible to achieve both (i) animation allowing for smooth movement of the image part of the icon and (ii) animation allowing for easy reading of the text part.

Embodiment B5

The animation generating device according to B1, wherein:
the animation generating means sets the number of gradations used for drawing the icon at a first predetermined number of gradations in a case where it is determined that the moving speed designated by the moving speed designating information falls in the low-speed range, and the animation generating means sets the number of gradations used for drawing the icon at a second predetermined number of gradations that is smaller than the first predetermined number of gradations in a case where it is determined that the moving speed designated by the moving speed designating information falls in the medium-speed range or the high-speed range.

In a case where the icon is not moved, there occurs no afterimage, and in a case where the moving speed of the icon falls in the low-speed range, there occurs no noticeable afterimage. In such cases, the animation generating device can therefore display the icon in a vivid color by using the first predetermined number of gradations (large number of gradations).

Meanwhile, in a case where the moving speed of the icon falls in the medium-speed range or the high-speed range, an afterimage becomes noticeable. According to the arrangement, in a case where the moving speed of the icon falls in the medium-speed range or the high-speed range, it is possible to draw the icon in a manner which gives priority to contrast by reducing the number of halftones which are likely to cause an afterimage. This allows the animation generating device to make a user feel less uncomfortable with the afterimage.

Embodiment B6

The animation generating device according to any one of B1 through B5, wherein the animation is icon circling animation.

Embodiment B7

The animation generating device according to any one of B1 through B6, wherein the icon is disposed in a circle so as to constitute a circular menu.

Embodiment B8

The animation generating device according to any one of B1 through B7, wherein the command is sent from a remote control having a jog dial, and the moving speed designating information designates the moving speed in accordance with rotation speed of the jog dial.

According to the arrangement, the animation generating device can generate optimum animation in accordance with rotation speed at which the jog dial is operated by a user to rotate. This allows the animation generating device to suppress an afterimage during movement of the icon, thereby making it possible to improve visibility of the icon during movement of the icon.

Embodiment B9

A television receiver including an animation generating device as set forth in any one of B1 through B8; and a display on which the animation generated by the animation generating device is displayed.

Embodiment B10

An animation generating method for an animation generating device, including the step of:
(a) generating animation showing movement of an icon; and
(b) obtaining a command including moving speed designating information designating moving speed of the icon,
in the step (a), a frame rate of the animation is set by referring to the moving speed designating information included in the command obtained in the step (b).

According to the arrangement, it is possible to produce similar effects to those produced by the animation generating device.

(Additional Remark Regarding Embodiments B1 Through B10)

The Embodiments B1 through B10 can be achieved, for example, by adding, to the configuration of the monitor 1 shown in FIG. 2, a receiving section (command receiving means) for receiving a remote control signal (command) sent from the remote control and causing the CPU 14 to function as the animation generating means provided in the display control device.

Embodiment C

Such a display device is starting to be developed in which a desired menu item is selected by rotating a plurality of menu items (sometimes referred to as a circular menu) displayed in a circle so that the desired menu item is moved to a predetermined position.

However, in consideration of visibility of such a circular menu and drawing capability of a screen of the display device, the number of menu items that can be displayed at one time is limited. In view of this, such a technique is proposed in which a draw update rate is reduced so as to secure a rewriting period of a screen, thereby increasing the number of icons that can be moved at one time.

However, reducing a draw update rate (so-called frame rate) results in a reduction in the number of drawings, which leads to a problem that smoothness of icon movement is impaired.

The present specification includes the following embodiments for solving the above problem. An object of these embodiments is to provide a display control device which makes it possible to prevent an icon from moving less smoothly even in a case where a frame rate is decreased, thereby allowing an improvement in visibility of a moving icon.

Embodiment C1

An animation generating device including:

first animation generating means for generating first animation showing movement of an icon;

second animation generating means for generating second animation showing following movement of an afterimage icon which follows the icon, the afterimage icon representing an afterimage of the icon; and third animation generating means for generating third animation to be displayed on a display by superimposing the first animation and the second animation.

According to the arrangement, the animation generating device causes the third animation generating means to generate third animation showing movement of the icon and the afterimage icon following the icon. This allows the animation generating device to prevent an icon from moving less smoothly even in a case where a frame rate of the animation is decreased in order to increase the number of icons to be moved, thereby makes it possible to achieve smooth icon moving animation. It is therefore possible to improve visibility of a moving icon.

This makes it possible to reduce the frame rate. Therefore, a low-cost chip that could not be conventionally employed as a CPU of the animation generating device due to its low drawing capacity can be a candidate for the CPU. Further, it is possible to achieve smooth icon moving animation even in a case of a 4K2K television in which the frame rate need be low due to its high resolution.

Embodiment C2

The animation generating device according to C1, wherein:

the first animation generating means and the second animation generating means generates the icon and the afterimage icon, respectively, by referring to identical image data; and the third animation generating means generates third animation by superimposing the second animation having been made semi-transparent on the first animation.

According to the arrangement, the second animation generating means generates the afterimage icon by referring to the image data which is referred to by the first animation generating means. This makes it unnecessary for the animation generating device to store, in addition to image data for generation of the icon, another image data for generation of the afterimage icon. It is therefore possible to prevent image data from doubling.

Embodiment C3

The animation generating device according to C1 or C2, wherein the second animation generating means generates the second animation with use of hardware acceleration.

According to the arrangement, the second animation generating means generates the second animation with the use of hardware acceleration. This allows the animation generating device to minimize a load applied to a CPU provided in the animation generating device.

Embodiment C4

The animation generating device according to any one of C1 through C3, wherein the second animation generating means generates the second animation in a case where moving speed of the icon falls in a high-speed range.

Smoothness of the icon movement is lower in the case where the moving speed of the icon falls in the high-speed range than in the case where the moving speed of the icon falls in the low-speed range. According to the arrangement, the second animation can be generated only in the case where the moving speed of the icon falls in the high-speed range, i.e., in a case where smoothness of the icon movement is lower.

Embodiment C5

The animation generating device according to any one of C1 through C4, wherein the animation is icon circling animation.

Embodiment C6

The animation generating device according to any one of C1 through C5, wherein the icon is disposed in a circle so as to constitute a circular menu.

Embodiment C7

A television receiver including:

an animation generating device as set forth in any one of C1 through C6; and a display on which the animation generated by the animation generating device is displayed.

Embodiment C8

An animation generating method for an animation generating device, including the steps of:

generating first animation showing movement of an icon;

generating second animation showing following movement of an afterimage icon which follows the icon, the afterimage icon representing an afterimage of the icon; and generating third animation to be displayed on a display by superimposing the first animation and the second animation.

According to the arrangement, it is possible to produce similar effects to those produced by the animation generating device.

(Additional Remark Regarding Embodiments C1 Through C8)

The Embodiments C1 through C8 can be achieved, for example, by causing the CPU 14 shown in FIG. 2 to function as the first through third animation generating means of the display control device.

Embodiment D

A monitor (device) generally includes a frame (sometimes called "bezel") surrounding a display such as a liquid crystal panel. A lot of recent television receivers achieve both a variety of functions and stylish appearance by having a touch sensor type button which is embedded in a frame and which functions as a power button and the like.

Since the touch sensor type button is embedded in the frame, a user does not know about presence and function of the touch sensor type button. It is therefore necessary to notify the user of the presence and function of the touch sensor type button by some means.

A power button has a sole function of switching power from an ON state to an OFF state or vice versa. In a case where the touch sensor type button embedded in the frame functions as a power button, the user can be notified of the presence and function of the touch sensor type button by inscribing a power icon on a surface of the frame.

Meanwhile, a multifunction button changes it function depending on scene. Therefore, in a case where the touch sensor type button embedded in the frame functions as a multifunction button, the user cannot be properly notified of the functions of the multifunction button by the method of marking the surface of the frame with an icon.

The present specification includes the following Embodiments D1 through D8 for solving the above problem. An object of the following Embodiments D1 through D8 is to provide a monitor which allows a user to be notified of presence and a function of a touch sensor type button embedded in a frame regardless of what kind of button the touch sensor type button functions as.

Embodiment D1

A monitor including:
a display;
a frame which surrounds the display and in which a touch sensor type button is embedded; and
display control means for causing information indicative of a function assigned to the touch sensor type button to be displayed on the display at a position adjacent to the touch sensor type button.

According to the arrangement, a user can be notified of presence and a function of the touch sensor type button regardless of what kind of button the touch sensor type button embedded in the frame functions as.

Embodiment D2

The monitor according to D1, wherein:
the touch sensor type button embedded in the frame includes a plurality of touch sensor type buttons;
the display control means causes icons and text strings indicative of functions assigned to the respective plurality of touch sensor type buttons to be displayed on the display at positions adjacent to the respective plurality of touch sensor type buttons, and starts display of the icons and text strings upon detection of a touch on any of the plurality of touch sensor type buttons in a state where neither the icons nor the text strings are displayed.

According to the arrangement, a user who can estimate a function from an icon can be notified of the functions of the touch sensor type buttons by the icons. Further, a user who cannot estimate a function from an icon can be notified of the functions of the touch sensor type buttons by the text strings. That is, every user can be notified of the functions of the touch sensor type buttons. Further, since the icons and the text strings are displayed upon detection of a user's touch on any of the touch sensor type buttons, it is possible to prevent the icons and the text strings from hindering display of content until the user touches the touch sensor type button.

Embodiment D3

The monitor according to D2, wherein the display control means hides the text strings upon detection of a touch on any of the plurality of touch sensor type buttons in a state in which both of the icons and the text strings are displayed.

A user can learn, from the text strings, the functions of the icons while both of the icons and the text strings are being displayed. In general, such learning is completed by the time when the user touches a desired touch sensor type button. Accordingly, it is unnecessary to display the text strings after the user touches the touch sensor type button. According to the arrangement, the text strings are hidden once it becomes unnecessary to display the text strings. This makes it possible to minimize a period of time for which the text strings hinder display of content.

Embodiment D4

The monitor according to D3, wherein the display control means hides the icons upon detection of a touch which is made on a specific touch sensor type button included in the plurality of touch sensor type buttons continuously for a predetermined period of time in a state in which only the icons are displayed.

According to the arrangement, the icons can be hidden at a desired timing by long-touching the specific touch sensor type button.

Embodiment D5

The monitor according to any one of D1 through D4, wherein the touch sensor type button is a multifunction button whose function changes.

A user cannot be properly notified of a function of a multifunction button by an icon inscribed on the frame since the function of the multifunction button changes from time to time. However, according to the arrangement, a user can be properly notified of a function of a multifunction button whose function changes from time to time.

Embodiment D6

The monitor according to D5, wherein the touch sensor type button is a multifunction button whose function changes in accordance with a type of information displayed on the display.

A user cannot be properly notified, by an icon inscribed on the frame, of a function of a multifunction button whose function changes from time to time in accordance with a type of information displayed on the display. However, according to the arrangement, a user can be properly notified of a function of a multifunction button whose function changes from time to time in accordance with a type of information displayed on the display.

Embodiment D7

A television receiver including:
a monitor as set forth in any one of D1 through D6; and
a tuner which is built in the monitor or is configured to be capable of communicating with the monitor.
According to the arrangement, the television receiver can produce similar effects to those produced by the monitor.

Embodiment D8

A method for controlling a monitor including a display; and a frame which surrounds the display and in which a touch sensor type button is embedded,
the method including the step of causing information indicative of a function assigned to the touch sensor type button to be displayed on the display at a position adjacent to the touch sensor type button.
According to the arrangement, it is possible to produce similar effects to those produced by the monitor.
(Additional Remark Regarding Embodiments D1 Through D8)
The Embodiments D1 through D8 can be achieved, for example, by adding a touch sensor type button to the configuration of the monitor 1 shown in FIG. 2 and causing the CPU 14 to function as the display control means.

Embodiment E

As one form of a remote control, there is a remote control having a jog dial.
In such a remote control having a jog dial, it is preferable to omit numeral buttons or the like that correspond to respective channels in order to keep a size of the remote control small. However, there arises a problem that it is difficult to input a numeral in selecting a channel in a case where a television receiver or the like is operated with the use of the remote control having no numeral button.
The present specification includes the following Embodiments E1 through E7 for solving the above problem. An object of the following Embodiments E1 through E7 is to provide a numeral input device which makes it possible to easily input a numeral with the use of a jog dial and an enter button of a remote control.

Embodiment E1

A numeral input device which accepts user's input of a numeral via a remote control having a jog dial and an enter button, including:
numeral selecting means for selecting a numeral from predetermined group of numerals, the numeral selecting means changing a numeral being selected, by a predetermined order in accordance with an amount of rotation of the jog dial; and
numeral accepting means for accepting, as a numeral inputted by the user, the numeral which is being selected by the numeral selecting means at a time when the enter button is pressed.
According to the arrangement, it is possible to input a desired numeral included in the group of numerals with the use of the jog dial and the enter button of the remote control.

Embodiment E2

The numeral input device according to E1, further including panel display means for displaying a numeric input panel on a display, the numeric input panel having buttons corresponding to numerals constituting the group of numerals,
the panel display means causing a button corresponding to the numeral which is being selected by the numeral selecting means to be displayed on the numeric input panel in a manner distinguishable from other buttons.
According to the arrangement, which numeral is being selected by the numeral selecting means, i.e., which numeral is to be inputted can be easily recognized by looking at the numeric input panel. This makes it possible to prevent a user from mistakenly inputting a wrong numeral. The numeric input panel is configured to include buttons corresponding to respective selectable numerals (e.g., 0 through 12), as with a conventional remote control including numeral buttons. This allows even a user who is accustomed to the conventional remote control including numeral buttons to input a numeral without feeling uncomfortable.

Embodiment E3

The numeral input device according to E2, wherein the panel display means changes a position of the numeric input panel on the display when a specific button provided on the remote control is pressed.
According to the arrangement, it is possible to change the position of the numeric input panel in a case where the numeric input panel hinders content displayed on the display.

Embodiment E4

The numeral input device according to E1, further including field display means for displaying, on the display, a numeric input field for input of multi-digit numeral,
the numeral selecting means selecting numerals constituting the multi-digit numeral, and
the field display means causing the numeral which is being selected by the numeral selecting means to be displayed at a target digit in the numeric input field which target digit is selected by pressing a specific button provided on the remote control.
According to the arrangement, which numerals are being selected by the numeral selecting means, i.e., which numerals are being selected as the multi-digit numeral to be inputted can be easily recognized by looking at the numeric input field. This makes it possible to prevent a user from mistakenly inputting a wrong multi-digit numeral.

Embodiment E5

The numeral input device according to E4, wherein the field display means changes the target digit to a next higher digit when a first button provided on the remote control is pressed, and the field display means changes the target digit to a next lower digit when a second button provided on the remote control is pressed.
According to the arrangement, a user can freely change the target digit. In a case where the remote control has a left button and a right button and where the left button is used as the first button and the right button is used as the second button, the user can more intuitively operate the remote control.

Embodiment E6

A television receiver including a numeral input device as set forth in any one of E1 through E5.

According to the arrangement, the television receiver can produce similar effects to those produced by the numeral input device.

Embodiment E7

A numeral input method for accepting user's input of a numeral via a remote control having a jog dial and an enter button, the numeral input method including:

selecting a numeral from predetermined group of numerals, wherein a numeral being selected is changed by a predetermined order in accordance with an amount of rotation of the jog dial; and accepting, as a numeral inputted by the user, the numeral which is being selected by the numeral selecting means at a time when the enter button is pressed.

According to the arrangement, it is possible to produce similar effects to those produced by the numeral input device.

(Additional Remark Regarding Embodiments E1 Through E7)

The Embodiments E1 through E7 can be achieved, for example, by adding, to the configuration of the monitor 1 shown in FIG. 2, a receiving section for receiving a remote control signal sent from the remote control and causing the CPU 14 to function as each means of the numeral input device.

Embodiment F

Many television receivers have a function of displaying a current date and time. However, a date and time is often displayed in a small size on a corner of a display screen, and is therefore extremely difficult to see. Further, in order to display a date and time on a television receiver, it is necessary to go through a troublesome procedure of calling up a setting menu and deciding whether to display the date and time or not. Further, even in a case where a user is not watching content such as a broadcast program, the user sometimes wants to check a current date and time. However, a conventional television receiver cannot meet such a demand.

The present specification includes the following Embodiments F1 through F7. An object of the following Embodiments F1 through F7 is to provide a display control device, for controlling display of a television receiver or the like, which makes it possible to easily display a date and time.

Embodiment F1

A display control device including:

a first display processing section which creates first display data for displaying, on a content display region located in a central part of a display screen, a moving image or a still image which is content so that the moving image or the still image is displayed in a size smaller than the display screen;

a second display processing section which creates second display data for displaying, around the content display region, a plurality of icons in a circle which include a date and time icon concerning a date and time so that the plurality of icons sequentially move to a specific position in accordance with a user's selecting operation while moving around the content display region without overlapping the content display region;

a third display processing section which creates display data of a menu screen on basis of the first display data and the second display data; and a screen switching section for switching the menu screen to a date and time screen including at least one of a calendar image and a clock image upon receipt of a user's determining instruction in a state in which the date and time icon is located at the specific position on the menu screen.

According to the arrangement, the date and time screen can be easily displayed just by (i) rotating the plurality of icons on the menu screen so that the date and time icon is located at the specific position and (ii) carrying out a determining operation in such a state.

Embodiment F2

The display control device according to F1, further including an option display section for displaying, in response to a user's instruction, (i) options about layout of a still image designated by the user, the calendar image, and the clock image on the date and time screen or (ii) options about a background color of the date and time screen.

According to the arrangement, the date and time screen having desired layout can be displayed.

Embodiment F3

The display control device according to F2, wherein the option display section displays, as the options about the layout, (1) a date and time screen made up of the still image, the calendar image, and the clock image, (2) a date and time screen made up of the still image and the calendar image, (3) a date and time screen made up of the still image and the clock image representing an analog clock, (4) a date and time screen made up of the still image and the clock image representing a digital clock, and (5) a date and time screen made up of the calendar image and the clock image.

According to the arrangement, it is possible to display a date and time screen combining the still image, the calendar image and the clock image in accordance with user's preference.

Embodiment F4

The display control device according to F1 or F2, wherein a slide show of a plurality of still images is displayed on the date and time screen.

According to the arrangement, the plurality of still images can be viewed together with a date and time.

Embodiment F5

The display control device according to any one of F1 through F4, wherein:

the display control device has (i) a first operation mode in which a luminance of a display in a case where a battery is used is lower than that in a case where a commercial power supply is used and (ii) a second operation mode in which the luminance of the display in the case where the battery is used is same as that in the case where the commercial power supply is used; and a remaining battery level is displayed on the date and time screen in the first operation mode, and the remaining battery level is not displayed on the date and time screen in the second operation mode.

The first operation mode is selected in a case where a user is concerned about a remaining battery level. In such a case, the remaining battery level can be displayed even on the date and time screen. Meanwhile, the second operation mode is selected in a case where a user is not concerned about a remaining battery level. In such a case, the remaining battery level is not displayed. This can make the date and time screen stylish.

Embodiment F6

The display control device according to any one of F1 through F5, wherein:
the display control device has a radio communication function; and
a radio reception level is displayed on the date and time screen in the first operation mode, and the radio reception level is not displayed on the date and time screen in the second operation mode.

According to the arrangement, whether to display or hide the radio reception level can be determined in association with whether to display or hide the remaining battery level.

Embodiment F7

A television receiver including a display control device as set forth in any one of F1 through F7.

According to the arrangement, the television receiver can produce similar effects to those produced by the display control device.

[Program, Storage Medium]

The blocks of the television 10 may be realized by way of hardware with the use of a logical circuit provided on an integrated circuit (IC chip) or software as executed by a CPU.

In the latter case, the television 10 includes a CPU and memory devices (memory media). The CPU executes instructions in programs realizing the functions. The memory devices include a ROM (read only memory) which contains the programs, a RAM (random access memory) to which the programs are loaded, and a memory containing the programs and various data. The objective of the present invention can also be achieved by mounting to the television 10 a computer-readable storage medium containing control program code (executable program, intermediate code program, or source program) for the television 10, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; a semiconductor memory, such as a mask ROM/EPROM/EEPROM/flash ROM; or a logical circuit, such as PLD (Programmable logic device) or an FPGA (Field Programmable Gate Array).

The program code may be delivered to the television 10 over the communications network. The communications network is not limited in any particular manner provide that it can deliver the program code, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner provided that it can deliver the program code, and may be, for example, wired line, such as IEEE 1394, USB, electric power line, cable TV line, telephone line, or ADSL (Asymmetric Digital Subscriber Line) line; or wireless, such as infrared radiation (IrDA, remote control), Bluetooth (Registered Trademark), IEEE80211 wireless, HDR (High Data Rate), NFC (Near Field Communication), DLNA (Digital Living Network Alliance), mobile telephone network, satellite line, or terrestrial digital network.

[Additional Remark 2]

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to display devices such as a multimedia television which can create a home network connected to the Internet or a monitor of a computer.

REFERENCE SIGNS LIST

1: Monitor (display control device)
2: Video plane generating section (first display processing section)
3: Full-color plane generating section (fourth display processing section)
4: Graphic plane generating section (second display processing section)
5: Display data generating section (third display processing section)
5a: First mixer
5b: Video signal processing circuit
5c: Second mixer
10: Television receiving system
11: Wireless LAN module
12: Demultiplexer
13: DRM decrypting section
14: CPU
15: Panel controller
16: Display
17: H.264 encoding/decoding section
18: HDMI transceiver/receiver
19: Indicator
55: Focus position (specific position)

The invention claimed is:

1. A method for controlling display of a menu screen on which a plurality of icons are displayed in a circle and which can be switched between (i) a first menu screen on which a combination of icons of a first group is displayed as the plurality of icons and (ii) a second menu screen on which a combination of icons of a second group which are different from the icons of the first group is displayed as the plurality of icons;
the method including:
the step a1 of displaying the second menu screen;
the step a2 of (i) moving one of the icons of the second group to a specific position in accordance with a user's selecting operation for causing the plurality of icons to move in a circle and to sequentially move to the specific position and (ii) moving the one of the icons of the second group from the specific position to a specific region located in a central part of a display screen;

the step a3 of switching the second menu screen with the first menu screen upon receipt of a user's instruction to exchange the one of the icons of the second group with one of the icons of the first group, wherein the switching leaves the one of the icons of the second group displayed in the specific region and causes the others of the icons of the second group to cease to be displayed in the circle; and the step a4 of exchanging the one of the icons of the second group with the one of the icons of the first group by (i) moving the one of the icons of the first group, which the user wants to exchange, to the specific position in accordance with the user's selecting operation and (ii) moving the one of the icons of the second group from the specific region onto the one of the icons of the first group which one is displayed on the specific position.

2. A method for controlling display of a menu screen on which a plurality of icons are displayed in a circle and which can be switched between (i) a first menu screen on which a combination of icons of a first group is displayed as the plurality of icons and (ii) a second menu screen on which a combination of icons of a second group which are different from the icons of the first group is displayed as the plurality of icons;

the method including:

the step b1 of displaying the second menu screen;

the step b2 of moving one of the icons of the second group to a specific position in accordance with a user's selecting operation for causing the plurality of icons to move in a circle and to sequentially move to the specific position;

the step b3 of moving the one of the icons of the second group from the specific position to a specific region located in a central part of a display screen upon receipt of a user's instruction to exchange the one of the icons of the second group with one of the icons of the first group;

the step b4 of switching the second menu screen with the first menu screen, wherein the switching leaves the one of the icons of the second group displayed in the specific region and causes the others of the icons of the second group to cease to be displayed in the circle;

the step b5 of (i) moving the one of the icons of the first group, which the user wants to exchange, to the specific position in accordance with the user's selecting operation and (ii) hiding the one of the icons of the first group; and the step b6 of exchanging the one of the icons of the second group with the one of the icons of the first group by moving the one of the icons of the second group from the specific region to the specific position.

3. The method according to claim 1, wherein an indicator which indicates the one of the icons of the first group and the one of the icons of the second group is displayed between the one of the icons of the first group and the one of the icons of the second group.

4. A display control device in which a menu screen on which a plurality of icons are displayed in a circle can be switched between (i) a first menu screen on which a combination of icons of a first group is displayed as the plurality of icons and (ii) a second menu screen on which a combination of icons of a second group which are different from the icons of the first group is displayed as the plurality of icons;

the display control device including:

display section for displaying the second menu screen;

moving section for (i) moving one of the icons of the second group to a specific position in accordance with a user's selecting operation for causing the plurality of icons to move in a circle and to sequentially move to the specific position and (ii) moving the one of the icons of the second group from the specific position to a specific region located in a central part of a display screen;

switching section for switching the second menu screen with the first menu screen upon receipt of a user's instruction to exchange the one of the icons of the second group with one of the icons of the first group, wherein the switching leaves the one of the icons of the second group displayed in the specific region and causes the others of the icons of the second group to cease to be displayed in the circle; and exchanging section for exchanging the one of the icons of the second group with the one of the icons of the first group by (i) moving the one of the icons of the first group, which the user wants to exchange, to the specific position in accordance with the user's selecting operation and (ii) moving the one of the icons of the second group from the specific region onto the one of the icons of the first group which one is displayed on the specific position.

5. A computer-readable non-transitory storage medium having a program for causing a computer as a display control device according to claim 4, the program causing the computer to function as foregoing sections of the display control device.

* * * * *